United States Patent
Wu et al.

(10) Patent No.: US 11,739,269 B2
(45) Date of Patent: Aug. 29, 2023

(54) ADDITIVE AND APPLICATION THEREOF

(71) Applicant: DAXIN MATERIALS CORPORATION, Taichung (TW)

(72) Inventors: Chung-Hsien Wu, Taichung (TW); Wan-Yu Yang, Taichung (TW); Yi-Chun Lin, Taichung (TW); Chun-Chih Wang, Taichung (TW)

(73) Assignee: DAXIN MATERIALS CORPORATION, Taichung (TW)

( * ) Notice: Subject to any disclaimer, the term of this patent is extended or adjusted under 35 U.S.C. 154(b) by 104 days.

(21) Appl. No.: 16/749,502

(22) Filed: Jan. 22, 2020

(65) Prior Publication Data

US 2020/0239780 A1 Jul. 30, 2020

(30) Foreign Application Priority Data

Jan. 25, 2019 (TW) ................. 108102903

(51) Int. Cl.
| | | |
|---|---|---|
| *G02F 1/1333* | (2006.01) | |
| *C09K 19/52* | (2006.01) | |
| *C09K 19/30* | (2006.01) | |
| *C09K 19/12* | (2006.01) | |
| *G02F 1/1337* | (2006.01) | |

(52) U.S. Cl.
CPC .............. *C09K 19/52* (2013.01); *C09K 19/12* (2013.01); *C09K 19/3003* (2013.01); *G02F 1/1337* (2013.01); *C09K 2019/122* (2013.01); *C09K 2019/301* (2013.01); *C09K 2019/3004* (2013.01); *C09K 2019/3009* (2013.01); *C09K 2019/3016* (2013.01); *C09K 2019/523* (2013.01)

(58) Field of Classification Search
CPC .... C09K 19/52; C09K 19/12; C09K 19/3003; C09K 2019/122; C09K 2019/3004; C09K 2019/3009; C09K 2019/301; C09K 2019/3016; C09K 2019/523; C09K 2019/0448; G02F 1/1337
See application file for complete search history.

(56) References Cited

U.S. PATENT DOCUMENTS

| | | | | |
|---|---|---|---|---|
| 10,442,992 B2* | 10/2019 | Saito | ............. | G02F 1/1337 |
| 10,538,705 B2* | 1/2020 | Saito | ............. | C09K 19/56 |
| 10,689,576 B2* | 6/2020 | Saito | ............. | C09K 19/3402 |
| 2019/0264108 A1* | 8/2019 | Kimura | ............. | C09K 19/56 |
| 2020/0239780 A1* | 7/2020 | Wu | ............. | C09K 19/52 |

FOREIGN PATENT DOCUMENTS

| | | | | |
|---|---|---|---|---|
| CN | 108026019 A | 5/2018 | | |
| TW | 201835647 A | 10/2018 | | |
| WO | WO-2018/037933 A1 | 3/2018 | | |
| WO | WO 2018/079333 A1 * | 5/2018 | ........... | G02F 1/1337 |

OTHER PUBLICATIONS

Office Action dated Apr. 17, 2020 in TW Application No. 108102903.

* cited by examiner

*Primary Examiner* — Geraldina Visconti
(74) *Attorney, Agent, or Firm* — Muncy, Geissler, Olds & Lowe, P.C.

(57) ABSTRACT

An additive, liquid-crystal composition and a liquid-crystal display using the additive are provided. The additive includes a first additive molecule having a structure represented by formula (I):

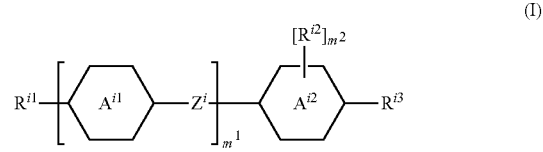

wherein $R^{i1}$, $R^{i2}$, $R^{i3}$, $A^{i1}$, $A^{i2}$, $Z^i$, $m^1$ and $m^2$ are defined as in the specification.

14 Claims, 1 Drawing Sheet

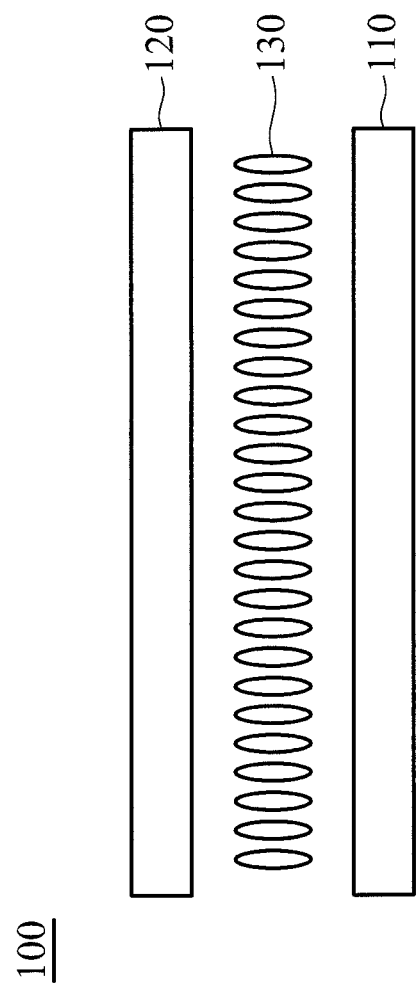

ADDITIVE AND APPLICATION THEREOF

CROSS REFERENCE TO RELATED APPLICATIONS

This Application claims priority of Taiwan Patent Application No. 108102903, filed on Jan. 25, 2019, the entirety of which is incorporated by reference herein.

BACKGROUND

Technical Field

The present disclosure relates to an additive, a liquid-crystal composition, and a liquid-crystal display device using the additive.

Description of the Related Art

Liquid-crystal display devices have been used in various applications, including personal computers, personal digital assistants (PDAs), mobile phones, televisions, and so on, because these devices have many advantages. These advantages include being light in weight, having low power consumption, and not emitting radiation.

In a liquid-crystal display device, the alignment of liquid-crystal molecules can be achieved with a polyimide film. Conventional liquid-crystal alignment layers are generally produced by coating a polyimide onto a substrate to form a film, and then mechanically rubbing it to form the desired liquid-crystal alignment groove on the surface of the polyimide film. However, after rubbing the alignment film, uneven alignment may occur, or serious brush marks may be produced. As a result, the product yield of the liquid-crystal display device is not good.

Furthermore, the procedure can also be simplified without an alignment layer. Therefore, manufacturers have begun to develop liquid-crystal display devices having no alignment layer. The liquid-crystal composition of such a liquid-crystal display device contains polar compounds, and the liquid-crystal molecules are vertically aligned by the function of the polar compounds. However, it is difficult for such polar compounds to be compatible with vertical alignment ability and a high voltage holding ratio. Furthermore, the stability of the alignment ability of such polar compounds also needs to be improved.

Accordingly, a liquid-crystal composition having excellent vertical alignment ability, a high voltage holding ratio, and a high stability of its alignment ability is still needed in this technical field.

BRIEF SUMMARY

In one embodiment of the present disclosure, an additive is provided. The additive includes a first additive molecule, and the first additive molecule has a structure represented by formula (I):

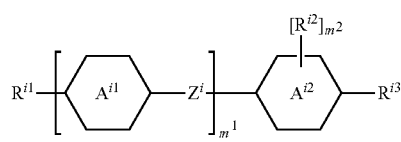

(I)

wherein, in formula (I), $R^{i1}$ represents fluorine, chlorine, hydrogen, a $C_1$-$C_{20}$ linear alkyl group, a $C_3$-$C_{20}$ branched alkyl group, a $C_1$-$C_{20}$ linear alkoxy group, or a $C_3$-$C_{20}$ branched alkoxy group, wherein the $C_1$-$C_{20}$ linear alkyl group, the $C_3$-$C_{20}$ branched alkyl group, the $C_1$-$C_{20}$ linear alkoxy group, or the $C_3$-$C_{20}$ branched alkoxy group is unsubstituted or at least one —$CH_2$— of the $C_1$-$C_{20}$ linear alkyl group, the $C_3$-$C_{20}$ branched alkyl group, the $C_1$-$C_{20}$ linear alkoxy group, or the $C_3$-$C_{20}$ branched alkoxy group is substituted by —C≡C—, —CH=CH—, —$CF_2$O—, —O—, —COO—, —OCO—, or —OOC—, and/or at least one hydrogen atom of the $C_1$-$C_{20}$ linear alkyl group, the $C_3$-$C_{20}$ branched alkyl group, the $C_1$-$C_{20}$ linear alkoxy group, or the $C_3$-$C_{20}$ branched alkoxy group is substituted by a halogen atom;

$A^{i1}$ represents a 1,4-phenylene group, a 1,4-cyclohexylene group, a benzofuran-2,5-diyl group, a 1,3-dioxane-2,5-diyl group, a tetrahydropyran-2,5-diyl group, a divalent dioxabicyclo[2.2.2]octylene group, a divalent trioxabicyclo[2.2.2]octylene group, a tetrahydronaphthalene-2,6-diyl group, a 1,3-cyclopentylene, a 1,3-cyclobutylene, or an indane-2,5-diyl group, wherein the 1,4-phenylene group, the 1,4-cyclohexylene group, the tetrahydronaphthalene-2,6-diyl group, the 1,3-cyclopentylene, the benzofuran-2,5-diyl group, the 1,3-cyclobutylene, or the indane-2,5-diyl group is unsubstituted or at least one hydrogen atom of the 1,4-phenylene group, the 1,4-cyclohexylene group, the tetrahydronaphthalene-2,6-diyl group, the 1,3-cyclopentylene, the benzofuran-2,5-diyl group, the 1,3-cyclobutylene, or the indane-2,5-diyl group is substituted by a halogen atom, —$CH_3$, —$CH_2CH_3$, or a —CN group, and/or at least one —$CH_2$— of the 1,4-phenylene group, the 1,4-cyclohexylene group, the tetrahydronaphthalene-2,6-diyl group, the 1,3-cyclopentylene, the benzofuran-2,5-diyl group, the 1,3-cyclobutylene, or the indane-2,5-diyl group is substituted by —O—, —N— or —S—, and wherein the —O—, —N—, and —S— do not directly bond to one another;

$A^{i2}$ represents a 1,4-phenylene group, a 1,4-cyclohexylene group, a benzofuran-2,5-diyl group, a tetrahydronaphthalene-2,6-diyl group, or an indane-2,5-diyl group, wherein the 1,4-phenylene group, the 1,4-cyclohexylene group, the tetrahydronaphthalene-2,6-diyl group, the benzofuran-2,5-diyl group, or the indane-2,5-diyl group is unsubstituted or at least one hydrogen atom of the 1,4-phenylene group, the 1,4-cyclohexylene group, the tetrahydronaphthalene-2,6-diyl group, the benzofuran-2,5-diyl group, or the indane-2,5-diyl group is substituted by a halogen atom, —$CH_3$, —$CH_2CH_3$, or a —CN group, and/or at least one —$CH_2$— of the 1,4-phenylene group, the 1,4-cyclohexylene group, the tetrahydronaphthalene-2,6-diyl group, the benzofuran-2,5-diyl group, or the indane-2,5-diyl group is substituted by —O—, —N— or —S—, and wherein the —O—, —N—, and —S— do not directly bond to one another;

$Z^i$ represents a single bond, a $C_1$-$C_{15}$ alkylene group, a $C_1$-$C_5$ alkyleneoxy group, —C≡C—, —CH=CH—, —$CF_2$O—, —$OCF_2$—, —COO—, —OCO—, —OOC—, —$CF_2$—$CF_2$—, or —CF=CF—;

$m^1$ represents 0, 1, 2, 3, or 4, and when $m^1$ represents 2, 3, or 4, the two or more $A^{i1}$ groups are identical to each other or different from each other, and the two or more $Z^i$ groups are identical to each other or different from each other;

$m^2$ represents 1, 2, or 3, and when $m^2$ represents 2 or 3, the two or more $R^{i2}$ groups are identical to each other or different from each other;

$R^{i2}$ represents a structure represented by formula (Ia), formula (Ib), or formula (Ic), and at least one $R^{i2}$ represents the structure represented by formula (Ib) or formula (Ic):

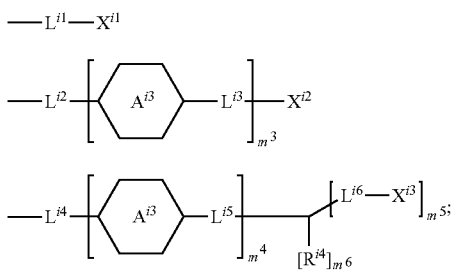

(Ia)
(Ib)
(Ic)

$R^{i3}$ represents a structure represented by formula (Id), formula (Ie), or formula (If):

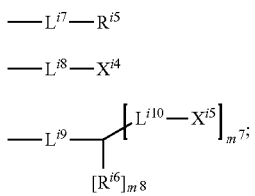

(Id)
(Ie)
(If)

wherein, in formula (Ia), formula (Ib), formula (Ic), formula (Id), formula (Ie), and formula (If), $A^{i3}$ represents a 1,4-phenylene group, a 1,4-cyclohexylene group, a 1,3-cyclopentylene, or a 1,3-cyclobutylene, wherein the 1,4-phenylene group, the 1,4-cyclohexylene group, the 1,3-cyclopentylene, or the 1,3-cyclobutylene is unsubstituted or at least one hydrogen atom of the 1,4-phenylene group, the 1,4-cyclohexylene group, the 1,3-cyclopentylene, or the 1,3-cyclobutylene is substituted by a halogen atom, —$CH_3$, —$CH_2CH_3$, or a —CN group, and/or at least one —CH= of the 1,4-phenylene group, the 1,4-cyclohexylene group, the 1,3-cyclopentylene, or the 1,3-cyclobutylene is substituted by —N=, and/or at least one —$CH_2$— of the 1,4-phenylene group, the 1,4-cyclohexylene group, the 1,3-cyclopentylene, or the 1,3-cyclobutylene is substituted by —O—, —$NR^e$— or —S—, and wherein the —O—, —$NR^e$—, and —S— do not directly bond to one another, wherein $R^e$ represents hydrogen, a $C_1$-$C_4$ linear alkyl group, or a $C_3$-$C_4$ branched alkyl group;

each of $R^{i4}$, $R^{i5}$, and $R^{i6}$ independently represents fluorine, chlorine, hydrogen, a $C_1$-$C_{20}$ linear alkyl group, a $C_3$-$C_{20}$ branched alkyl group, a $C_1$-$C_{20}$ linear alkoxy group, or a $C_3$-$C_{20}$ branched alkoxy group, wherein the $C_1$-$C_{20}$ linear alkyl group, the $C_3$-$C_{20}$ branched alkyl group, the $C_1$-$C_{20}$ linear alkoxy group, or the $C_3$-$C_{20}$ branched alkoxy group is unsubstituted or at least one —$CH_2$— of the $C_1$-$C_{20}$ linear alkyl group, the $C_3$-$C_{20}$ branched alkyl group, the $C_1$-$C_{20}$ linear alkoxy group, or the $C_3$-$C_{20}$ branched alkoxy group is substituted by —C≡C—, —CH=CH—, —$CF_2O$—, —O—, —COO—, —OCO—, or —OOC—, and/or at least one hydrogen atom of the $C_1$-$C_{20}$ linear alkyl group, the $C_3$-$C_{20}$ branched alkyl group, the $C_1$-$C_{20}$ linear alkoxy group, or the $C_3$-$C_{20}$ branched alkoxy group is substituted by a halogen atom;

each of $L^{i1}$, $L^{i2}$, $L^{i3}$, $L^{i4}$, $L^{i5}$, $L^{i6}$, $L^{i7}$, $L^{i8}$, $L^{i9}$, and $L^{i10}$ independently represents a single bond, a $C_1$-$C_{15}$ linear alkylene group, a $C_3$-$C_{15}$ branched alkylene group, a $C_1$-$C_{15}$ linear alkyleneoxy group, or a $C_3$-$C_{15}$ branched alkyleneoxy group, wherein the $C_1$-$C_{15}$ linear alkylene group, the $C_3$-$C_{15}$ branched alkylene group, the $C_1$-$C_{15}$ linear alkyleneoxy group, or the $C_3$-$C_{15}$ branched alkyleneoxy group is unsubstituted or at least one —$CH_2$— of the $C_1$-$C_{15}$ linear alkylene group, the $C_3$-$C_{15}$ branched alkylene group, the $C_1$-$C_{15}$ linear alkyleneoxy group, or the $C_3$-$C_{15}$ branched alkyleneoxy group is substituted by —C≡C—, —CH=CH—, —$CF_2O$—, —$SiR^a{}_2$—, —O—, —CO—, —COO—, —OCO—, or —OOC—, and/or at least one hydrogen atom of the $C_1$-$C_{15}$ linear alkylene group, the $C_3$-$C_{15}$ branched alkylene group, the $C_1$-$C_{15}$ linear alkyleneoxy group, or the $C_3$-$C_{15}$ branched alkyleneoxy group is substituted by a halogen atom, and wherein $R^a$ represents a $C_1$-$C_{10}$ linear alkyl group or a $C_3$-$C_{10}$ branched alkyl group, and two $R^a$ groups bonded to the same Si atom are identical to each other or different from each other;

$m^3$ represents 1 or 2, and when $m^3$ represents 2, the two $A^{i3}$ groups are identical to each other or different from each other, and the two $L^{i3}$ groups are identical to each other or different from each other;

$m^4$ represents 1 or 2, and when $m^4$ represents 2, the two $A^{i3}$ groups are identical to each other or different from each other, and the two $L^{i5}$ groups are identical to each other or different from each other;

$m^5+m^6=3$, $m^5$ represents 2 or 3, and the two or more $L^{i6}$ groups are identical to each other or different from each other, and the two or more $X^{i3}$ groups are identical to each other or different from each other;

$m^7+m^8=3$, $m^7$ represents 2 or 3, and the two or more $L^{i10}$ groups are identical to each other or different from each other, and the two or more $X^{i5}$ groups are identical to each other or different from each other;

each of $X^{i1}$, $X^{i2}$, and $X^{i3}$ independently represents hydrogen, —OH,

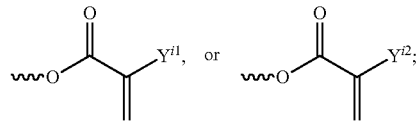

and each of $X^{i4}$ and $X^{i5}$ independently represents hydrogen, —OH,

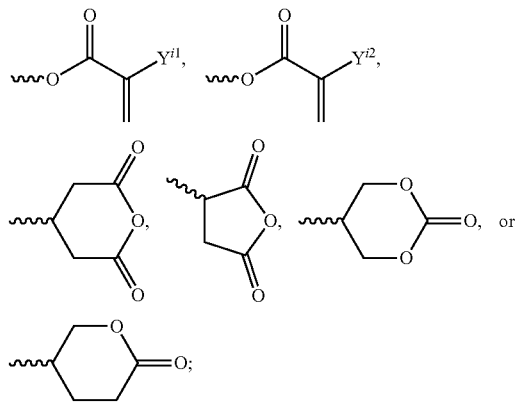

wherein at least one of $X^{i1}$, $X^{i2}$, $X^{i3}$, $X^{i4}$, and $X^{i5}$ represents or

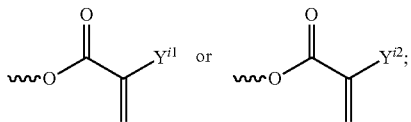

and wherein $Y^{i1}$ represents —OH, a $C_1$-$C_{15}$ alkyl group, or a $C_2$-$C_{15}$ alkenyl group, and at least one hydrogen atom of the $C_1$-$C_{15}$ alkyl group or the $C_2$-$C_{15}$ alkenyl group is substituted by —OH;

$Y^{i2}$ represents hydrogen, halogen, a $C_1$-$C_{15}$ alkyl group, or a $C_2$-$C_{15}$ alkenyl group, wherein the $C_1$-$C_{15}$ alkyl group or the $C_2$-$C_{15}$ alkenyl group is unsubstituted or at least one hydrogen atom of the $C_1$-$C_{15}$ alkyl group or the $C_2$-$C_{15}$ alkenyl group is substituted by a halogen atom.

In other embodiments of the present disclosure, a liquid-crystal composition is provided. The liquid-crystal composition includes a first component and a second component. The first component includes at least one additive as mentioned above, and the second component includes at least one compound represented by formula (II):

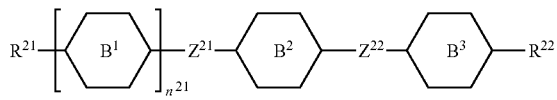

(II)

wherein each of $R^{21}$ and $R^{22}$ independently represents hydrogen, halogen, a $C_1$-$C_{15}$ alkyl group, or a $C_2$-$C_{15}$ alkenyl group, wherein the $C_1$-$C_{15}$ alkyl group or the $C_2$-$C_{15}$ alkenyl group is unsubstituted or at least one hydrogen atom of the $C_1$-$C_{15}$ alkyl group or the $C_2$-$C_{15}$ alkenyl group is substituted by a halogen atom, and/or at least one —$CH_2$— of the $C_1$-$C_{15}$ alkyl group or the $C_2$-$C_{15}$ alkenyl group is substituted by —O—, and wherein the —O— does not directly bond to another —O—;

each of $B^1$, $B^2$, and $B^3$ independently represents a 1,4-phenylene group, a 1,4-cyclohexylene group, a benzofuran-2,5-diyl group, a 1,3-dioxane-2,5-diyl group, a tetrahydropyran-2,5-diyl group, a divalent dioxabicyclo[2.2.2]octylene group, a divalent trioxabicyclo[2.2.2]octylene group, a tetrahydronaphthalene-2,6-diyl group, or an indane-2,5-diyl group, wherein the 1,4-phenylene group, the 1,4-cyclohexylene group, the 1,3-dioxane-2,5-diyl group, the benzofuran-2,5-diyl group, the tetrahydronaphthalene-2,6-diyl group, the indane-2,5-diyl group, or the tetrahydropyran-2,5-diyl group is unsubstituted or at least one hydrogen atom of the 1,4-phenylene group, the 1,4-cyclohexylene group, the 1,3-dioxane-2,5-diyl group, the benzofuran-2,5-diyl group, the tetrahydronaphthalene-2,6-diyl group, the indane-2,5-diyl group, or the tetrahydropyran-2,5-diyl group is substituted by a halogen atom or a —CN group, and/or at least one —$CH_2$— of the 1,4-phenylene group, the 1,4-cyclohexylene group, the 1,3-dioxane-2,5-diyl group, the benzofuran-2,5-diyl group, the tetrahydronaphthalene-2,6-diyl group, the indane-2,5-diyl group, or the tetrahydropyran-2,5-diyl group is substituted by —O—, —N— or —S—, and wherein the —O—, —N—, and —S— do not directly bond to one another;

each of $Z^{21}$ and $Z^{22}$ independently represents a single bond, a $C_1$-$C_4$ alkylene group, a $C_2$-$C_4$ alkenylene group, or a $C_2$-$C_4$ alkynylene group, wherein the $C_1$-$C_4$ alkylene group, the $C_2$-$C_4$ alkenylene group, or the $C_2$-$C_4$ alkynylene group is unsubstituted or at least one hydrogen atom of the $C_1$-$C_4$ alkylene group, the $C_2$-$C_4$ alkenylene group, or the $C_2$-$C_4$ alkynylene group is substituted by a halogen atom or a —CN group, and/or at least one —$CH_2$— of the $C_1$-$C_4$ alkylene group, the $C_2$-$C_4$ alkenylene group, or the $C_2$-$C_4$ alkynylene group is substituted by —O— or —S—, and wherein the —O— does not directly bond to —O— or —S—, and —S— does not directly bond to —S—; and $n^{21}$ represents 0, 1, or 2, and when $n^{21}$ represents 2, the two $B^1$ groups are identical to each other or different from each other.

In other embodiments of the present disclosure, a liquid-crystal display device is provided. The liquid-crystal display device includes a first substrate and a second substrate disposed opposite to the first substrate. The liquid-crystal display device also includes a liquid-crystal layer disposed between the first substrate and the second substrate. The liquid-crystal layer includes the above-mentioned additive.

Embodiments of the present disclosure provide an additive, and a liquid-crystal composition and a liquid-crystal display device using the additive, which can greatly improve the vertical alignment property, voltage holding ratio, and stability of the alignment ability of the liquid-crystal composition. Therefore, the performance and durability of the liquid-crystal display device can be improved.

BRIEF DESCRIPTION OF THE DRAWINGS

To further simplify and clarify the foregoing contents and other objects, characteristics, and merits of the present disclosure, a detailed description is given in the following embodiments with reference to the accompanying drawings. It should be emphasized that many features are not drawn to scale according to industry standard practice. In fact, the dimensions of the various components may be arbitrarily increased or decreased for clarity of discussion.

The sole FIGURE is a cross-sectional view showing a liquid-crystal display device in accordance with some embodiments of the present disclosure.

DETAILED DESCRIPTION

In the present specification, the term "about" or "approximately" means in a range of 20% of a given value or range, preferably 10%, and more preferably 5%. In the present specification, if there is no specific explanation, a given value or range means an approximate value which may imply the meaning of "about" or "approximately".

In the present specification, when two or more functional groups using the same code are included in one chemical formula, the two groups may be identical to each other or different from each other. For example, in formula (1), when $m^1$ is 2, two $A^{i1}$ groups may be identical to each other or different from each other, and two $Z^i$ groups may also be identical to each other or different from each other. In other words, the description of "two $A^{i1}$ groups and $Z^i$ groups are independently identical to each other or different from each other" may include all the following cases: (1) the two $A^{i1}$ groups are identical to each other, and the two $Z^i$ groups are identical to each other; (2) the two $A^{i1}$ groups are different from each other, but the two $Z^i$ groups are identical to each other; (3) the two $A^{i1}$ groups are identical to each other, but the two $Z^i$ groups are different from each other; and (4) the two $A^{i1}$ groups are different from each other, and the two $Z^i$ groups are different from each other.

In the present specification, the wavy line is used to indicate the atom to which this functional group is bonded to another functional group. For example, in the functional group

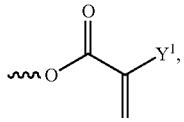

the leftmost oxygen atom is the atom bonded to another functional group.

In some embodiments of the present disclosure, an additive is provided. The additive can greatly improve the vertical alignment degree, voltage holding ratio, and stability of the alignment ability of the liquid-crystal composition. In the present specification, the term "vertical alignment ability of the additive molecule" means the degree of vertical alignment of liquid-crystal molecules in a liquid-crystal composition when the additive is added to the liquid-crystal composition. More specifically, by adding the additive molecule to the liquid-crystal composition, most liquid-crystal molecules can be vertically aligned well without using a conventional alignment film (for example, a polyimide film). Furthermore, the liquid-crystal display device using the additive has a high voltage holding ratio and excellent performance.

In some embodiments, an additive is provided. The additive includes a first additive molecule, and the first additive molecule has a structure represented by formula (I):

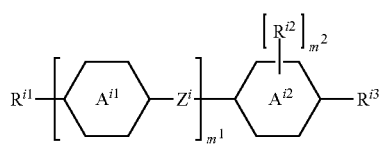

(I)

wherein, in formula (I), $R^{i1}$ represents fluorine, chlorine, hydrogen, a $C_1$-$C_{20}$ linear alkyl group, a $C_3$-$C_{20}$ branched alkyl group, a $C_1$-$C_{20}$ linear alkoxy group, or a $C_3$-$C_{20}$ branched alkoxy group, wherein the $C_1$-$C_{20}$ linear alkyl group, the $C_3$-$C_{20}$ branched alkyl group, the $C_1$-$C_{20}$ linear alkoxy group, or the $C_3$-$C_{20}$ branched alkoxy group is unsubstituted or at least one —$CH_2$— of the $C_1$-$C_{20}$ linear alkyl group, the $C_3$-$C_{20}$ branched alkyl group, the $C_1$-$C_{20}$ linear alkoxy group, or the $C_3$-$C_{20}$ branched alkoxy group is substituted by —C≡C—, —CH═CH—, —$CF_2O$—, —O—, —COO—, —OCO—, or —OOC—, and/or at least one hydrogen atom of the $C_1$-$C_{20}$ linear alkyl group, the $C_3$-$C_{20}$ branched alkyl group, the $C_1$-$C_{20}$ linear alkoxy group, or the $C_3$-$C_{20}$ branched alkoxy group is substituted by a halogen atom;

$A^{i1}$ represents a 1,4-phenylene group, a 1,4-cyclohexylene group, a benzofuran-2,5-diyl group, a 1,3-dioxane-2,5-diyl group, a tetrahydropyran-2,5-diyl group, a divalent dioxabicyclo[2.2.2]octylene group, a divalent trioxabicyclo[2.2.2]octylene group, a tetrahydronaphthalene-2,6-diyl group, a 1,3-cyclopentylene, a 1,3-cyclobutylene, or an indane-2,5-diyl group, wherein the 1,4-phenylene group, the 1,4-cyclohexylene group, the tetrahydronaphthalene-2,6-diyl group, the 1,3-cyclopentylene, the benzofuran-2,5-diyl group, the 1,3-cyclobutylene, or the indane-2,5-diyl group is unsubstituted or at least one hydrogen atom of the 1,4-phenylene group, the 1,4-cyclohexylene group, the tetrahydronaphthalene-2,6-diyl group, the 1,3-cyclopentylene, the benzofuran-2,5-diyl group, the 1,3-cyclobutylene, or the indane-2,5-diyl group is substituted by a halogen atom, —$CH_3$, —$CH_2CH_3$, or a —CN group, and/or at least one —$CH_2$— of the 1,4-phenylene group, the 1,4-cyclohexylene group, the tetrahydronaphthalene-2,6-diyl group, the 1,3-cyclopentylene, the benzofuran-2,5-diyl group, the 1,3-cyclobutylene, or the indane-2,5-diyl group is substituted by —O—, —N— or —S—, and wherein the —O—, —N—, and —S— do not directly bond to one another;

$A^{i2}$ represents a 1,4-phenylene group, a 1,4-cyclohexylene group, a benzofuran-2,5-diyl group, a tetrahydronaphthalene-2,6-diyl group, or an indane-2,5-diyl group, wherein the 1,4-phenylene group, the 1,4-cyclohexylene group, the tetrahydronaphthalene-2,6-diyl group, the benzofuran-2,5-diyl group, or the indane-2,5-diyl group is unsubstituted or at least one hydrogen atom of the 1,4-phenylene group, the 1,4-cyclohexylene group, the tetrahydronaphthalene-2,6-diyl group, the benzofuran-2,5-diyl group, or the indane-2,5-diyl group is substituted by a halogen atom, —$CH_3$, —$CH_2CH_3$, or a —CN group, and/or at least one —$CH_2$— of the 1,4-phenylene group, the 1,4-cyclohexylene group, the tetrahydronaphthalene-2,6-diyl group, the benzofuran-2,5-diyl group, or the indane-2,5-diyl group is substituted by —O—, —N— or —S—, and wherein the —O—, —N—, and —S— do not directly bond to one another;

$Z^i$ represents a single bond, a $C_1$-$C_{15}$ alkylene group, a $C_1$-$C_{15}$ alkyleneoxy group, —C≡C—, —CH═CH—, —$CF_2O$—, —$OCF_2$—, —COO—, —OCO—, —OOC—, —$CF_2$—$CF_2$—, or —CF═CF—;

$m^1$ represents 0, 1, 2, 3, or 4, and when $m^1$ represents 2, 3, or 4, the two or more $A^{i1}$ groups are identical to each other or different from each other, and the two or more $Z^i$ groups are identical to each other or different from each other;

$m^2$ represents 1, 2, or 3, and when $m^2$ represents 2 or 3, the two or more $R^{i2}$ groups are identical to each other or different from each other;

$R^{i2}$ represents a structure represented by formula (Ia), formula (Ib), or formula (Ic), and at least one $R^{i2}$ represents the structure represented by formula (Ib) or formula (Ic):

$$—L^{i1}—X^{i1} \quad\quad (Ia)$$

$$—L^{i2}\!\!\left[\!\!-\!\!\left\langle A^{i3} \right\rangle\!\!-\!\!L^{i3}\right]_{m^3}\!\!\!-\!X^{i2} \quad\quad (Ib)$$

$$—L^{i4}\!\!\left[\!\!-\!\!\left\langle A^{i3} \right\rangle\!\!-\!\!L^{i5}\right]_{m^4}\!\!\left[R^{i4}\right]_{m^6}\!\!\left[L^{i6}\!-\!X^{i3}\right]_{m^5}; \quad\quad (Ic)$$

and $R^{i3}$ represents a structure represented by formula (Id), formula (Ie), or formula (If):

$$—L^{i7}—R^{i5} \quad\quad (Id)$$

$$—L^{i8}—X^{i4} \quad\quad (Ie)$$

-continued

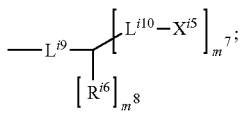 (If)

wherein, in formula (Ia), formula (Ib), formula (Ic), formula (Id), formula (Ie), and formula (If), $A^{i3}$ represents a 1,4-phenylene group, a 1,4-cyclohexylene group, a 1,3-cyclopentylene, or a 1,3-cyclobutylene, wherein the 1,4-phenylene group, the 1,4-cyclohexylene group, the 1,3-cyclopentylene, or the 1,3-cyclobutylene is unsubstituted or at least one hydrogen atom of the 1,4-phenylene group, the 1,4-cyclohexylene group, the 1,3-cyclopentylene, or the 1,3-cyclobutylene is substituted by a halogen atom, —$CH_3$, —$CH_2CH_3$, or a —CN group, and/or at least one —CH= of the 1,4-phenylene group, the 1,4-cyclohexylene group, the 1,3-cyclopentylene, or the 1,3-cyclobutylene is substituted by —N=, and/or at least one —$CH_2$— of the 1,4-phenylene group, the 1,4-cyclohexylene group, the 1,3-cyclopentylene, or the 1,3-cyclobutylene is substituted by —O—, —$NR^e$— or —S—, and wherein the —O—, —$NR^e$—, and —S— do not directly bond to one another, wherein $R^e$ represents hydrogen, a $C_1$-$C_4$ linear alkyl group, or a $C_3$-$C_4$ branched alkyl group;

each of $R^{i4}$, $R^{i5}$, and $R^{i6}$ independently represents fluorine, chlorine, hydrogen, a $C_1$-$C_{20}$ linear alkyl group, a $C_3$-$C_{20}$ branched alkyl group, a $C_1$-$C_{20}$ linear alkoxy group, or a $C_3$-$C_{20}$ branched alkoxy group, wherein the $C_1$-$C_{20}$ linear alkyl group, the $C_3$-$C_{20}$ branched alkyl group, the $C_1$-$C_{20}$ linear alkoxy group, or the $C_3$-$C_{20}$ branched alkoxy group is unsubstituted or at least one —$CH_2$— of the $C_1$-$C_{20}$ linear alkyl group, the $C_3$-$C_{20}$ branched alkyl group, the $C_1$-$C_{20}$ linear alkoxy group, or the $C_3$-$C_{20}$ branched alkoxy group is substituted by —C≡C—, —CH=CH—, —$CF_2O$—, —O—, —COO—, —OCO—, or —OOC—, and/or at least one hydrogen atom of the $C_1$-$C_{20}$ linear alkyl group, the $C_3$-$C_{20}$ branched alkyl group, the $C_1$-$C_{20}$ linear alkoxy group, or the $C_3$-$C_{20}$ branched alkoxy group is substituted by a halogen atom;

each of $L^{i1}$, $L^{i2}$, $L^{i3}$, $L^{i4}$, $L^{i5}$, $L^{i6}$, $L^{i7}$, $L^{i8}$, $L^{i9}$, and $L^{i10}$ independently represents a single bond, a $C_1$-$C_{15}$ linear alkylene group, a $C_3$-$C_{15}$ branched alkylene group, a $C_1$-$C_{15}$ linear alkyleneoxy group, or a $C_3$-$C_{15}$ branched alkyleneoxy group, wherein the $C_1$-$C_{15}$ linear alkylene group, the $C_3$-$C_{15}$ branched alkylene group, the $C_1$-$C_{15}$ linear alkyleneoxy group, or the $C_3$-$C_{15}$ branched alkyleneoxy group is unsubstituted or at least one —$CH_2$ of the $C_1$-$C_{15}$ linear alkylene group, the $C_3$-$C_{15}$ branched alkylene group, the $C_1$-$C_{15}$ linear alkyleneoxy group, or the $C_3$-$C_{15}$ branched alkyleneoxy group is substituted by —C≡C—, —CH=CH—, —$CF_2O$—, —$SiR^a_2$-, —O—, —CO—, —COO—, —OCO—, or —OOC—, and/or at least one hydrogen atom of the $C_1$-$C_{15}$ linear alkylene group, the $C_3$-$C_{15}$ branched alkylene group, the $C_1$-$C_{15}$ linear alkyleneoxy group, or the $C_3$-$C_{15}$ branched alkyleneoxy group is substituted by a halogen atom, and wherein $R^a$ represents a $C_1$-$C_{10}$ linear alkyl group or a $C_3$-$C_{10}$ branched alkyl group, and two $R^a$ groups bonded to the same Si atom are identical to each other or different from each other;

$m^3$ represents 1 or 2, and when $m^3$ represents 2, the two $A^{i3}$ groups are identical to each other or different from each other, and the two $L^{i3}$ groups are identical to each other or different from each other;

$m^4$ represents 1 or 2, and when $m^4$ represents 2, the two $A^{i3}$ groups are identical to each other or different from each other, and the two $L^{i5}$ groups are identical to each other or different from each other;

$m^5$+$m^6$=3, $m^5$ represents 2 or 3, and the two or more $L^{i6}$ groups are identical to each other or different from each other, and the two or more $X^{i3}$ groups are identical to each other or different from each other;

$m^7$+$m$=3, $m^7$ represents 2 or 3, and the two or more $L^{i10}$ groups are identical to each other or different from each other, and the two or more $X^{i5}$ groups are identical to each other or different from each other;

each of $X^{i1}$, $X^{i2}$, and $X^{i3}$ independently represents hydrogen, —OH,

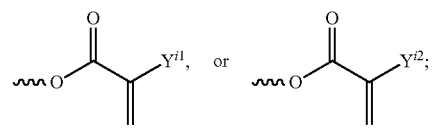

and each of $X^{i4}$ and $X^{i5}$ independently represents hydrogen, —OH,

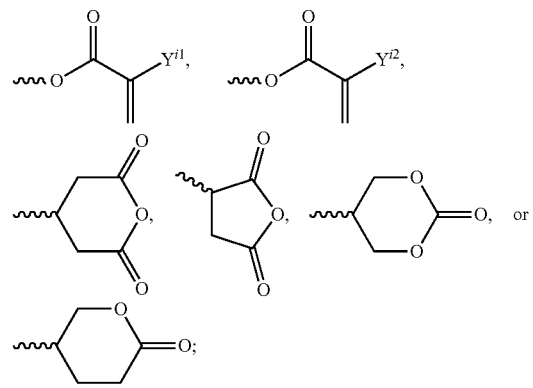

wherein at least one of $X^{i1}$, $X^{i2}$, $X^{i3}$, $X^{i4}$, and $X^{i5}$ represents or

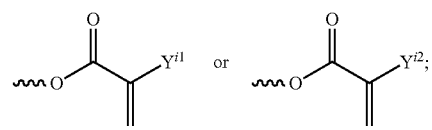

and wherein $Y^{i1}$ represents —OH, a $C_1$-$C_{15}$ alkyl group, or a $C_2$-$C_{15}$ alkenyl group, and at least one hydrogen atom of the $C_1$-$C_{15}$ alkyl group or the $C_2$-$C_{15}$ alkenyl group is substituted by —OH;

$Y^{i2}$ represents hydrogen, halogen, a $C_1$-$C_{15}$ alkyl group, or a $C_2$-$C_{15}$ alkenyl group, wherein the $C_1$-$C_{15}$ alkyl group or the $C_2$-$C_{15}$ alkenyl group is unsubstituted or at least one hydrogen atom of the $C_1$-$C_{15}$ alkyl group or the $C_2$-$C_{15}$ alkenyl group is substituted by a halogen atom.

In other embodiments, the above additive includes a first additive molecule, and the first additive molecule has a structure represented by formula (I'):

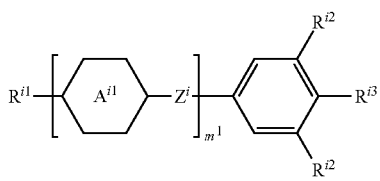
(I')

wherein, in formula (I'), $R^{i1}$ represents fluorine, chlorine, hydrogen, a $C_1$-$C_{12}$ linear alkyl group, a $C_3$-$C_{12}$ branched alkyl group, a $C_1$-$C_{12}$ linear alkoxy group, or a $C_3$-$C_{12}$ branched alkoxy group, wherein the $C_1$-$C_{12}$ linear alkyl group, the $C_3$-$C_{12}$ branched alkyl group, the $C_1$-$C_{12}$ linear alkoxy group, or the $C_3$-$C_{12}$ branched alkoxy group is unsubstituted or at least one —$CH_2$— of the $C_1$-$C_{12}$ linear alkyl group, the $C_3$-$C_{12}$ branched alkyl group, the $C_1$-$C_{12}$ linear alkoxy group, or the $C_3$-$C_{12}$ branched alkoxy group is substituted by —C≡C—, —CH=CH—, —$CF_2$O—, —O—, —COO—, —OCO—, or —OOC—, and/or at least one hydrogen atom of the $C_1$-$C_{12}$ linear alkyl group, the $C_3$-$C_{12}$ branched alkyl group, the $C_1$-$C_{12}$ linear alkoxy group, or the $C_3$-$C_{12}$ branched alkoxy group is substituted by a halogen atom;

the definitions of $A^{i1}$ and $Z^i$ are respectively the same as the definitions of $A^{i1}$ and $Z^i$ defined in the previous paragraphs; and $m^1$ represents 0, 1, 2, 3, or 4, and when $m^1$ represents 2, 3, or 4, the two or more $A^{i1}$ groups are identical to each other or different from each other, and the two or more $Z^i$ groups are identical to each other or different from each other;

$R^{i2}$ represents a structure represented by formula (Ia), formula (Ib), or formula (Ic), and at least one $R^{i2}$ represents the structure represented by formula (Ib) or formula (Ic):

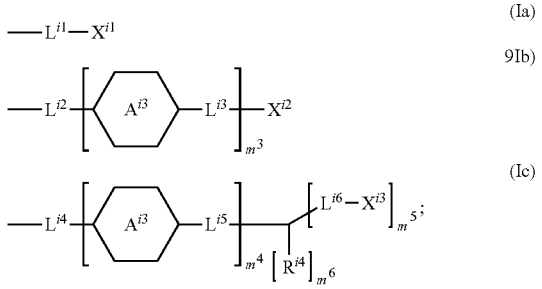

(Ia)
(Ib)
(Ic)

$R^{i3}$ represents a structure represented by formula (Id), formula (Ie), or formula (If):

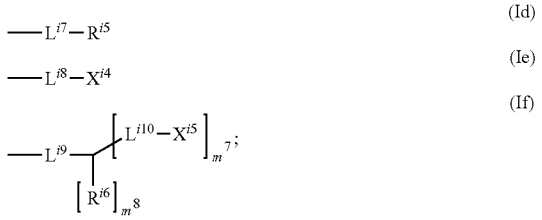

(Id)
(Ie)
(If)

wherein, in formula (Ia), formula (Ib), formula (Ic), formula (Id), formula (Ie), and formula (If), each of $R^{i4}$, $R^{i5}$, and $R^{i6}$ independently represents fluorine, chlorine, hydrogen, a $C_1$-$C_{12}$ linear alkyl group, a $C_3$-$C_{12}$ branched alkyl group, a $C_1$-$C_{12}$ linear alkoxy group, or a $C_3$-$C_{12}$ branched alkoxy group, wherein the $C_1$-$C_{12}$ linear alkyl group, the $C_3$-$C_{12}$ branched alkyl group, the $C_1$-$C_{12}$ linear alkoxy group, or the $C_3$-$C_{12}$ branched alkoxy group is unsubstituted or at least one —$CH_2$— of the $C_1$-$C_{12}$ linear alkyl group, the $C_3$-$C_{12}$ branched alkyl group, the $C_1$-$C_{12}$ linear alkoxy group, or the $C_3$-$C_{12}$ branched alkoxy group is substituted by —C≡C—, —CH=CH—, —$CF_2$O—, —O—, —COO—, —OCO—, or —OOC—, and/or at least one hydrogen atom of the $C_1$-$C_{12}$ linear alkyl group, the $C_3$-$C_{12}$ branched alkyl group, the $C_1$-$C_{12}$ linear alkoxy group, or the $C_3$-$C_{12}$ branched alkoxy group is substituted by a halogen atom;

the definitions of $L^{i1}$, $L^{i2}$, $L^{i3}$, $L^{i4}$, $L^{i5}$, $L^{i6}$, $L^{i7}$, $L^{i8}$, $L^{i9}$, $L^{i10}$, $A^{i3}$, $m^3$, $m^4$, $m^5$, $m^6$, $m^7$, and $m^8$ are respectively the same as the definitions of, $L^{i1}$, $L^{i2}$, $L^{i3}$, $L^{i4}$, $L^{i5}$, $L^{i6}$, $L^{i7}$, $L^{i8}$, $L^{i9}$, $L^{i10}$, $A^{i3}$, $m^3$, $m^4$, $m^5$, $m^6$, $m^7$, and $m^8$ defined in the previous paragraphs;

each of $X^{i1}$, $X^{i2}$, $X^{i3}$, $X^{i4}$ and $X^{i5}$ independently represents hydrogen, —OH,

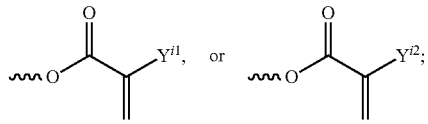

wherein at least one of $X^{i1}$, $X^{i2}$, $X^{i3}$, $X^{i4}$, and $X^{i5}$ represents

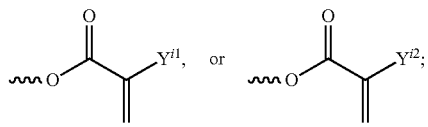

and wherein $Y^{i1}$ represents —OH, a $C_1$-$C_{10}$ alkyl group, or a $C_2$-$C_{10}$ alkenyl group, and at least one hydrogen atom of the $C_1$-$C_{10}$ alkyl group or the $C_2$-$C_{10}$ alkenyl group is substituted by —OH;

$Y^{i2}$ represents hydrogen, halogen, a $C_1$-$C_{10}$ alkyl group, or a $C_2$-$C_{10}$ alkenyl group, wherein the $C_1$-$C_{10}$ alkyl group or the $C_2$-$C_{10}$ alkenyl group is unsubstituted or at least one hydrogen atom of the $C_1$-$C_{10}$ alkyl group or the $C_2$-$C_{10}$ alkenyl group is substituted by a halogen atom.

The structure represented by formula (I) or formula (I') is substantially a rod-shaped structure. This rod-shaped structure has a first axial direction and a second axial direction. The first axial direction is substantially the long axial direction of the rod-shaped structure, that is, the direction in which the functional group $R^{i1}$ and the functional group $R^{i3}$ are connected. The second axial direction is the short axial direction of the rod-shaped structure, that is, a direction perpendicular to the first axial direction.

In some embodiments, in the above formula (I) or formula (I'), at least one of the functional groups $X^{i1}$, $X^{i2}$, $X^{i3}$, $X^{i4}$, and $X^{i5}$ may include an anchoring group. In such embodiments, the first additive molecules can be fixed to the substrate (for example, the first substrate 110 or the second substrate 120 shown in the FIGURE). In other embodiments, in the above formula (I) or formula (I'), all of the functional groups $X^{i1}$, $X^{i2}$, $X^{i3}$, $X^{i4}$, and $X^{i5}$ do not include anchor groups. In such embodiments, the first additive molecule may be used together with other additive molecules (for example, a second additive molecule or a third additive molecule described later) having an anchor group and a polymerizable group.

The anchoring group may be a functional group having a higher polarity. The anchoring group may generate a bond or a hydrogen bond with a substrate (for example, glass or ITO), and therefore, the first additive molecules can be adsorbed (or fixed) on the substrate. For example, the anchoring group may include —OH,

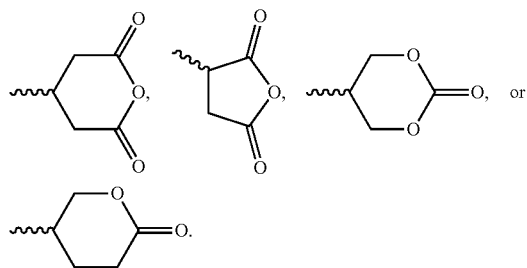

In order to achieve a state in which the liquid-crystal molecules are well aligned vertically, the first additive molecules may be fixed on the substrate in such a manner that the first axial direction is perpendicular to the top surface of the substrate. In some embodiments, the anchoring group is one of $X^{i1}$, $X^{i2}$, $X^{i3}$, $X^{i4}$, and $X^{i5}$ that is closest to the right end of the molecule represented by formula (I) or formula (I') such that the first axis is perpendicular to the top surface of the substrate.

In the above formula (I) or formula (I'), the cyclic functional group $A^{i2}$ bonded to the functional group $R^{i3}$ may have at least one side chain functional group $R^{i2}$. One end of the side chain functional group $R^{i2}$ is bonded to the cyclic functional group $A^{i2}$, and the other end of the side chain functional group $R^{i2}$ may include a polymerizable group. The polymerizable group may undergo the polymerization reaction with another polymerizable group by irradiation or heating, and the two polymerizable groups may be bonded to each other. When a plurality of additive molecules are fixed on the substrate, the polymerizable group of the additive molecule undergoes the polymerization reaction with the polymerizable group of the adjacent additive molecule. In this way, a plurality of the additive molecules that are perpendicular to the substrate and arranged in parallel with each other can form a network structure. This network structure can avoid the tilt of the additive molecules. As a result, the degree of vertical alignment of the liquid-crystal molecules is further improved, and the stability of the alignment ability is also improved. Furthermore, if the additive molecule has an OH functional group, the additive molecule in the liquid-crystal composition may become free state when a voltage is applied. This will reduce the voltage holding ratio. In such a case, if this additive molecule is polymerized with other additive molecules through the polymerizable group, the additive can be prevented from becoming free state when a voltage is applied. As a result, the voltage holding ratio can be increased. The polymerizable group may include an acrylic group, a methacrylic group, or a derivative thereof. In some embodiments, at least one of the functional groups $X^{i1}$, $X^{i2}$, $X^{i3}$, $X^{i4}$, and $X^{i5}$ is a polymerizable group having the following structure:

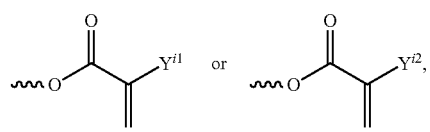

wherein $Y^{i1}$ represents —OH, a $C_1$-$C_{15}$ alkyl group, or a $C_2$-$C_{15}$ alkenyl group, and at least one hydrogen atom of the $C_1$-$C_{15}$ alkyl group or the $C_2$-$C_{15}$ alkenyl group is substituted by —OH; and $Y^{i2}$ represents hydrogen, halogen, a $C_1$-$C_{15}$ alkyl group, or a $C_2$-$C_{15}$ alkenyl group, wherein the $C_1$-$C_{15}$ alkyl group or the $C_2$-$C_{15}$ alkenyl group is unsubstituted or at least one hydrogen atom of the $C_1$-$C_{15}$ alkyl group or the $C_2$-$C_{15}$ alkenyl group is substituted by a halogen atom.

In the above formula (I) or formula (I'), the side chain functional group $R^{i2}$ may include at least one cyclic functional group $A^{i3}$. The cyclic functional group $A^{i3}$ can increase the rigidity of the side chain functional group $R^{i2}$, and it is advantageous for improving the stability of the alignment ability of the liquid-crystal molecules. More specifically, when the above network structure is formed, the side chain functional group $R^{i2}$ can maintain a specific distance between adjacent additive molecules. If the rigidity of the side chain functional group $R^{i2}$ is higher, the difference (or the degree of variance) of this specific distance between different additive molecules is smaller. In other words, in the formed network structure, the distance between adjacent additive molecules is fixed and uniform. As a result, the stability of the alignment ability of the liquid-crystal molecules can be greatly improved.

The cyclic functional group $A^{i3}$ may be an aromatic ring, an aliphatic ring, or a combination thereof. In some embodiments, all of the cyclic functional groups $A^{i3}$ are aromatic rings, so that the side chain functional group $R^{i2}$ can have higher rigidity. In other embodiments, all of the cyclic functional groups $A^{i3}$ are aliphatic rings, so that the solubility of the additive molecules in the liquid-crystal composition can be better. In still other embodiments, some of the cyclic functional groups $A^{i3}$ are aliphatic rings, and the remaining cyclic functional groups $A^{i3}$ are aromatic rings. In such embodiments, the solubility of the additive molecules and the stability of the alignment ability can be respectively adjusted to the required ranges by adjusting the cyclic functional group $A^{i3}$.

In some embodiments, the first additive molecule includes one side chain functional group $R^{i2}$. In other embodiments, the first additive molecule includes two side chain functional groups $R^{i2}$, and the two side chain functional groups $R^{i2}$ are respectively disposed on opposite sides of the cyclic functional group $A^{i2}$. For example, in some embodiments, the cyclic functional group $A^{i2}$ is a six-membered ring, and the main chain functional groups $Z^i$ and $R^{i3}$ are disposed on the first and fourth carbon atoms, respectively. In such an embodiment, the positions of the two side chain functional groups $R^{i2}$ may include all of the following situations: (1) the two side chain functional groups $R^{i2}$ are disposed on the second and fifth carbon atoms, respectively; (2) the two side chain functional groups $R^{i2}$ are disposed on the second and sixth carbon atoms, respectively; (3) the two side chain functional groups $R^{i2}$ are disposed on the third and fifth carbon atoms, respectively; and (4) the two side chain functional groups $R^{i2}$ are disposed on the third and sixth carbon atoms, respectively. In this way, the stability of the alignment ability of the liquid-crystal molecules can be further improved.

As described above, the structure represented by formula (I) or formula (I') is substantially a rod-shaped structure, and the rod-shaped structure has a first axial direction and a second axial direction. If the molecular chain length in the first axial direction is longer than the molecular chain length in the second axial direction, the additive molecules can have better vertical alignment ability. Therefore, the molecular chain length of each side chain functional group $R^{i2}$ may be made shorter than that of the main chain (i.e., the total length of the molecular chain from the functional group $R^{i1}$ to the functional group $R^{i3}$).

In some embodiments, the above-mentioned additive further includes a second additive molecule, and the second additive molecule has a structure represented by formula (I-1):

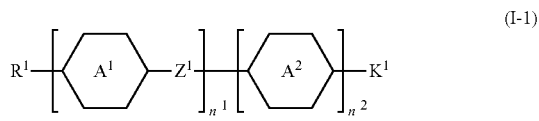
(I-1)

wherein, in formula (I-1), $R^1$ represents fluorine, chlorine, hydrogen, a $C_1$-$C_{15}$ linear alkyl group, a $C_3$-$C_{15}$ branched alkyl group, a $C_1$-$C_{15}$ linear alkoxy group, or a $C_3$-$C_{15}$ branched alkoxy group, wherein the $C_1$-$C_{15}$ linear alkyl group, the $C_3$-$C_{15}$ branched alkyl group, the $C_1$-$C_{15}$ linear alkoxy group, or the $C_3$-$C_{15}$ branched alkoxy group is unsubstituted or at least one —$CH_2$— of the $C_1$-$C_{15}$ linear alkyl group, the $C_3$-$C_{15}$ branched alkyl group, the $C_1$-$C_{15}$ linear alkoxy group, or the $C_3$-$C_{15}$ branched alkoxy group is substituted by —CH=CH—, —$CF_2O$—, —O—, —COO—, —OCO—, or —OOC—, and/or at least one hydrogen atom of the $C_1$-$C_{15}$ linear alkyl group, the $C_3$-$C_{15}$ branched alkyl group, the $C_1$-$C_{15}$ linear alkoxy group, or the $C_3$-$C_{15}$ branched alkoxy group is substituted by a halogen atom;

$A^1$ represents a 1,4-phenylene group, a 1,4-cyclohexylene group, a benzofuran-2,5-diyl group, a 1,3-dioxane-2,5-diyl group, a tetrahydropyran-2,5-diyl group, a divalent dioxabicyclo[2.2.2]octylene group, a divalent trioxabicyclo[2.2.2]octylene group, a tetrahydronaphthalene-2,6-diyl group, a 1,3-cyclopentylene, a 1,3-cyclobutylene, or an indane-2,5-diyl group, wherein the 1,4-phenylene group, the 1,4-cyclohexylene group, the tetrahydronaphthalene-2,6-diyl group, the 1,3-cyclopentylene, the 1,3-cyclobutylene, or the indane-2,5-diyl group is unsubstituted or at least one hydrogen atom of the 1,4-phenylene group, the 1,4-cyclohexylene group, the tetrahydronaphthalene-2,6-diyl group, the 1,3-cyclopentylene, the 1,3-cyclobutylene, or the indane-2,5-diyl group is substituted by a halogen atom, —$CH_3$, —$CH_2CH_3$, or a —CN group, and/or at least one —$CH_2$— of the 1,4-phenylene group, the 1,4-cyclohexylene group, the tetrahydronaphthalene-2,6-diyl group, the 1,3-cyclopentylene, the 1,3-cyclobutylene, or the indane-2,5-diyl group is substituted by —O—, —N— or —S—, and wherein the —O—, —N—, and —S— do not directly bond to one another;

$A^2$ represents a 1,4-phenylene group, a 1,4-cyclohexylene group, a benzofuran-2,5-diyl group, or an indane-2,5-diyl group, wherein the 1,4-phenylene group, the 1,4-cyclohexylene group, the benzofuran-2,5-diyl group, or the indane-2,5-diyl group is unsubstituted or at least one hydrogen atom of the 1,4-phenylene group, the 1,4-cyclohexylene group, the benzofuran-2,5-diyl group, or the indane-2,5-diyl group is substituted by a halogen atom, —$CH_3$, —$CH_2CH_3$, or a —CN group, and/or at least one —$CH_2$— of the 1,4-phenylene group, the 1,4-cyclohexylene group, the benzofuran-2,5-diyl group, or the indane-2,5-diyl group is substituted by —O—, —N— or —S—, and wherein the —O—, —N—, and —S— do not directly bond to one another;

$Z^1$ represents a single bond, a $C_1$-$C_{15}$ alkylene group, a $C_1$-$C_{15}$ alkyleneoxy group, —C≡C—, —CH=CH—, —$CF_2O$—, —$OCF_2$—, —COO—, —OCO—, —OOC—, —$CF_2$—$CF_2$—, or —CF=CF—;

$n^1$ represents 1, 2, or 3, and when $n^1$ represents 2 or 3, the two or more $A^1$ groups are identical to each other or different from each other, and the two or more $Z^1$ groups are identical to each other or different from each other;

$n^2$ represents 0 or 1; and $K^1$ represents a structure represented by formula (I-1-a), formula (I-1-b), or formula (I-1-c):

(I-1-a)

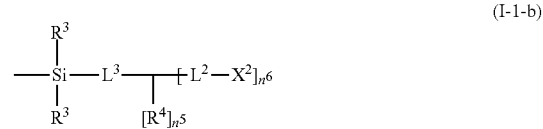
(I-1-b)

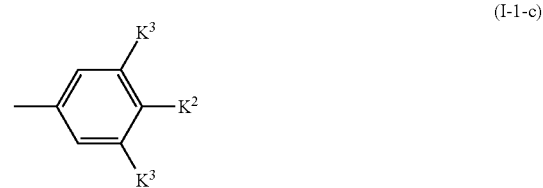
(I-1-c)

wherein, in formula (I-1-a), formula (I-1-b), and formula (I-1-c), each of $L^2$ and $L^3$ independently represents a single bond, a $C_1$-$C_{15}$ linear alkylene group, a $C_3$-$C_{15}$ branched alkylene group, a $C_1$-$C_{15}$ linear alkyleneoxy group, or a $C_3$-$C_{15}$ branched alkyleneoxy group, wherein the $C_1$-$C_{15}$ linear alkylene group, the $C_3$-$C_{15}$ branched alkylene group, the $C_1$-$C_{15}$ linear alkyleneoxy group, or the $C_3$-$C_{15}$ branched alkyleneoxy group is unsubstituted or at least one —$CH_2$— of the $C_1$-$C_{15}$ linear alkylene group, the $C_3$-$C_{15}$ branched alkylene group, the $C_1$-$C_{15}$ linear alkyleneoxy group, or the $C_3$-$C_{15}$ branched alkyleneoxy group is substituted by —C≡C—, —CH=CH—, —$CF_2O$—, —$SiR^a{}_2$—, —O—, —COO—, —OCO—, or —OOC—, and/or at least one hydrogen atom of the $C_1$-$C_{15}$ linear alkylene group, the $C_3$-$C_{15}$ branched alkylene group, the $C_1$-$C_{15}$ linear alkyleneoxy group, or the $C_3$-$C_{15}$ branched alkyleneoxy group is substituted by a halogen atom, and wherein $R^a$ represents a $C_1$-$C_{10}$ linear alkyl group or a $C_3$-$C_{10}$ branched alkyl group, and two $R^a$ groups bonded to the same Si atom are identical to each other or different from each other;

each of $R^2$, $R^3$ and $R^4$ independently represents fluorine, chlorine, hydrogen, a $C_1$-$C_8$ linear alkyl group, a $C_3$-$C_8$ branched alkyl group, a $C_1$-$C_8$ linear alkoxy group, or a $C_3$-$C_8$ branched alkoxy group, wherein the $C_1$-$C_8$ linear alkyl group, the $C_3$-$C_8$ branched alkyl group, the $C_1$-$C_8$ linear alkoxy group, or the $C_3$-$C_8$ branched alkoxy group is unsubstituted or at least one —$CH_2$— of the $C_1$-$C_8$ linear alkyl group, the $C_3$-$C_8$ branched alkyl group, the $C_1$-$C_8$ linear alkoxy group, or the $C_3$-$C_8$ branched alkoxy group is substituted by —CH=CH—, —$CF_2O$—, —O—, —COO—, —OCO—, or —OOC—, and/or at least one hydrogen atom of the $C_1$-$C_8$ linear alkyl group, the $C_3$-$C_8$ branched alkyl group, the $C_1$-$C_8$ linear alkoxy group, or the $C_3$-$C_8$ branched alkoxy group is substituted by a halogen atom;

$n^3+n^4=3$, $n^4$ represents 2 or 3, and the two or more $L^2$ groups are identical to each other or different from each other, and the two or more $X^1$ groups are identical to each other or different from each other;

$n^5+n^6=3$, $n^6$ represents 2 or 3, and the two or more $L^2$ groups are identical to each other or different from each other, and the two or more $X^2$ groups are identical to each other or different from each other;

each of $X^1$ and $X^2$ independently represents or

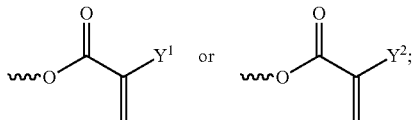

wherein $Y^1$ represents —OH, a $C_1$-$C_8$ alkyl group, or a $C_2$-$C_8$ alkenyl group, and at least one hydrogen atom of the $C_1$-$C_8$ alkyl group or the $C_2$-$C_8$ alkenyl group is substituted by —OH;

$Y^2$ represents hydrogen, halogen, a $C_1$-$C_8$ alkyl group, or a $C_2$-$C_8$ alkenyl group, wherein the $C_1$-$C_8$ alkyl group or the $C_2$-$C_8$ alkenyl group is unsubstituted or at least one hydrogen atom of the $C_1$-$C_8$ alkyl group or the $C_2$-$C_8$ alkenyl group is substituted by a halogen atom;

$K^2$ represents a structure represented by formula (I-1-d), formula (I-1-e), or formula (I-1-f):

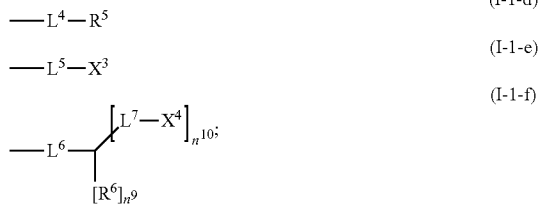

and $K^3$ represents a structure represented by formula (I-1-g) or formula (I-1-h):

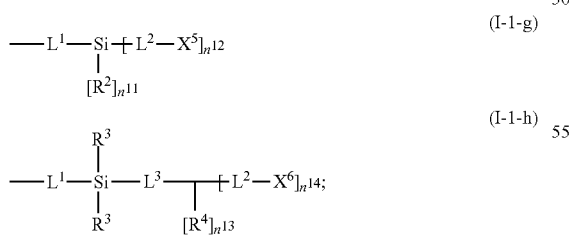

wherein, in formula (I-1-d), formula (I-1-e), formula (I-1-f), formula (I-1-g), and formula (I-1-h), each of $L^1$, $L^2$, $L^3$, $L^4$, $L^5$, $L^6$, and $L^7$ independently represents a single bond, a $C_1$-$C_{15}$ linear alkylene group, a $C_3$-$C_{15}$ branched alkylene group, a $C_1$-$C_{15}$ linear alkyleneoxy group, or a $C_3$-$C_{15}$ branched alkyleneoxy group, wherein the $C_1$-$C_{15}$ linear alkylene group, the $C_3$-$C_{15}$ branched alkylene group, the $C_1$-$C_{15}$ linear alkyleneoxy group, or the $C_3$-$C_{15}$ branched alkyleneoxy group is unsubstituted or at least one —$CH_2$— of the $C_1$-$C_{15}$ linear alkylene group, the $C_3$-$C_{15}$ branched alkylene group, the $C_1$-$C_{15}$ linear alkyleneoxy group, or the $C_3$-$C_{15}$ branched alkyleneoxy group is substituted by —C≡C—, —CH=CH—, —$CF_2$O—, —$SiR^a_2$—, —O—, —COO—, —OCO—, or —OOC—, and/or at least one hydrogen atom of the $C_1$-$C_{15}$ linear alkylene group, the $C_3$-$C_{15}$ branched alkylene group, the $C_1$-$C_{15}$ linear alkyleneoxy group, or the $C_3$-$C_{15}$ branched alkyleneoxy group is substituted by a halogen atom, and wherein $R^a$ represents a $C_1$-$C_{10}$ linear alkyl group or a $C_3$-$C_{10}$ branched alkyl group, and two $R^a$ groups bonded to the same Si atom are identical to each other or different from each other;

each of $R^2$, $R^3$, $R^4$, $R^5$ and $R^6$ independently represents fluorine, chlorine, hydrogen, a $C_1$-$C_{10}$ linear alkyl group, a $C_3$-$C_{10}$ branched alkyl group, a $C_1$-$C_{10}$ linear alkoxy group, or a $C_3$-$C_{10}$ branched alkoxy group, wherein the $C_1$-$C_{10}$ linear alkyl group, the $C_3$-$C_{10}$ branched alkyl group, the $C_1$-$C_{10}$ linear alkoxy group, or the $C_3$-$C_{10}$ branched alkoxy group is unsubstituted or at least one —$CH_2$— of the $C_1$-$C_{10}$ linear alkyl group, the $C_3$-$C_{10}$ branched alkyl group, the $C_1$-$C_{10}$ linear alkoxy group, or the $C_3$-$C_{10}$ branched alkoxy group is substituted by —C≡C—, —CH=CH—, —$CF_2$O—, —O—, —COO—, —OCO—, or —OOC—, and/or at least one hydrogen atom of the $C_1$-$C_{10}$ linear alkyl group, the $C_3$-$C_{10}$ branched alkyl group, the $C_1$-$C_{10}$ linear alkoxy group, or the $C_3$-$C_{10}$ branched alkoxy group is substituted by a halogen atom;

$n^9+n^{10}=3$, $n^{10}$ represents 2 or 3, and the two or more $L^7$ groups are identical to each other or different from each other, and the two or more $X^4$ groups are identical to each other or different from each other;

$n^{12}$ represents 1, 2, or 3, $n^{11}+n^{12}=3$, and when $n^{12}$ represents 2 or 3, the two or more $L^2$ groups are identical to each other or different from each other, and the two or more $X^5$ groups are identical to each other or different from each other; when $n^{11}$ represents 2, the two $R^2$ groups are identical to each other or different from each other; and $n^{14}$ represents 1, 2, or 3, $n^{13}+n^{14}=3$, and when $n^{14}$ represents 2 or 3, the two or more $L^2$ groups are identical to each other or different from each other, and the two or more $X^6$ groups are identical to each other or different from each other; when $n^{13}$ represents 2, the two $R^4$ groups are identical to each other or different from each other;

each of $X^3$, $X^4$, $X^5$ and $X^6$ independently represents hydrogen, —OH,

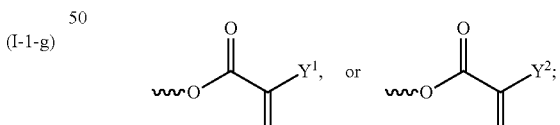

wherein, when $K^1$ represents the structure represented by formula (I-1-a) or formula (I-1-b), at least one of $X^1$ and $X^2$ represents

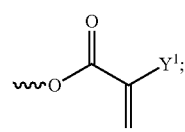

when K¹ represents the structure represented by formula (I-1-c), and K² represents the structure represented by formula (I-1-d), at least one of X⁵ and X⁶ represents

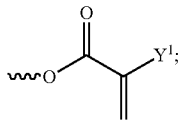

and when K¹ represents the structure represented by formula (I-1-c), and K² represents the structure represented by formula (I-1-e) or formula (I-1-f), at least one of X³, X⁴, X⁵ and X⁶ represents

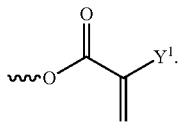

In some embodiments, the above-mentioned additive further includes a third additive molecule, and the third additive molecule has a structure represented by formula (I-1):

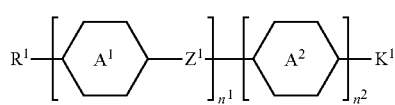

(I-1)

wherein, in formula (I-1),

R¹ represents fluorine, chlorine, hydrogen, a $C_1$-$C_{15}$ linear alkyl group, a $C_3$-$C_{15}$ branched alkyl group, a $C_1$-$C_{15}$ linear alkoxy group, or a $C_3$-$C_{15}$ branched alkoxy group, wherein the $C_1$-$C_{15}$ linear alkyl group, the $C_3$-$C_{15}$ branched alkyl group, the $C_1$-$C_{15}$ linear alkoxy group, or the $C_3$-$C_{15}$ branched alkoxy group is unsubstituted or at least one —CH$_2$— of the $C_1$-$C_{15}$ linear alkyl group, the $C_3$-$C_{15}$ branched alkyl group, the $C_1$-$C_{15}$ linear alkoxy group, or the $C_3$-$C_{15}$ branched alkoxy group is substituted by —CH=CH—, —CF$_2$O—, —O—, —COO—, —OCO—, or —OOC—, and/or at least one hydrogen atom of the $C_1$-$C_{15}$ linear alkyl group, the $C_3$-$C_{15}$ branched alkyl group, the $C_1$-$C_{15}$ linear alkoxy group, or the $C_3$-$C_{15}$ branched alkoxy group is substituted by a halogen atom;

A¹ represents a 1,4-phenylene group, a 1,4-cyclohexylene group, a benzofuran-2,5-diyl group, a 1,3-dioxane-2,5-diyl group, a tetrahydropyran-2,5-diyl group, a divalent dioxabicyclo[2.2.2]octylene group, a divalent trioxabicyclo[2.2.2]octylene group, a tetrahydronaphthalene-2,6-diyl group, a 1,3-cyclopentylene, a 1,3-cyclobutylene, or an indane-2,5-diyl group, wherein the 1,4-phenylene group, the 1,4-cyclohexylene group, the tetrahydronaphthalene-2,6-diyl group, the 1,3-cyclopentylene, the 1,3-cyclobutylene, or the indane-2,5-diyl group is unsubstituted or at least one hydrogen atom of the 1,4-phenylene group, the 1,4-cyclohexylene group, the tetrahydronaphthalene-2,6-diyl group, the 1,3-cyclopentylene, the 1,3-cyclobutylene, or the indane-2,5-diyl group is substituted by a halogen atom, —CH$_3$, —CH$_2$CH$_3$, or a —CN group, and/or at least one —CH$_2$— of the 1,4-phenylene group, the 1,4-cyclohexylene group, the tetrahydronaphthalene-2,6-diyl group, the 1,3-cyclopentylene, the 1,3-cyclobutylene, or the indane-2,5-diyl group is substituted by —O—, —N— or —S—, and wherein the —O—, —N—, and —S— do not directly bond to one another;

A² represents a 1,4-phenylene group, a 1,4-cyclohexylene group, a benzofuran-2,5-diyl group, or an indane-2,5-diyl group, wherein the 1,4-phenylene group, the 1,4-cyclohexylene group, the benzofuran-2,5-diyl group, or the indane-2,5-diyl group is unsubstituted or at least one hydrogen atom of the 1,4-phenylene group, the 1,4-cyclohexylene group, the benzofuran-2,5-diyl group, or the indane-2,5-diyl group is substituted by a halogen atom, —CH$_3$, —CH$_2$CH$_3$, or a —CN group, and/or at least one —CH$_2$— of the 1,4-phenylene group, the 1,4-cyclohexylene group, the benzofuran-2,5-diyl group, or the indane-2,5-diyl group is substituted by —O—, —N— or —S—, and wherein the —O—, —N—, and —S— do not directly bond to one another;

Z¹ represents a single bond, a $C_1$-$C_{15}$ alkylene group, a $C_1$-$C_{15}$ alkyleneoxy group, —C≡C—, —CH=CH—, —CF$_2$O—, —OCF$_2$—, —COO—, —OCO—, —OOC—, —CF$_2$—CF$_2$—, or —CF=CF—;

n¹ represents 1, 2, or 3, and when n¹ represents 2 or 3, the two or more A¹ groups are identical to each other or different from each other, and the two or more Z¹ groups are identical to each other or different from each other;

n² represents 0 or 1; and

K¹ represents a structure represented by formula (I-1-a), formula (I-1-b), or formula (I-1-c):

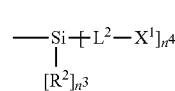

(I-1-a)

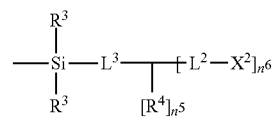

(I-1-b)

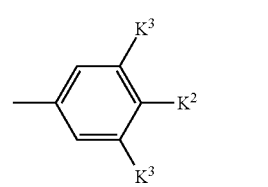

(I-1-c)

wherein, in formula (I-1-a), formula (I-1-b), and formula (I-1-c), each of L² and L³ independently represents a single bond, a $C_1$-$C_{15}$ linear alkylene group, a $C_3$-$C_{15}$ branched alkylene group, a $C_1$-$C_{15}$ linear alkyleneoxy group, or a $C_3$-$C_{15}$ branched alkyleneoxy group, wherein the $C_1$-$C_{15}$ linear alkylene group, the $C_3$-$C_{15}$ branched alkylene group, the $C_1$-$C_{15}$ linear alkyleneoxy group, or the $C_3$-$C_{15}$ branched alkyleneoxy group is unsubstituted or at least one —CH$_2$— of the $C_1$-$C_{15}$ linear alkylene group, the $C_3$-$C_{15}$ branched alkylene group, the $C_1$-$C_{15}$ linear alkyleneoxy group, or the $C_3$-$C_{15}$ branched alkyleneoxy group is substituted by —C≡C—, —CH=CH—, —CF$_2$O—, —SiR$^a{}_2$—, —O—, —COO—, —OCO—, or —OOC—, and/or at least one hydrogen atom of the $C_1$-$C_{15}$ linear alkylene group, the $C_3$-$C_{15}$ branched alkylene group, the $C_1$-$C_{15}$ linear alkyleneoxy group, or the $C_3$-$C_{15}$ branched alkyleneoxy group is substituted by a halogen atom, and wherein R$^a$ represents a $C_1$-$C_{10}$ linear alkyl group or a $C_3$-$C_{10}$ branched alkyl group, and two $R^a$ groups bonded to the same Si atom are identical to each other or different from each other;

each of $R^2$, $R^3$ and $R^4$ independently represents fluorine, chlorine, hydrogen, a $C_1$-$C_8$ linear alkyl group, a $C_3$-$C_8$ branched alkyl group, a $C_1$-$C_8$ linear alkoxy group, or a $C_3$-$C_8$ branched alkoxy group, wherein the $C_1$-$C_8$ linear alkyl group, the $C_3$-$C_8$ branched alkyl group, the $C_1$-$C_8$ linear alkoxy group, or the $C_3$-$C_8$ branched alkoxy group is unsubstituted or at least one —$CH_2$— of the $C_1$-$C_8$ linear alkyl group, the $C_3$-$C_8$ branched alkyl group, the $C_1$-$C_8$ linear alkoxy group, or the $C_3$-$C_8$ branched alkoxy group is substituted by —CH=CH—, —$CF_2$O—, —O—, —COO—, —OCO—, or —OOC—, and/or at least one hydrogen atom of the $C_1$-$C_8$ linear alkyl group, the $C_3$-$C_8$ branched alkyl group, the $C_1$-$C_8$ linear alkoxy group, or the $C_3$-$C_8$ branched alkoxy group is substituted by a halogen atom;

$n^3+n^4=3$, $n^4$ represents 2 or 3, and the two or more $L^2$ groups are identical to each other or different from each other, and the two or more $X^1$ groups are identical to each other or different from each other;

$n^5+n^6=3$, $n^6$ represents 2 or 3, and the two or more $L^2$ groups are identical to each other or different from each other, and the two or more $X^2$ groups are identical to each other or different from each other;

each of $X^1$ and $X^2$ independently represents

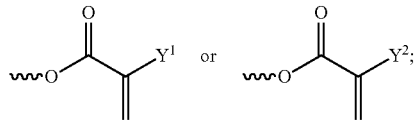

wherein $Y^1$ represents —OH, a $C_1$-$C_8$ alkyl group, or a $C_2$-$C_8$ alkenyl group, and at least one hydrogen atom of the $C_1$-$C_5$ alkyl group or the $C_2$-$C_8$ alkenyl group is substituted by —OH;

$Y^2$ represents hydrogen, halogen, a $C_1$-$C_8$ alkyl group, or a $C_2$-$C_8$ alkenyl group, wherein the $C_1$-$C_8$ alkyl group or the $C_2$-$C_8$ alkenyl group is unsubstituted or at least one hydrogen atom of the $C_1$-$C_8$ alkyl group or the $C_2$-$C_8$ alkenyl group is substituted by a halogen atom;

$K^2$ represents a structure represented by formula (I-1-d), formula (I-1-e), or formula (I-1-f):

$$—L^4—R^5 \quad \text{(I-1-d)}$$

$$—L^5—X^3 \quad \text{(I-1-e)}$$

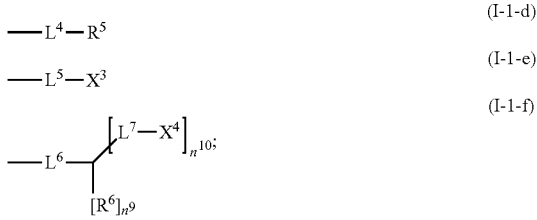

and $K^3$ represents a structure represented by formula (I-1-g) or formula (I-1-h):

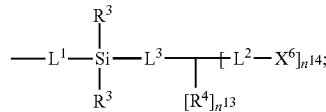

wherein, in formula (I-1-d), formula (I-1-e), formula (I-1-f), formula (I-1-g), and formula (I-1-h), each of $L^1$, $L^2$, $L^3$, $L^4$, $L^5$, $L^6$, and $L^7$ independently represents a single bond, a $C_1$-$C_{15}$ linear alkylene group, a $C_3$-$C_{15}$ branched alkylene group, a $C_1$-$C_{15}$ linear alkyleneoxy group, or a $C_3$-$C_{15}$ branched alkyleneoxy group, wherein the $C_1$-$C_{15}$ linear alkylene group, the $C_3$-$C_{15}$ branched alkylene group, the $C_1$-$C_{15}$ linear alkyleneoxy group, or the $C_3$-$C_{15}$ branched alkyleneoxy group is unsubstituted or at least one —$CH_2$— of the $C_1$-$C_{15}$ linear alkylene group, the $C_3$-$C_{15}$ branched alkylene group, the $C_1$-$C_{15}$ linear alkyleneoxy group, or the $C_3$-$C_{15}$ branched alkyleneoxy group is substituted by —C≡C—, —CH=CH—, —$CF_2$O—, —$SiR^a_2$—, —O—, —COO—, —OCO—, or —OOC—, and/or at least one hydrogen atom of the $C_1$-$C_{15}$ linear alkylene group, the $C_3$-$C_{15}$ branched alkylene group, the $C_1$-$C_{15}$ linear alkyleneoxy group, or the $C_3$-$C_{15}$ branched alkyleneoxy group is substituted by a halogen atom, and wherein $R^a$ represents a $C_1$-$C_{10}$ linear alkyl group or a $C_3$-$C_{10}$ branched alkyl group, and two $R^a$ groups bonded to the same Si atom are identical to each other or different from each other;

each of $R^2$, $R^3$, $R^4$, $R^5$ and $R^6$ independently represents fluorine, chlorine, hydrogen, a $C_1$-$C_{10}$ linear alkyl group, a $C_3$-$C_{10}$ branched alkyl group, a $C_1$-$C_{10}$ linear alkoxy group, or a $C_3$-$C_{10}$ branched alkoxy group, wherein the $C_1$-$C_{10}$ linear alkyl group, the $C_3$-$C_{10}$ branched alkyl group, the $C_1$-$C_{10}$ linear alkoxy group, or the $C_3$-$C_{10}$ branched alkoxy group is unsubstituted or at least one —$CH_2$— of the $C_1$-$C_{10}$ linear alkyl group, the $C_3$-$C_{10}$ branched alkyl group, the $C_1$-$C_{10}$ linear alkoxy group, or the $C_3$-$C_{10}$ branched alkoxy group is substituted by —C≡C—, —CH=CH—, —$CF_2$O—, —O—, —COO—, —OCO—, or —OOC—, and/or at least one hydrogen atom of the $C_1$-$C_{10}$ linear alkyl group, the $C_3$-$C_{10}$ branched alkyl group, the $C_1$-$C_{10}$ linear alkoxy group, or the $C_3$-$C_{10}$ branched alkoxy group is substituted by a halogen atom;

$n^9+n^{10}=3$, $n^{10}$ represents 2 or 3, and the two or more $L^7$ groups are identical to each other or different from each other, and the two or more $X^4$ groups are identical to each other or different from each other;

$n^{12}$ represents 1, 2, or 3, $n^{11}+n^{12}=3$, and when $n^{12}$ represents 2 or 3, the two or more $L^2$ groups are identical to each other or different from each other, and the two or more $X^5$ groups are identical to each other or different from each other; when $n^{11}$ represents 2, the two $R^2$ groups are identical to each other or different from each other; and $n^{14}$ represents 1, 2, or 3, $n^{13}+n^{14}=3$, and when $n^{14}$ represents 2 or 3, the two or more $L^2$ groups are identical to each other or different from each other, and the two or more $X^6$ groups are identical to each other or different from each other; when $n^{13}$ represents 2, the two $R^4$ groups are identical to each other or different from each other;

each of $X^3$, $X^4$, $X^5$ and $X^6$ independently represents hydrogen, —OH,

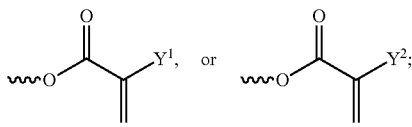

wherein, when $K^1$ represents the structure represented by formula (I-1-a) or formula (I-1-b), each of $X^1$ and $X^2$ independently represents

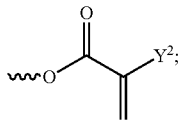

and when $K^1$ represents the structure represented by formula (I-1-c), each of $X^3$, $X^4$, $X^5$ and $X^6$ represents hydrogen or

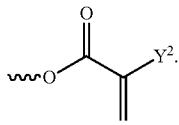

The structure represented by formula (I-1) is also a rod-shaped structure. This rod-shaped structure has a first axial direction and a second axial direction. The above first axial direction is the long axial direction of the rod-shaped structure, that is, the direction in which the functional group $R^1$ and the functional group $K^1$ are connected. The second axial direction is the short axial direction of the rod-shaped structure, that is, a direction perpendicular to the first axial direction.

In the above formula (I-1), at least one of the functional groups $X^1$, $X^2$, $X^3$, $X^4$, $X^5$, and $X^6$ may include an anchoring group. The anchoring group may generate a bond or a hydrogen bond with a substrate (for example, glass or ITO), and therefore, the additive molecules can be adsorbed (or fixed) on the substrate. For example, the anchoring group may include —OH,

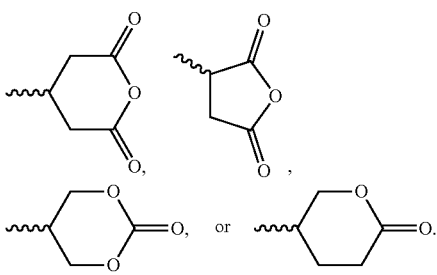

In some embodiments, the anchoring group is one of $X^1$, $X^2$, $X^3$, $X^4$, $X^5$, and $X^6$ that is closest to the right end of the molecule represented by formula (I-1) such that the first axis is perpendicular to the top surface of the substrate. As a result, the vertical alignment of the liquid-crystal molecules can be well achieved.

In some embodiments, each of the additive molecules has only one anchoring group. Therefore, each of the additive molecules has the same alignment direction on the substrate. In other words, the first axial directions of the different additive molecules are parallel to each other. As a result, the liquid-crystal molecules can be aligned in a uniform state, and defects (for example, local bright spots generated in the dark state) are not easy to generate. In other embodiments, each of the additive molecules has two anchoring groups. Therefore, it is helpful for the immobilization of the additive molecules on the substrate without being easy to detach. As a result, the occurrence of defects can also be reduced. In addition, in order to avoid the polarity of the additive molecules being too high to be dissolved in the liquid-crystal composition, the number of anchoring groups in one additive molecule is not greater than three.

In the above formula (I-1), the cyclic functional groups (i.e., $A^1$ and $A^2$) may be an aliphatic ring or an aromatic ring. The cyclic functional group contributes to the alignment of the liquid-crystal molecules. More specifically, the aromatic cyclic functional group may generate a π-π stacking so that the rod-shaped liquid-crystal molecules may be aligned in a specific direction. The aliphatic cyclic functional group can align the rod-shaped liquid-crystal molecules in a specific direction by steric hindrance. In some embodiments, the first axial direction of the additive molecules is perpendicular to the top surface of the substrate, and the long axis of the rod-shaped liquid-crystal molecules is parallel to the first axial direction of the additive molecules. Therefore, the long axis of the rod-shaped liquid-crystal molecules can be made perpendicular to the substrate by the additive molecules. In other words, the vertical alignment of the liquid-crystal molecules can be achieved.

Some negative ions (for example, fluoride ions) may remain in the liquid-crystal composition. These ions can cause residual current and reduce the voltage holding ratio during the operation of the display. More specifically, the higher concentration of the negative ions results in the lower the voltage holding ratio. Silicon atoms are more electron-poor than carbon atoms, and therefore, silicon atoms can attract (or capture) the negative ions in the liquid-crystal composition. As a result, the concentration of the negative ions in the liquid-crystal composition can be lowered, and the voltage holding ratio of the liquid-crystal display device can be increased. In other words, in the molecule represented by formula (I-1), the silicon atom has the function of increasing the voltage holding ratio. Furthermore, in order to attract the negative ions, the silicon atom in the molecule represented by formula (I-1) is not directly bonded to the oxygen atom. In addition, because the silicon atom is bonded to the alkyl group, the solubility of the molecule represented by formula (I-1) in the liquid-crystal composition can also be improved.

In some embodiments, in the above formula (I-1), at least one of the functional groups $X^1$, $X^2$, $X^3$, $X^4$, $X^5$, and $X^6$ may include a polymerizable group. The polymerizable group can make the additive molecules form the above-mentioned network structure. As a result, the degree of vertical alignment of the liquid-crystal molecules is further improved, and the stability of the alignment ability is increased. The polymerizable group may include an acrylic group, a methacrylic group, or a derivative thereof. In some embodiments, at least one of the functional groups $X^1$, $X^2$, $X^3$, $X^4$, $X^5$, and $X^6$ is a polymerizable group having the following structure:

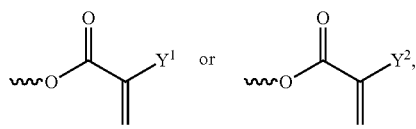

wherein Y¹ represents —OH, a $C_1$-$C_8$ alkyl group, or a $C_2$-$C_8$ alkenyl group, and at least one hydrogen atom of the $C_1$-$C_8$ alkyl group or the $C_2$-$C_8$ alkenyl group is substituted by —OH; and Y² represents hydrogen, halogen, a $C_1$-$C_8$ alkyl group, or a $C_2$-$C_8$ alkenyl group, wherein the $C_1$-$C_8$ alkyl group or the $C_2$-$C_8$ alkenyl group is unsubstituted or at least one hydrogen atom of the $C_1$-$C_8$ alkyl group or the $C_2$-$C_8$ alkenyl group is substituted by a halogen atom.

Specific exemplary first additive molecules are shown in Table 1 below. Specific exemplary second additive molecules are shown in Table 2 below. Specific exemplary third additive molecules are shown in Table 3 below.

TABLE 1

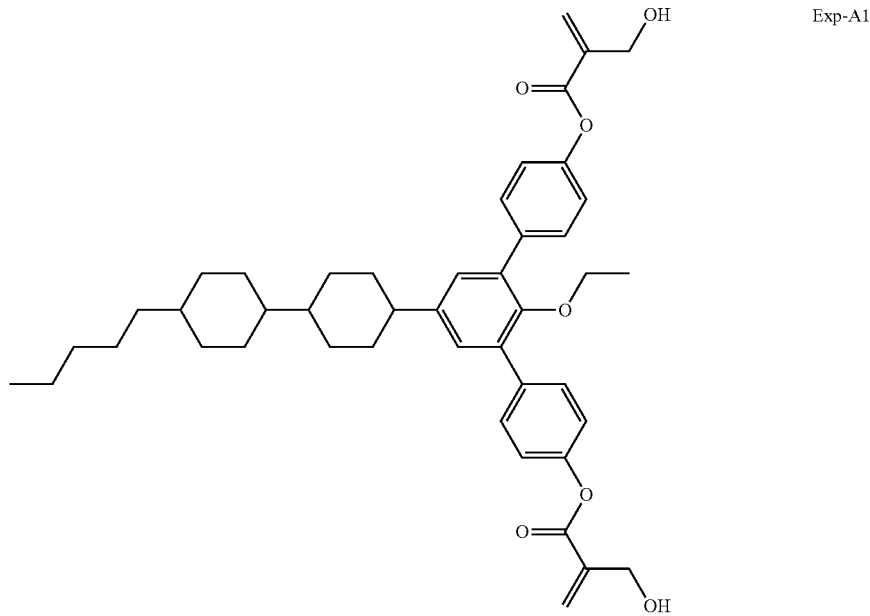

Exp-A1

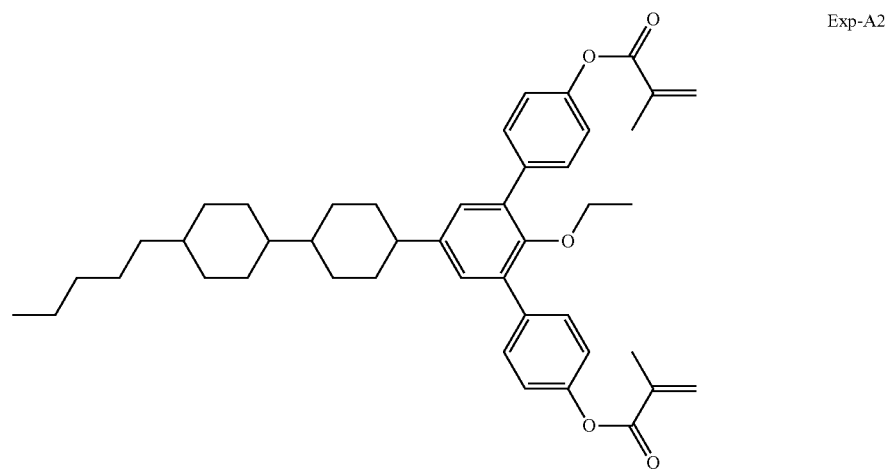

Exp-A2

TABLE 1-continued
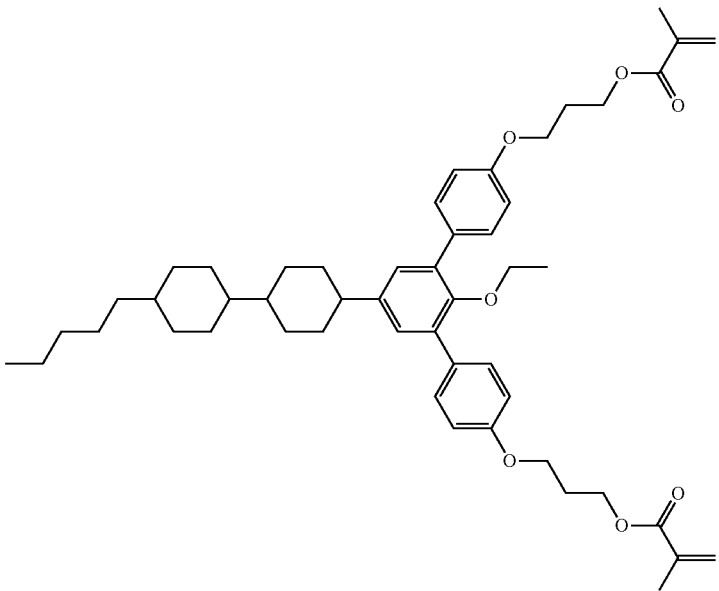 [SMILES: C=C(C)C(=O)OCCCOc1ccc(-c2cc(C3CCC(C4CCC(CCCCC)CC4)CC3)cc(-c3ccc(OCCCOC(=O)C(=C)C)cc3)c2OCC)cc1]
Exp-A3
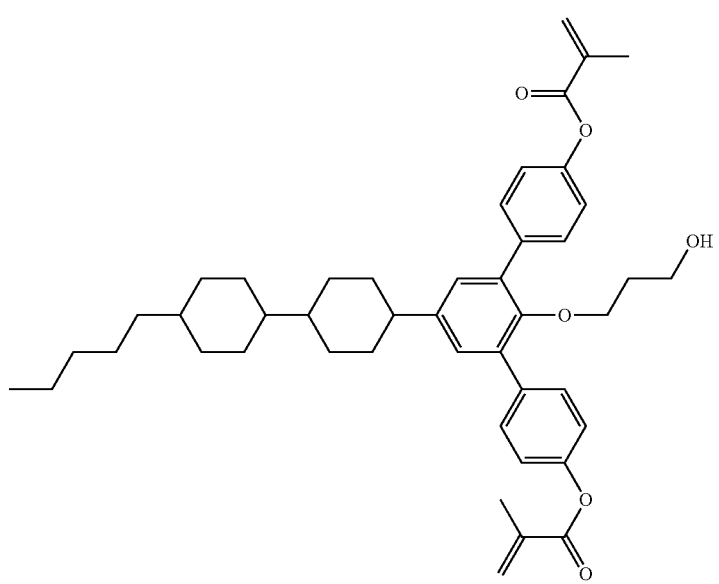 [SMILES: C=C(C)C(=O)Oc1ccc(-c2cc(C3CCC(C4CCC(CCCCC)CC4)CC3)cc(-c3ccc(OC(=O)C(=C)C)cc3)c2OCCCO)cc1]
Exp-A4

TABLE 1-continued
Exp-A5
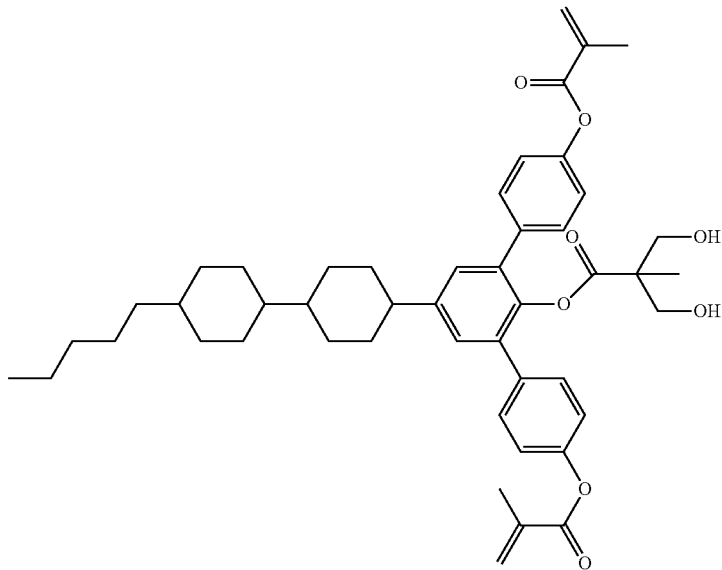 [SMILES: C=C(C)C(=O)Oc1ccc(-c2cc(C3CCC(C4CCC(CCCCC)CC4)CC3)cc(-c3ccc(OC(=O)C(=C)C)cc3)c2OC(=O)C(C)(CO)CO)cc1]
Exp-A6
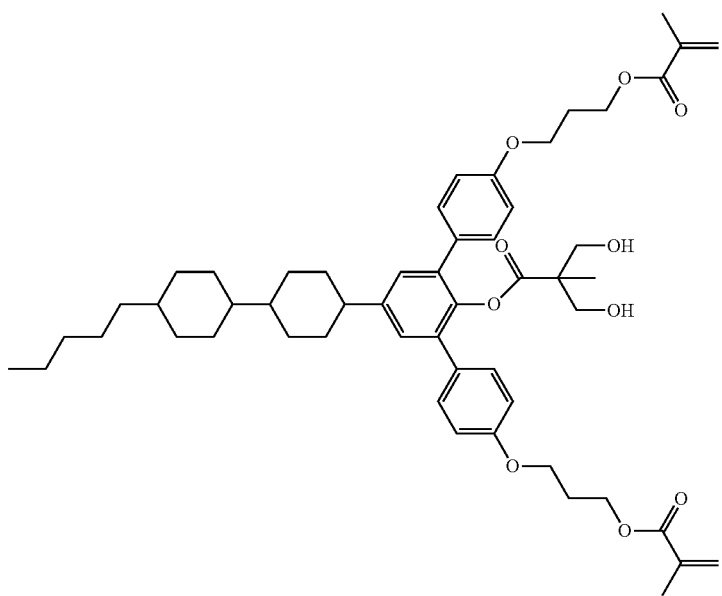 [SMILES: C=C(C)C(=O)OCCCOc1ccc(-c2cc(C3CCC(C4CCC(CCCCC)CC4)CC3)cc(-c3ccc(OCCCOC(=O)C(=C)C)cc3)c2OC(=O)C(C)(CO)CO)cc1]

TABLE 1-continued
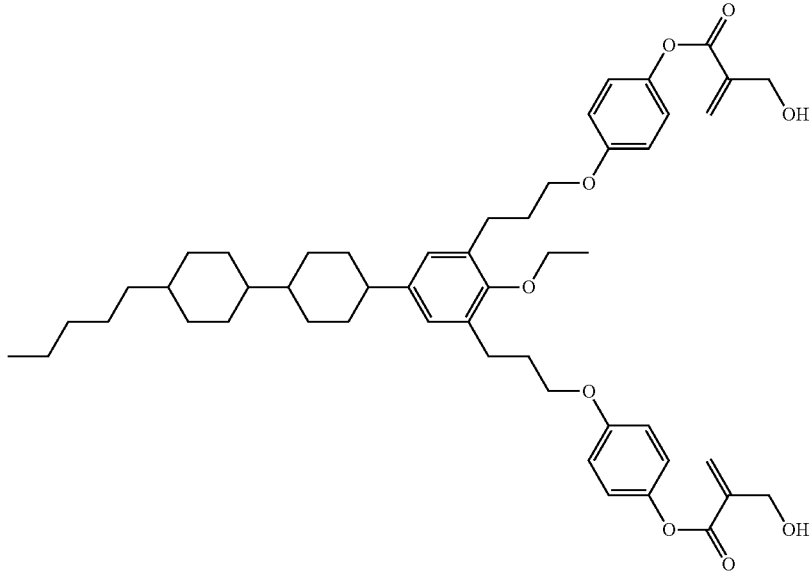 [SMILES: C=C(CO)C(=O)Oc1ccc(OCCCc2cc(C3CCC(C4CCC(CCCCC)CC4)CC3)cc(CCCOc3ccc(OC(=O)C(=C)CO)cc3)c2OCC)cc1]
Exp-A7
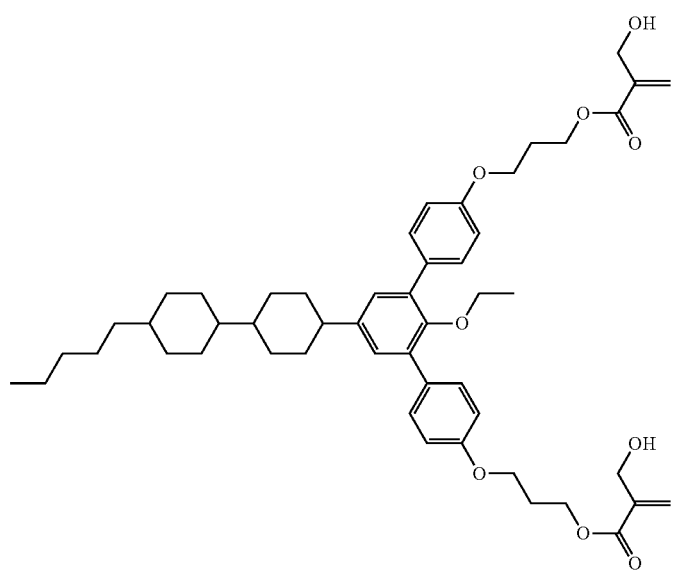 [SMILES: C=C(CO)C(=O)OCCCOc1ccc(-c2cc(C3CCC(C4CCC(CCCCC)CC4)CC3)cc(-c3ccc(OCCCOC(=O)C(=C)CO)cc3)c2OCC)cc1]
Exp-A8

TABLE 1-continued
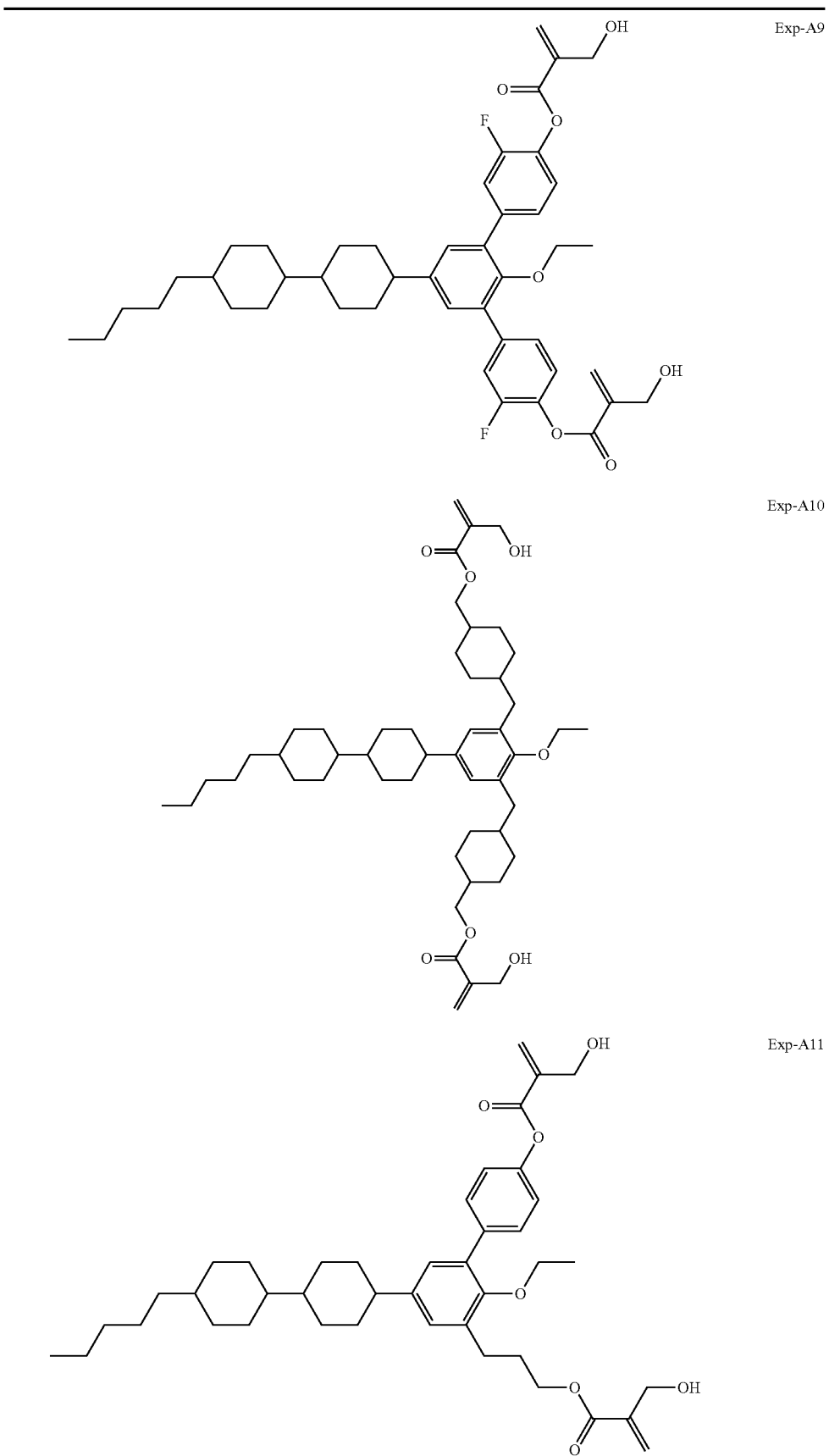

TABLE 1-continued
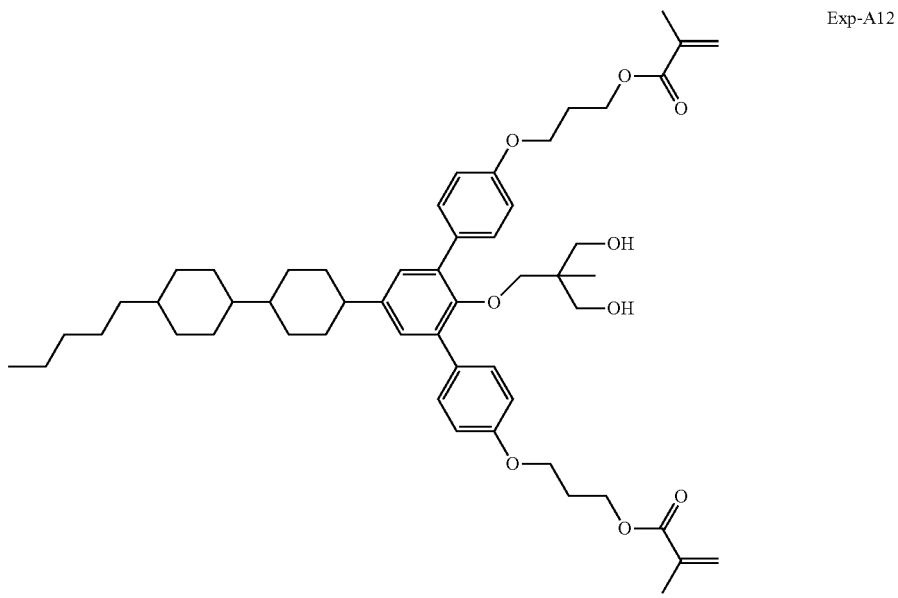
Exp-A12
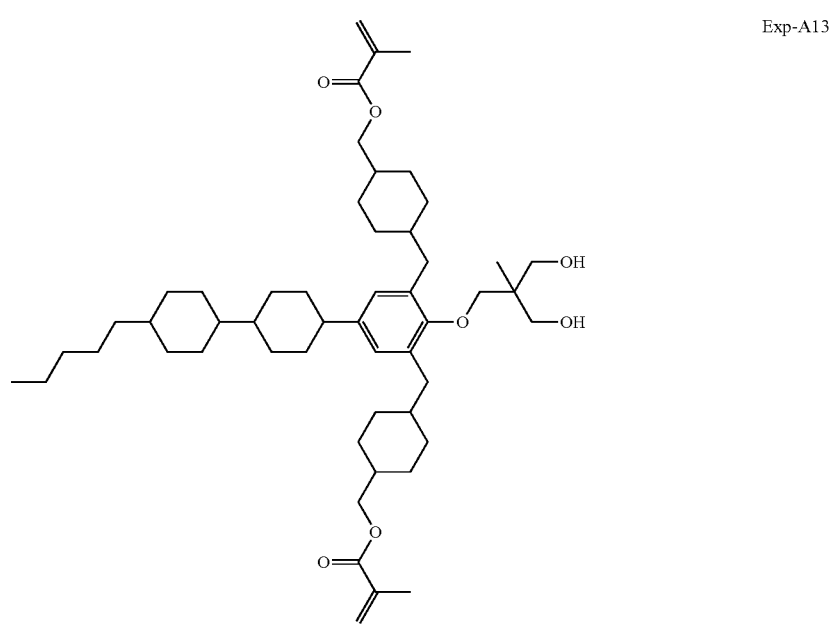
Exp-A13

TABLE 1-continued
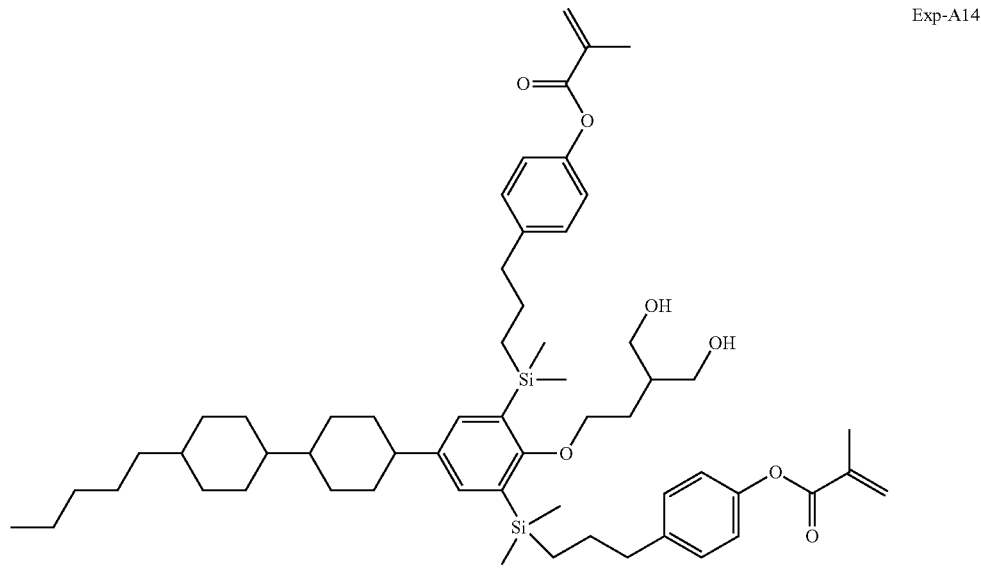
Exp-A14
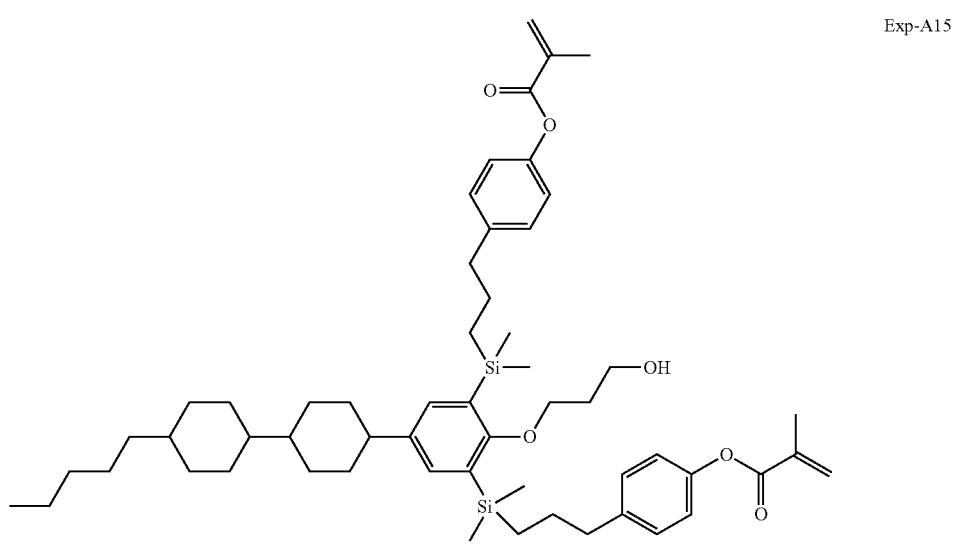
Exp-A15

TABLE 1-continued
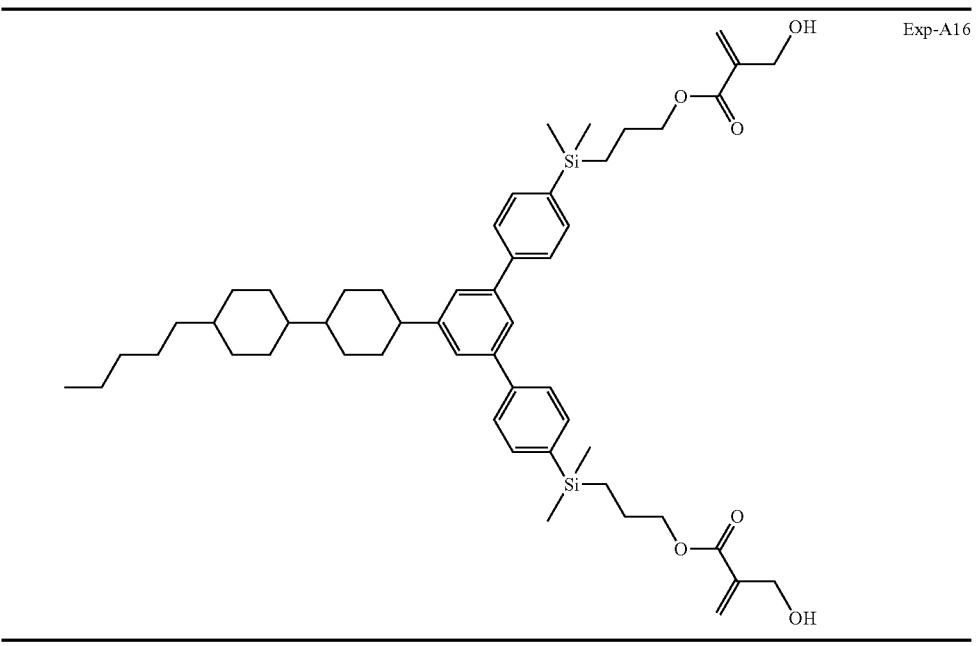
Exp-A16
TABLE 2
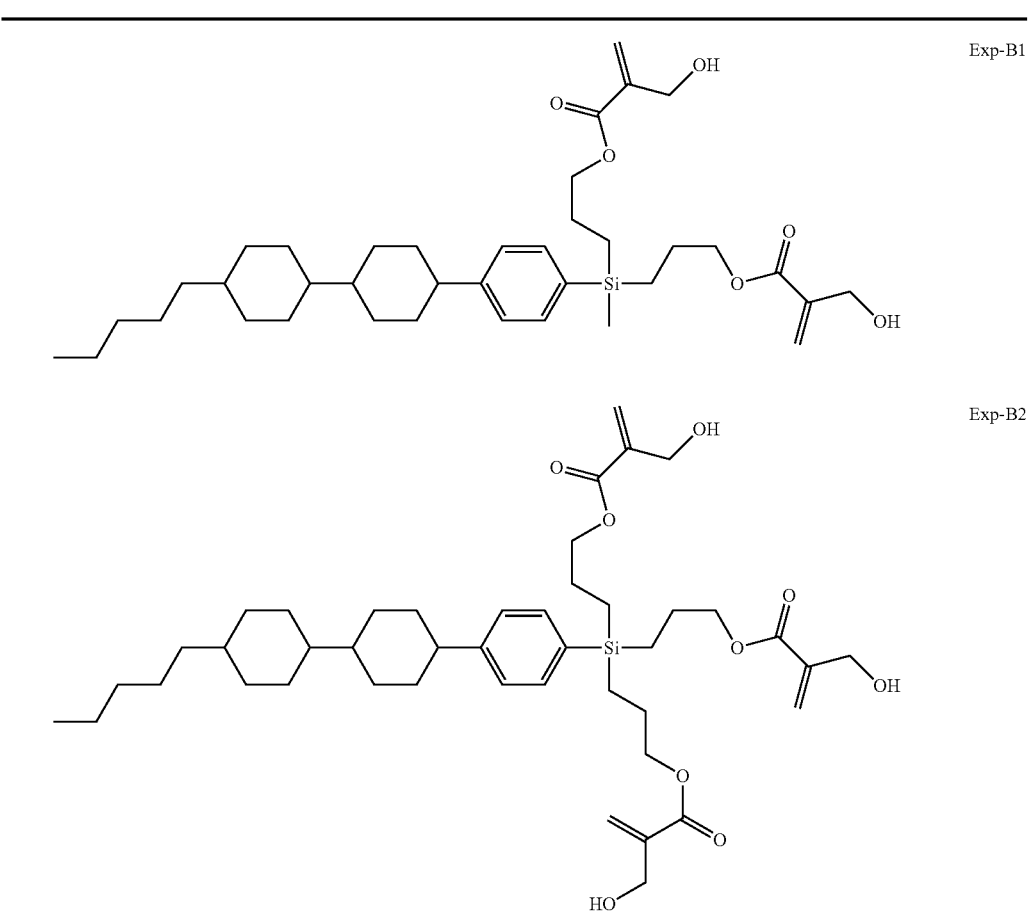
Exp-B1
Exp-B2

TABLE 2-continued
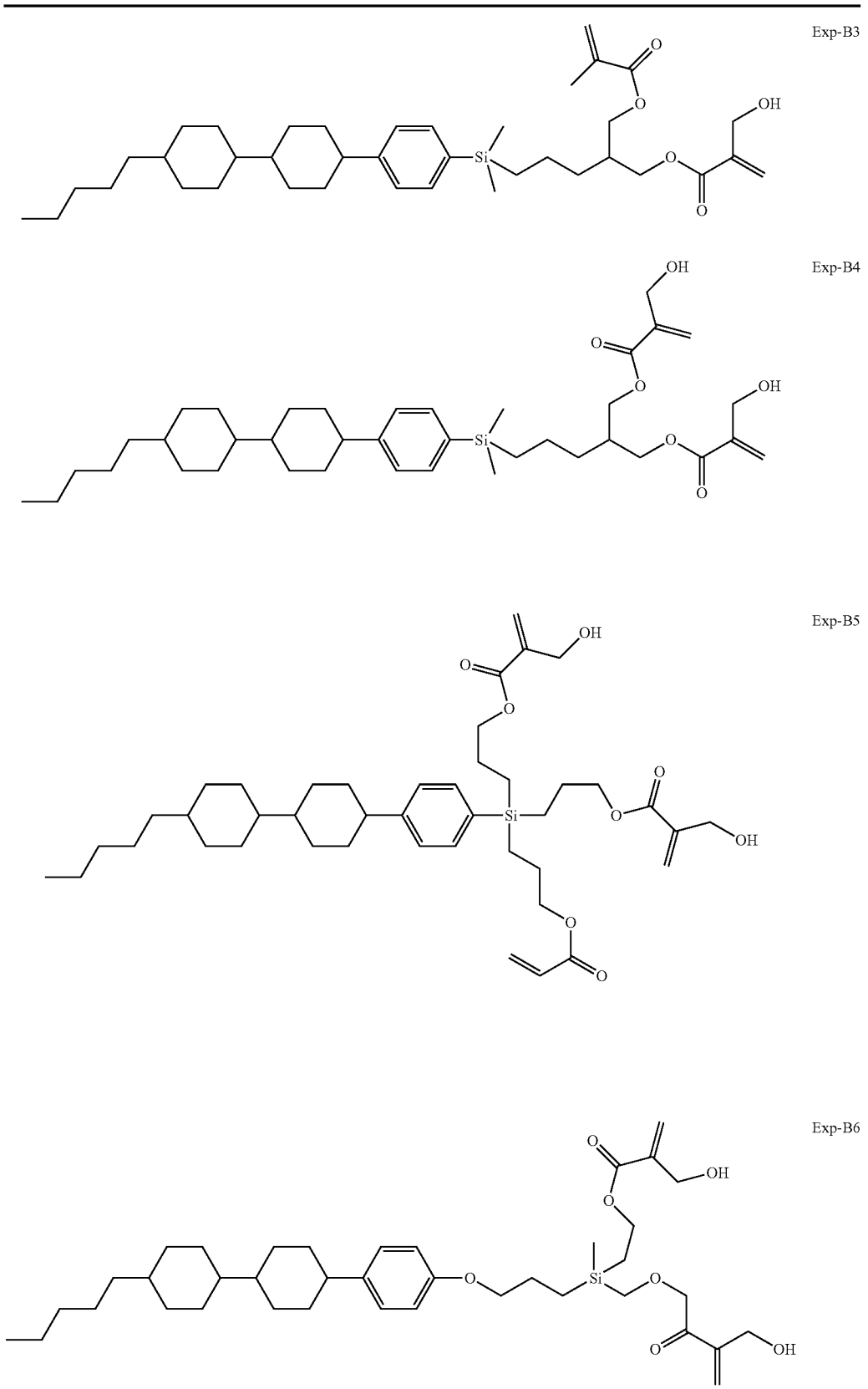

TABLE 2-continued
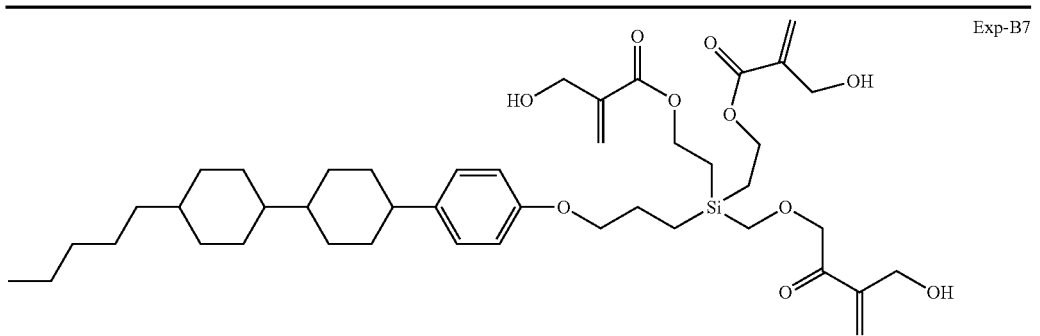
Exp-B7
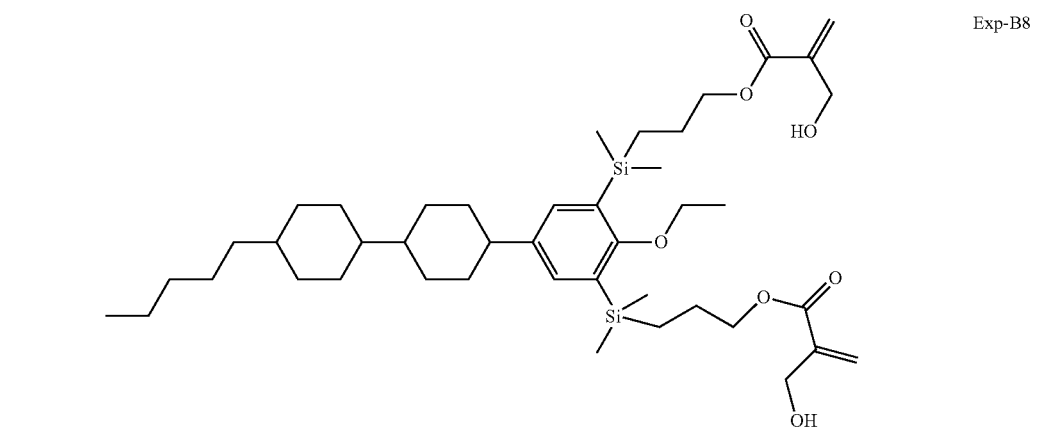
Exp-B8
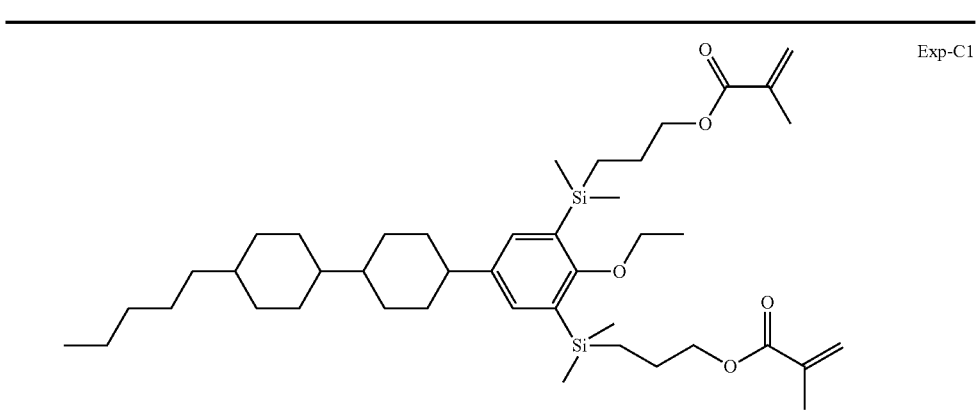
Exp-C1
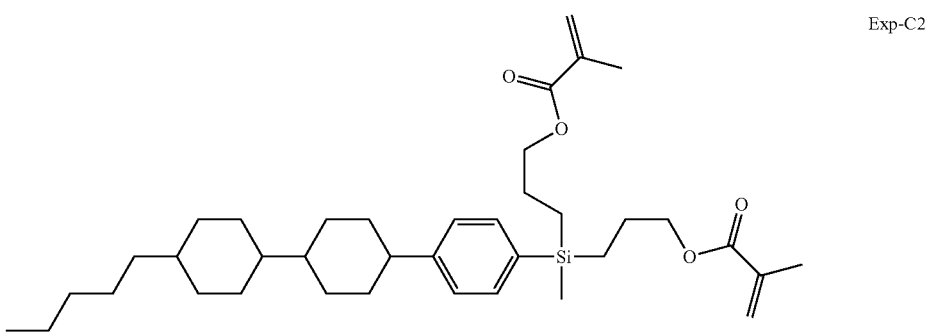
Exp-C2

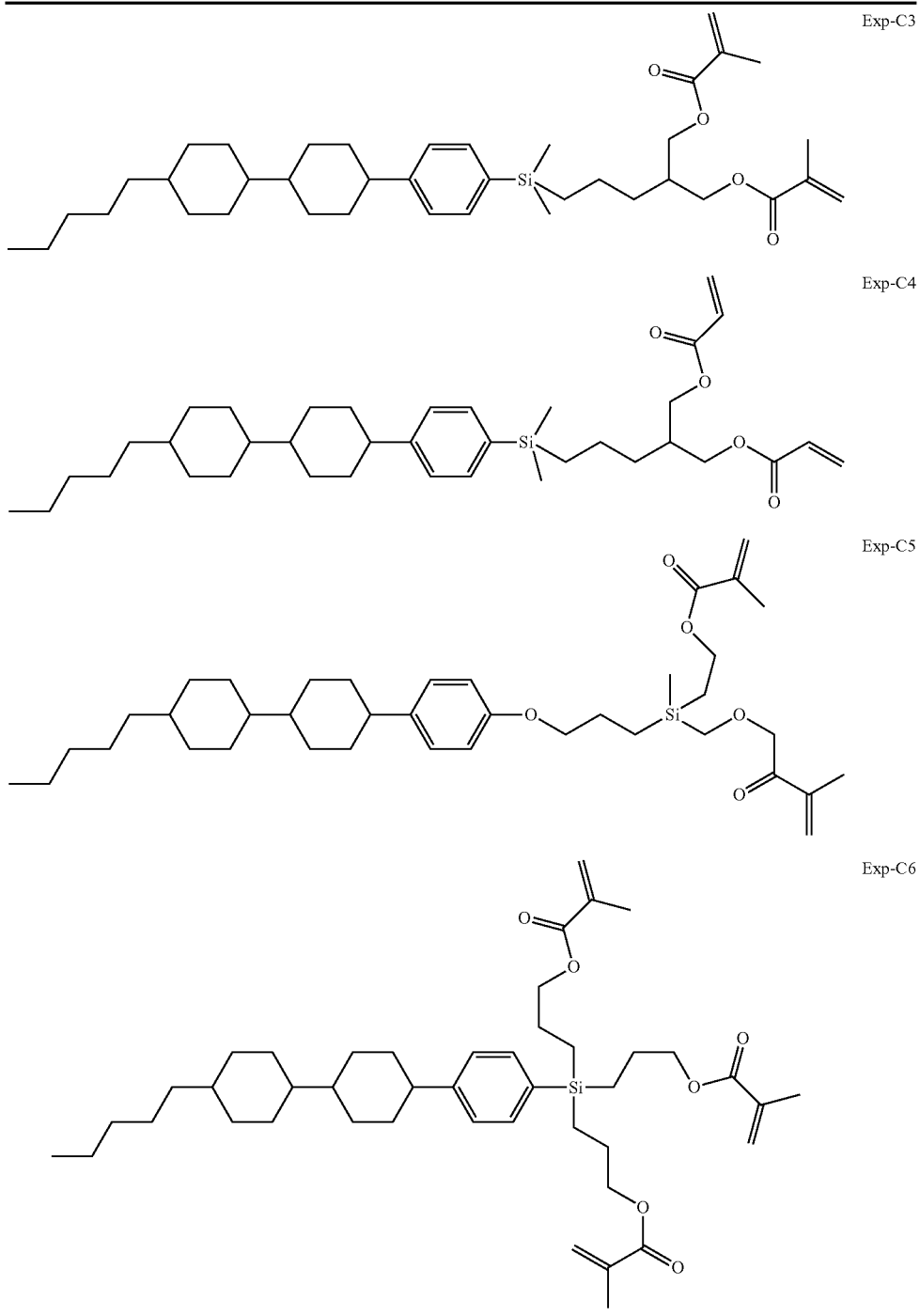

Referring to Table 1, in the first additive molecule, the rightmost cyclic functional group of the main chain of the molecule include a side chain functional group at its opposite sides, respectively. Each of these side chain functional groups includes at least one cyclic functional group and at least one polymerizable group. Therefore, the first additive molecule can form the above-mentioned network structure with adjacent additive molecules (for example, the first additive molecule, the second additive molecule, and/or the third additive molecule). Furthermore, in the formed network structure, the distance between adjacent additive molecules is fixed and uniform. As a result, the stability of the alignment ability of the liquid-crystal molecules can be greatly improved.

Referring to Table 2, in the second additive molecule, the functional group at the end of the molecular main chain includes a polymerizable group and an anchoring group. The second additive molecule can be adsorbed (or fixed) on the substrate in such a manner that the first axial direction is perpendicular to the top surface of the substrate, thereby obtaining good vertical alignment ability. Furthermore, a plurality of second additive molecules that are perpendicular to the substrate and arranged in parallel with each other can form the above-mentioned network structure with adjacent additive molecules (for example, the first additive molecule, the second additive molecule, and/or the third additive molecule). This network structure can further improve the degree of vertical alignment of the liquid-crystal molecules and improve the stability of the alignment ability.

Referring to Table 3, in the third additive molecule, the molecular side chain includes at least one polymerizable group. The third additive molecule may form the above-mentioned network structure with the adjacent additive molecule (for example, the first additive molecule, the second additive molecule, and/or the third additive molecule). As a result, the stability of the alignment ability can be further improved.

In some embodiments, the additive includes one or more first additive molecule. Therefore, this additive can have good stability of the alignment ability.

In some embodiments, the additive includes one or more first additive molecule and one or more second additive molecule. In such embodiments, the second additive molecule (or the first additive molecule) having an anchoring group may be vertically fixed on the substrate, and may be bonded to adjacent first additive molecules or second additive molecules to form the above-mentioned network structure. Therefore, this additive can have excellent vertical alignment ability and excellent stability of the alignment ability. In such embodiments, when the amount of the first additive molecule is set to 1 part by weight, the amount of the second additive molecule is 0.01-60 parts by weight. In other embodiments, when the amount of the first additive molecule is set to 1 part by weight, the amount of the second additive molecule is 0.02-40 parts by weight. In still other embodiments, when the amount of the first additive molecule is set to 1 part by weight, the amount of the second additive molecule is 0.05-20 parts by weight.

In some embodiments, the additive includes one or more first additive molecule and one or more third additive molecule. In such embodiments, the first additive molecule having an anchoring group may be vertically fixed on the substrate, and may be bonded to adjacent first additive molecules or third additive molecules to form the above-mentioned network structure. Therefore, this additive can have excellent vertical alignment ability and excellent stability of the alignment ability. In such embodiments, when the amount of the first additive molecule is set to 1 part by weight, the amount of the third additive molecule is 0.01-80 parts by weight. In other embodiments, when the amount of the first additive molecule is set to 1 part by weight, the amount of the third additive molecule is 0.05-70 parts by weight. In still other embodiments, when the amount of the first additive molecule is set to 1 part by weight, the amount of the third additive molecule is 0.07-60 parts by weight.

In some embodiments, the additive includes one or more first additive molecule, one or more second additive molecule, and one or more third additive molecule. In such embodiments, the second additive molecule (or the first additive molecule) having an anchoring group may be vertically fixed on the substrate, and may be bonded to adjacent first additive molecules, second additive molecules, or third additive molecules to form the above-mentioned network structure. Therefore, this additive can have excellent vertical alignment ability and excellent stability of the alignment ability. In such embodiments, when the amount of the first additive molecule is set to 1 part by weight, the amount of the second additive molecule is 0.01-60 parts by weigh, and the amount of the third additive molecule is 0.01-80 parts by weight. In other embodiments, when the amount of the first additive molecule is set to 1 part by weight, the amount of the second additive molecule is 0.03-45 parts by weigh, and the amount of the third additive molecule is 0.04-65 parts by weight. In still other embodiments, when the amount of the first additive molecule is set to 1 part by weight, the amount of the second additive molecule is 0.06-25 parts by weigh, and the amount of the third additive molecule is 0.06-55 parts by weight.

In other embodiments, a liquid-crystal composition is provided. The liquid-crystal composition includes a first component and a second component. The first component includes at least one additive as mentioned above, and the second component includes at least one compound represented by formula (II):

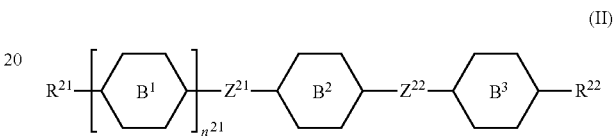

(II)

wherein each of $R^{21}$ and $R^{22}$ independently represents hydrogen, halogen, a $C_1$-$C_{15}$ alkyl group, or a $C_2$-$C_{15}$ alkenyl group, wherein the $C_1$-$C_{15}$ alkyl group or the $C_2$-$C_{15}$ alkenyl group is unsubstituted or at least one hydrogen atom of the $C_1$-$C_{15}$ alkyl group or the $C_2$-$C_{15}$ alkenyl group is substituted by a halogen atom, and/or at least one —$CH_2$— of the $C_1$-$C_{15}$ alkyl group or the $C_2$-$C_{15}$ alkenyl group is substituted by —O—, and wherein the —O— does not directly bond to another —O—;

each of $B^1$, $B^2$, and $B^3$ independently represents a 1,4-phenylene group, a 1,4-cyclohexylene group, a benzofuran-2,5-diyl group, a 1,3-dioxane-2,5-diyl group, a tetrahydropyran-2,5-diyl group, a divalent dioxabicyclo[2.2.2]octylene group, a divalent trioxabicyclo[2.2.2]octylene group, a tetrahydronaphthalene-2,6-diyl group, or an indane-2,5-diyl group, wherein the 1,4-phenylene group, the 1,4-cyclohexylene group, the 1,3-dioxane-2,5-diyl group, the benzofuran-2,5-diyl group, the tetrahydronaphthalene-2,6-diyl group, the indane-2,5-diyl group, or the tetrahydropyran-2,5-diyl group is unsubstituted or at least one hydrogen atom of the 1,4-phenylene group, the 1,4-cyclohexylene group, the 1,3-dioxane-2,5-diyl group, the benzofuran-2,5-diyl group, the tetrahydronaphthalene-2,6-diyl group, the indane-2,5-diyl group, or the tetrahydropyran-2,5-diyl group is substituted by a halogen atom or a —CN group, and/or at least one —$CH_2$— of the 1,4-phenylene group, the 1,4-cyclohexylene group, the 1,3-dioxane-2,5-diyl group, the benzofuran-2,5-diyl group, the tetrahydronaphthalene-2,6-diyl group, the indane-2,5-diyl group, or the tetrahydropyran-2,5-diyl group is substituted by —O—, —N— or —S—, and wherein the —O—, —N—, and —S— do not directly bond to one another;

each of $Z^{21}$ and $Z^{22}$ independently represents a single bond, a $C_1$-$C_4$ alkylene group, a $C_2$-$C_4$ alkenylene group, or a $C_2$-$C_4$ alkynylene group, wherein the $C_1$-$C_4$ alkylene group, the $C_2$-$C_4$ alkenylene group, or the $C_2$-$C_4$ alkynylene group is unsubstituted or at least one hydrogen atom of the $C_1$-$C_4$ alkylene group, the $C_2$-$C_4$ alkenylene group, or the $C_2$-$C_4$ alkynylene group is substituted by a halogen atom or a —CN group, and/or at least one —$CH_2$— of the $C_1$-$C_4$ alkylene group, the $C_2$-$C_4$ alkenylene group, or the $C_2$-$C_4$ alkynylene group is substituted by —O— or —S—, and wherein the —O— does not directly bond to —O— or —S—, and —S— does not directly bond to —S—; and $n^{21}$ represents 0, 1, or 2, and when $n^{21}$ represents 2, the two $B^1$ groups are identical to each other or different from each other.

In accordance with some embodiments, the above-mentioned second component includes at least one compound represented by formula (II-1) or formula (II-2):

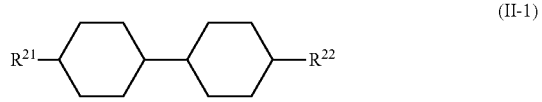

(II-1)

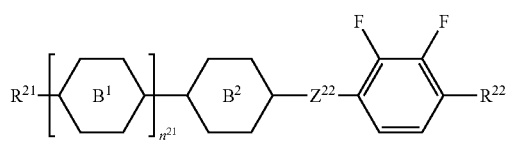

(II-2)

wherein the definitions of $R^{21}$, $R^{22}$, $B^1$, $B^2$, $Z^{22}$, and $n^{21}$ are respectively the same as the definitions of $R^{21}$, $R^{22}$, $B^1$, $B^2$, $Z^{22}$, and $n^{21}$ defined in the previous paragraphs.

Because the cyclic group of the compound represented by formula (II-1) has no fluorine atom, the viscosity of the liquid-crystal composition can be lowered, and the response speed of the liquid-crystal molecules can be improved when a voltage is applied. The compound represented by formula (II-2) includes at least one phenylene group, and two hydrogen atoms on the same side of this phenylene group are substituted by fluorine atoms. The compound of formula (II-2) can be used to adjust the dielectric anisotropy (A e) of the liquid-crystal composition.

In accordance with some embodiments, the above-mentioned liquid-crystal composition further includes a third component, and the third component includes at least one compound represented by formula (III), formula (IV), or formula (V):

alkylene group, a $C_2$-$C_{15}$ linear alkenylene group, or a $C_3$-$C_{15}$ branched alkenylene group, wherein the $C_1$-$C_{15}$ linear alkylene group, the $C_3$-$C_{15}$ branched alkylene group, the $C_2$-$C_{15}$ linear alkenylene group, or the $C_3$-$C_{15}$ branched alkenylene group is unsubstituted or at least one hydrogen atom of the $C_1$-$C_{15}$ linear alkylene group, the $C_3$-$C_{15}$ branched alkylene group, the $C_2$-$C_{15}$ linear alkenylene group, or the $C_3$-$C_{15}$ branched alkenylene group is substituted by a halogen atom, and/or at least one —CH$_2$— of the $C_1$-$C_{15}$ linear alkylene group, the $C_3$-$C_{15}$ branched alkylene group, the $C_2$-$C_{15}$ linear alkenylene group, or the $C_3$-$C_{15}$ branched alkenylene group is substituted by —O—, —CO—, —COO—, or —OCO—, and wherein the —O—, —CO—, —COO—, and —OCO— do not directly bond to one another;

each of $Z^{25}$, $Z^{26}$, $Z^{27}$, and $Z^{28}$ independently represents a single bond, —C≡C—, a $C_1$-$C_{15}$ linear alkylene group, a $C_3$-$C_{15}$ branched alkylene group, a $C_2$-$C_{15}$ linear alkenylene group, or a $C_3$-$C_{15}$ branched alkenylene group, wherein the $C_1$-$C_{15}$ linear alkylene group, the $C_3$-$C_{15}$ branched alkylene group, the $C_2$-$C_{15}$ linear alkenylene group, or the $C_3$-$C_{15}$ branched alkenylene group is unsubstituted or at least one hydrogen atom of the $C_1$-$C_{15}$ linear alkylene group, the $C_3$-$C_{15}$ branched alkylene group, the $C_2$-$C_{15}$ linear alkenylene group, or the $C_3$-$C_{15}$ branched alkenylene group is substituted by a halogen atom, and/or at least one —CH$_2$— of the $C_1$-$C_{15}$ linear alkylene group, the $C_3$-$C_{15}$ branched alkylene group, the $C_2$-$C_{15}$ linear alkenylene group, or the $C_3$-$C_{15}$ branched alkenylene group is substituted by —SiR$^e_2$—, —S—, —O—, —CO—, —COO—, —OCO—, —CO—NR$^e$—, or —NR$^e$—CO—, and the —SiR$^e_2$—, —S—, —O—, —CO—, —COO—, —OCO—, —CO—NR$^e$—, and —NR$^e$—CO— do not directly bond to one another, wherein R$^e$ represents hydrogen, a $C_1$-$C_4$ linear alkyl group, or a $C_3$-$C_4$ branched alkyl group, and the two R$^e$ groups bonded to the same Si atom are identical to each other or different from each other;

each of $B^4$, $B^5$, $B^6$ and $B^7$ independently represents a 1,4-phenylene group, a 1,4-cyclohexylene group, a benzofuran-2,5-diyl group, a 1,3-dioxane-2,5-diyl group, a tetra-

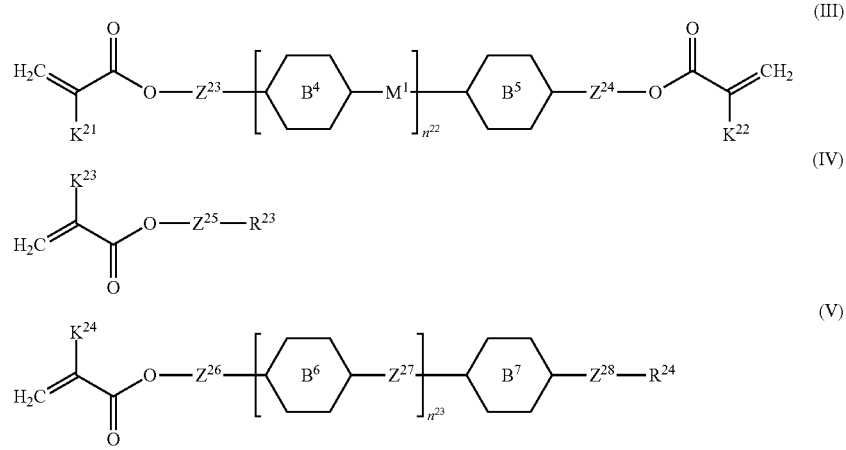

wherein each of $K^{21}$, $K^{22}$, $K^{23}$, and $K^{24}$ independently represents hydrogen or a methyl group;

each of $Z^{23}$ and $Z^{24}$ independently represents a single bond, a $C_1$-$C_{15}$ linear alkylene group, a $C_3$-$C_{15}$ branched hydropyran-2,5-diyl group, a divalent dioxabicyclo[2.2.2]octylene group, a divalent trioxabicyclo[2.2.2]octylene group, a tetrahydronaphthalene-2,6-diyl group, or an indane-2,5-diyl group, wherein the 1,4-phenylene group, the 1,4-cyclohexylene group, the benzofuran-2,5-diyl group, the 1,3-dioxane-2,5-diyl group, the tetrahydropyran-2,5-diyl group, the divalent dioxabicyclo[2.2.2]octylene group, the divalent trioxabicyclo[2.2.2]octylene group, the tetrahydronaphthalene-2,6-diyl group, or the indane-2,5-diyl group is unsubstituted or is substituted by at least one substituent, wherein the at least one substituent is selected from fluorine, chlorine, a —CN group, a $C_1$-$C_{12}$ linear alkyl group, a $C_3$-$C_{12}$ branched alkyl group, a $C_2$-$C_{12}$ linear alkenyl group, a $C_2$-$C_{12}$ linear alkynyl group, a $C_4$-$C_{12}$ branched alkenyl group, or a $C_4$-$C_{12}$ branched alkynyl group, wherein the $C_1$-$C_{12}$ linear alkyl group, the $C_3$-$C_{12}$ branched alkyl group, the $C_2$-$C_{12}$ linear alkenyl group, the $C_2$-$C_{12}$ linear alkynyl group, the $C_4$-$C_{12}$ branched alkenyl group, or the $C_4$-$C_{12}$ branched alkynyl group is unsubstituted or at least one hydrogen atom of the $C_1$-$C_{12}$ linear alkyl group, the $C_3$-$C_{12}$ branched alkyl group, the $C_2$-$C_{12}$ linear alkenyl group, the $C_2$-$C_{12}$ linear alkynyl group, the $C_4$-$C_{12}$ branched alkenyl group, or the $C_4$-$C_{12}$ branched alkynyl group is substituted by a halogen atom, and/or at least one —$CH_2$— of the $C_1$-$C_{12}$ linear alkyl group, the $C_3$-$C_{12}$ branched alkyl group, the $C_2$-$C_{12}$ linear alkenyl group, the $C_2$-$C_{12}$ linear alkynyl group, the $C_4$-$C_{12}$ branched alkenyl group, or the $C_4$-$C_{12}$ branched alkynyl group is substituted by —O—, —CO—, —COO—, or —OCO—, and the —O—, —CO—, —COO—, and —OCO— do not directly bond to one another;

$M^1$ represents a single bond, —$CH_2O$—, —$OCH_2$—, —$CH_2CH_2$—, —CH=CH—, —C≡C—, —$CH_2$—, —$C(CH_3)_2$—, —$C(CF_3)_2$—, —$SiH_2$—, —$Si(CH_3)_2$—, or —$Si(CF_3)_2$—;

each of $R^{23}$ and $R^{24}$ independently represents a $C_1$-$C_{30}$ linear alkyl group or a $C_3$-$C_{30}$ branched alkyl group, wherein the $C_1$-$C_{30}$ linear alkyl group or the $C_3$-$C_{30}$ branched alkyl group is unsubstituted or at least one hydrogen atom of the $C_1$-$C_{30}$ linear alkyl group or the $C_3$-$C_{30}$ branched alkyl group is substituted by a halogen atom, and/or at least one —$CH_2$— of the $C_1$-$C_{30}$ linear alkyl group or the $C_3$-$C_{30}$ branched alkyl group is substituted by —Si—, —O—, —CO—, —COO—, or —OCO—, and the —Si—, —O—, —CO—, —COO—, and —OCO— do not directly bond to one another; and each of $n^{22}$ and $n^{23}$ independently represents an integer of 0 to 3, and when $n^{22}$ is 2 or more, the two or more $B^4$ groups are identical to each other or different from each other, and the two or more $M^1$ groups are identical to each other or different from each other; and when $n^{23}$ is 2 or more, the two or more $B^6$ groups are identical to each other or different from each other, and the two or more $Z^{27}$ groups are identical to each other or different from each other.

The compound of the third component includes at least one polymerizable group, and the polymerizable group may include an acrylic group, a methacrylic group, or a derivative thereof. More specifically, each of the compounds represented by formula (IV) and formula (V) has a polymerizable group at one end of the molecule. Each of the compounds represented by formula (III) has a polymerizable group at both ends of the molecule. By irradiation or heating, the polymerizable group of the third component may undergo the polymerization reaction with another polymerizable group of the above-mentioned additive molecules represented by formula (I). In this way, it is helpful to form the above-mentioned network, and the degree of vertical alignment of the liquid-crystal molecules can be further improved.

If the content of the first component is too low, the degree of vertical alignment and the voltage holding ratio of the liquid-crystal composition may not be effectively improved. On the contrary, if the content of the first component is too high, the first component may not dissolve well in the liquid-crystal composition, and it may precipitate. Such a liquid-crystal composition cannot be used. Furthermore, when the first component exceeds the specific content, even if the first component is further increased, the degree of vertical alignment of the liquid-crystal composition cannot be further improved. Furthermore, the first component has the group (for example, an anchoring group) having a relatively high polarity. Therefore, if the content of the first component is too high, the voltage holding ratio of the liquid-crystal composition may be lowered. As described above, in order to balance the degree of vertical alignment and the voltage holding ratio of the liquid-crystal composition, the content of the first component may be controlled within an appropriate range.

In some embodiments, the liquid-crystal composition includes a first component and a second component. In such embodiments, when the total weight of the second component is 100 parts by weight, the first component is 0.01-10 parts by weight. In other embodiments, when the total weight of the second component is 100 parts by weight, the first component is 0.05-6 parts by weight. In still other embodiments, when the total weight of the second component is 100 parts by weight, the first component is 0.1-4 parts by weight.

In some embodiments, the liquid-crystal composition includes a first component, a second component, and a third component. In such embodiments, when the total weight of the second component is 100 parts by weight, the first component is 0.01-10 parts by weight, and the third component is 0.01-10 parts by weight. In other embodiments, when the total weight of the second component is 100 parts by weight, the first component is 0.04-5 parts by weight, and the third component is 0.04-4 parts by weight. In still other embodiments, when the total weight of the second component is 100 parts by weight, the first component is 0.07-3.5 parts by weight, and the third component is 0.07-2.5 parts by weight.

For those skilled in the art, it should be understood that the liquid-crystal composition may further include other components other than the above-mentioned first component, second component, and third component. For example, other conventional liquid-crystal compounds or other additives in appropriate amounts. In some embodiments, the above-mentioned other additives may include, for example, chiral dopants, UV stabilizers, antioxidants, free radical scavengers, nanoparticles, and so on.

In the present disclosure, a liquid-crystal display device using the above-mentioned liquid-crystal composition is also provided. The FIGURE is a cross-sectional view showing a liquid-crystal display device 100 in accordance with some embodiments of the present disclosure.

Referring to the FIGURE, the liquid-crystal display device 100 includes a first substrate 110 and a second substrate 120 disposed opposite to the first substrate 110. The liquid-crystal display device 100 also includes a liquid-crystal layer 130 disposed between the first substrate 110 and the second substrate 120. The first substrate 110 and the second substrate 120 are respectively a conventional thin film transistor substrate and a conventional color filter substrate. In order to simplify the description, the materials, structures, and manufacturing methods of the first substrate 110 and the second substrate 120 will not be described in detail herein.

The liquid-crystal layer 130 of the liquid-crystal display device 100 of the present disclosure uses the above-mentioned liquid-crystal composition, and the liquid-crystal composition includes the additive represented by formula (I) and/or formula (I-1) (i.e., the additive includes the first additive molecule, the second additive molecule, and/or the third additive molecule). As described above, such an additive can greatly improve the degree of vertical alignment, the voltage holding ratio, and the stability of the alignment ability of the liquid-crystal composition. By adding the above-mentioned additive to the liquid-crystal composition, the liquid-crystal molecules can be vertically aligned well without using a conventional alignment film. On the other hand, the liquid-crystal display device 100 using the above-mentioned additive has the advantages of high voltage holding ratio and good durability. The liquid-crystal composition of the present disclosure can be applied to all kinds of liquid-crystal display devices.

In order to further simplify and clarify the foregoing contents and other objects, characteristics, and merits of the present disclosure, a few examples are given to explain the additives and the liquid-crystal compositions of the present disclosure. The chemical structures and contents corresponding to the compounds of the second component and the third component used in the liquid-crystal compositions of the Examples are shown in Table 4 below. The additive molecules of the Reference Examples are shown in Table 5 below.

TABLE 4

| | Chemical structure | Content (wt %) |
|---|---|---|
| formula (II) formula (II-1) | $C_3H_7$—⬡—⬡—$C_2H_5$ | 10 |
| | $C_3H_7$—⬡—⬡—$C_4H_9$ | 5 |
| | $C_3H_7$—⬡—⬡—$C_5H_{11}$ | 12 |
| | ⬡—⬡—CH=CH— | 14 |
| formula (II-2) | $C_3H_7$—⬡—⬠(F,F)—$OC_2H_5$ | 10 |
| | $C_3H_7$—⬠—⬠(F,F)—$OC_2H_5$ | 19 |
| | $C_3H_7$—⬡—⬠—⬠(F,F)—$OC_2H_5$ | 15 |
| | $C_3H_7$—⬡—⬡—⬠(F,F)—$OC_2H_5$ | 15 |
| formula (III) | $H_2C{=}C(CH_3){-}C(O){-}O{-}⬠{-}⬠{-}O{-}C(O){-}C(CH_3){=}CH_2$ | 0.3 |

TABLE 5

| No. | Chemical structure |
|---|---|
| Ref | 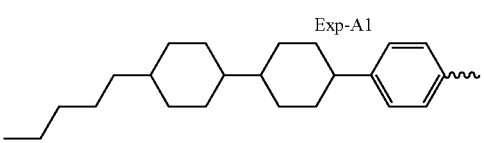 |

The synthesis methods of the additive molecules of the Examples and the Reference Examples are described as follows.

Preparation Example 1 Preparing the Additive Molecule Exp-A1

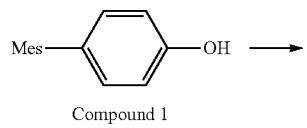

Compound 1

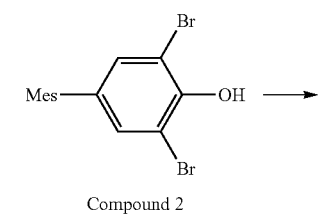

Compound 2

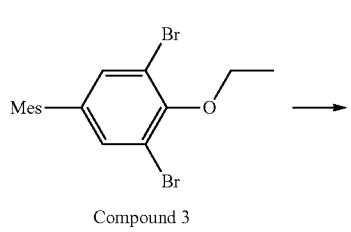

Compound 3

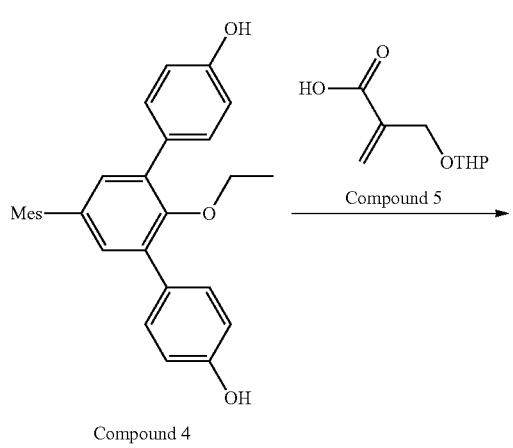

Compound 4        Compound 5

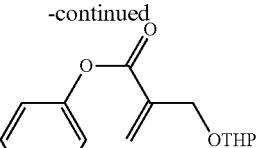

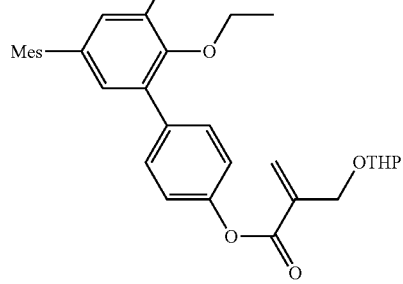

Compound 6

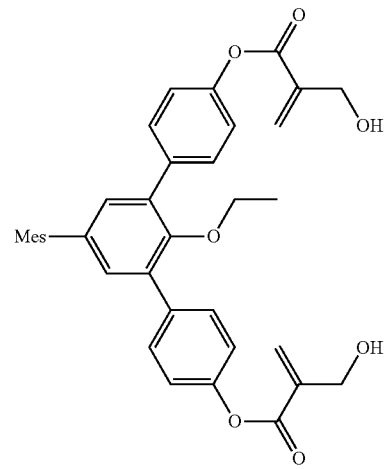

Exp-A1

Mes: 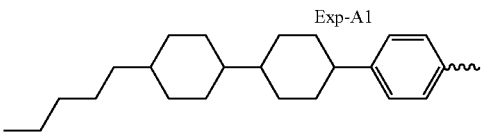

The synthesis flow of the additive molecule Exp-A1 is shown above. Compound 1 (30 g, 91.3 mmol), diisopropylamine (1.3 g, 12.8 mmol), N-bromosuccinimide (NBS, 33.3 g, 187.2 mmol), and dichloromethane (400 mL) were placed in a 1000 mL reaction flask and stirred to dissolve. The reaction was carried out at room temperature (20-30° C.) for 6 hours. After the reaction was completed, water was added. Then, an extraction was performed by using dichloromethane and water, and the organic phase was collected. The solvent of the collected organic phase was removed by using a rotary concentrator. Then, column chromatography was performed to obtain Compound 2.

Sodium hydride (4.2 g, 173 mmol), dimethylformamide (DMF, 200 mL), and Compound 2 (24.0 g, 49.4 mmol) were placed in a 500 mL double-necked round bottom flask and stirred for 30 minutes. Then, iodoethane (23.1 g, 148.1 mmol) was added at 0° C., and the reaction was carried out at 100° C. for 8 hours. After the reaction was completed, water was added. Then, an extraction was performed by using ethyl acetate and water, and the organic phase was collected. The solvent of the collected organic phase was removed by using a rotary concentrator. Then, column chromatography was performed to obtain Compound 3.

Compound 3 (8.0 g, 15.6 mmol), 4-hydroxyphenylboronic acid (5.4 g, 38.9 mmol), tetrahydrofuran (THF, 140 mL), water (30 mL), and potassium carbonate (17.2 g, 124.5 mmol) were placed in a 500 mL reaction flask and stirred to dissolve. Deoxygenation was performed by introducing nitrogen for 30 minutes. Then, tetrakis(triphenylphosphine)palladium(0) (1.8 g, 1.6 mmol) was added, and the mixture was heated to reflux for 24 hours to carry out the reaction. After the reaction was completed, an extraction was performed by using ethyl acetate and water, and the organic phase was collected. The solvent of the collected organic phase was removed by using a rotary concentrator. Then, column chromatography was performed to obtain Compound 4.

Compound 4 (3.0 g, 5.6 mmol), Compound 5 (4.7 g, 25.0 mmol), 4-dimethylaminopyridine (DMAP, 0.68 g, 5.6 mmol), and tetrahydrofuran (40 mL) were placed in a 100 mL reaction flask and stirred to dissolve. Then, N,N'-dicyclohexylcarbodiimide (DCC, 3.0 g, 14.4 mmol) was added at 0° C., and the reaction was carried out at room temperature (20-30° C.) for 24 hours. After the reaction was completed, water was added. Then, an extraction was performed by using ethyl acetate and water, and the organic phase was collected. The solvent of the collected organic phase was removed by using a rotary concentrator. Then, column chromatography was performed to obtain Compound 6.

Compound 6 (1.8 g, 2.1 mmol), pyridinium p-toluenesulfonate (1.0 g, 4.1 mmol), methanol (40 mL), and tetrahydrofuran (40 mL) were placed in a 250 mL reaction flask and stirred to dissolve. The reaction was carried out at 50° C. for 10 hours. After the reaction was completed, water was added. Then, an extraction was performed by using ethyl acetate and water, and the organic phase was collected. The solvent of the collected organic phase was removed by using a rotary concentrator. Then, column chromatography was performed to obtain the additive molecule Exp-A1 (white solid).

The additive molecule Exp-A1 was analyzed by nuclear magnetic resonance spectroscopy, and the obtained spectral information was as follows: $^1$H NMR (CDCl$_3$, 400 MHz): δ 0.82-1.38 (m, 23H), 1.72-2.06 (m, 11H), 2.45-2.55 (m, 2H), 3.30 (q, J=7.2 Hz, 2H), 4.50 (s, 4H), 6.09 (s, 2H), 6.57 (s, 2H), 7.20-7.22 (m, 6H), 7.69 (d, J=8.8 Hz, 4H).

Preparation Example 2 Preparing the Additive Molecule Exp-A2

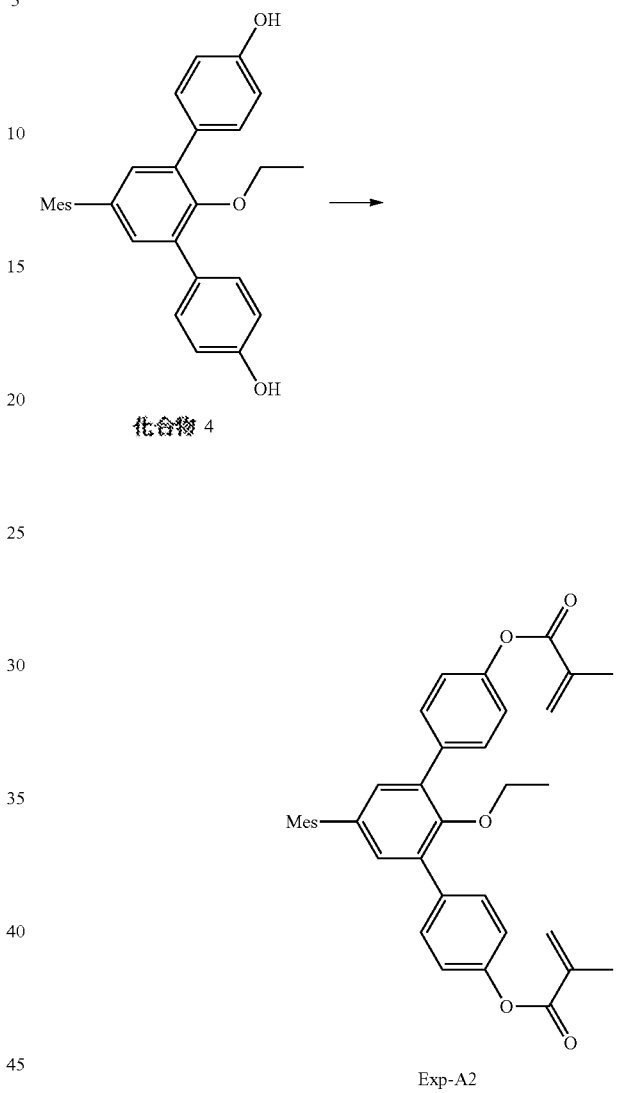

The synthesis flow of the additive molecule Exp-A2 is shown above. Compound 4 (3.0 g, 5.6 mmol), methacrylic acid (2.6 g, 30.6 mmol), 4-dimethylaminopyridine (0.68 g, 5.6 mmol), and tetrahydrofuran (100 mL) were placed in a 250 mL reaction flask and stirred to dissolve. Then, N,N'-dicyclohexylcarbodiimide (2.7 g, 13.3 mmol) was added at 0° C., and the reaction was carried out at room temperature (20-30° C.) for 24 hours. After the reaction was completed, water was added. Then, an extraction was performed by using ethyl acetate and water, and the organic phase was collected. The solvent of the collected organic phase was removed by using a rotary concentrator. Then, column chromatography was performed to obtain the additive molecule Exp-A2 (white solid).

The additive molecule Exp-A2 was analyzed by nuclear magnetic resonance spectroscopy, and the obtained spectral information was as follows: $^1$H NMR (CDCl$_3$, 400 MHz): δ 0.82-1.50 (m, 25H), 1.72-1.99 (m, 8H), 2.11 (s, 6H), 2.48-2.54 (m, 1H), 3.30 (q, J=6.8 Hz, 2H), 5.79 (s, 2H), 6.40 (s, 2H), 7.19-7.21 (m, 6H), 7.67 (d, J=8.8 Hz, 4H).

Preparation Example 3 Preparing the Additive Molecule Exp-A3

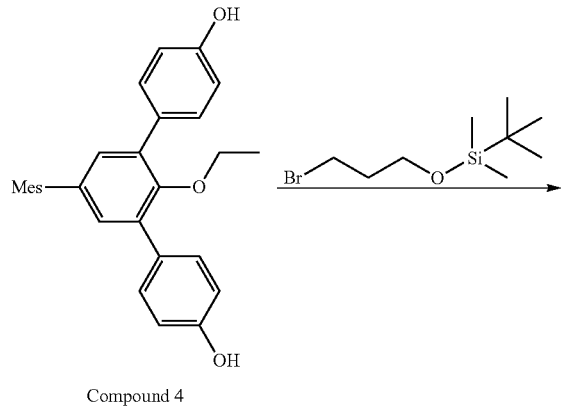

Compound 4

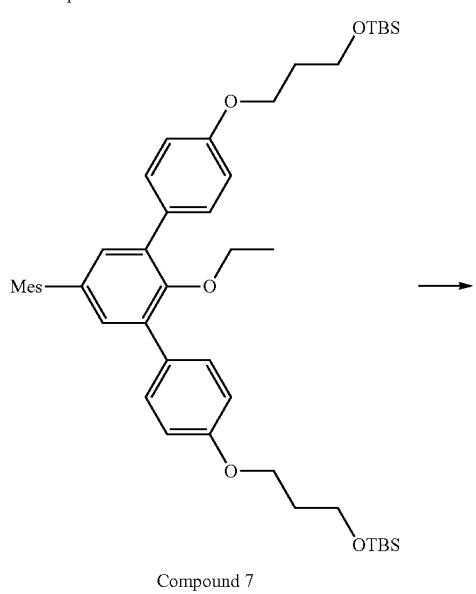

Compound 7

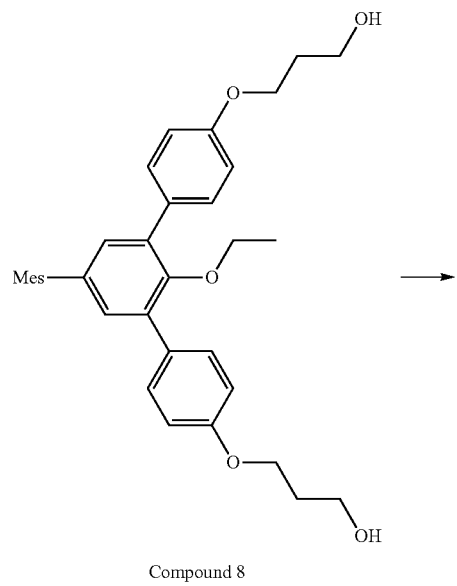

Compound 8

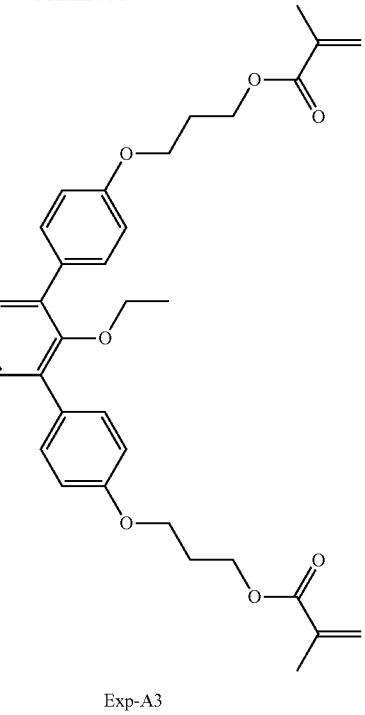

Exp-A3

The synthesis flow of the additive molecule Exp-A3 is shown above. Compound 4 (1.89 g, 3.5 mmol) and dimethylformamide (50 mL) were placed in a 250 mL reaction flask and dissolved. Then, sodium hydride (0.4 g, 16 mmol) was added under an ice bath, and the mixture was stirred at room temperature for 30 minutes. Next, (3-bromopropoxy)-tert-butyldimethylsilane (4.0 g, 16 mmol) was added, and the reaction was carried out at room temperature for 2 hours. After the reaction was completed, an extraction was performed by using ethyl acetate and water, and the mixture was dried by using magnesium sulfate. The organic phase was collected. The solvent of the collected organic phase was removed by using a rotary concentrator. Then, column chromatography was performed to obtain Compound 7 (clear oil).

Compound 7 (2.79 g, 3.2 mmol) and tetrahydrofuran (50 mL) were placed in a 250 mL reaction flask and dissolved and cooled to 0° C. Then, tetrabutylammonium fluoride solution (solvent: tetrahydrofuran; 1 M, 9.6 ml, 9.6 mmol) was slowly added, and the mixture was warmed to room temperature and stirred for 2 hours. After the reaction was completed, an extraction was performed by using ethyl acetate and water, and the mixture was dried by using magnesium sulfate. The organic phase was collected. The solvent of the collected organic phase was removed by using a rotary concentrator. Then, column chromatography was performed to obtain Compound 8 (white solid).

Compound 8 (1.97 g, 3 mmol), methacrylic acid (0.77 g, 9 mmol), 4-dimethylaminopyridine (0.21 g, 1.8 mmol), and tetrahydrofuran (50 mL) were placed in a 250 mL reaction flask and stirred to dissolve. Then, the temperature of the reaction flask was cooled to 0° C. Next, N,N'-dicyclohexylcarbodiimide (1.9 g, 9 mmol) was dissolved in tetrahydrofuran (20 mL) to form a solution, and the solution was slowly added dropwise to the reaction flask. The mixture was stirred at 0° C. for 30 minutes, and then, was warmed to room temperature and stirred for 8 hours. After the reaction was completed, an extraction was performed by using ethyl acetate and water, and the mixture was dried by using magnesium sulfate. The organic phase was collected. The solvent of the collected organic phase was removed by using a rotary concentrator. Then, column chromatography was performed to obtain the additive molecule Exp-A3 (white solid).

The additive molecule Exp-A3 was analyzed by nuclear magnetic resonance spectroscopy, and the obtained spectral information was as follows: $^1$H NMR (CDCl$_3$, 400 MHz): δ 0.82-1.48 (m, 32H), 1.75-1.84 (m, 8H), 1.96 (s, 6H), 2.21 (m, 4H), 2.47 (m, 1H), 3.27 (q, J=6.8 Hz, 2H), 4.12 (t, J=6.4 Hz, 4H), 4.38 (t, J=6.4 Hz, 4H), 5.58 (t, J=1.2 Hz, 2H), 6.13 (q, J=0.8 Hz, 2H), 6.94 (d, J=9.2 Hz, 4H), 7.11 (s, 2H), 7.56 (d, J=8.8 Hz, 4H).

Preparation Example 4 Preparing the Additive Molecule Exp-A4

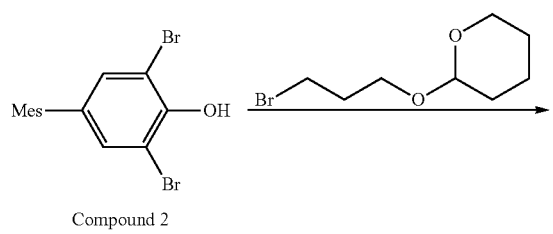

Compound 2

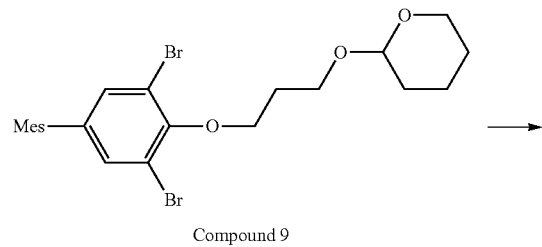

Compound 9

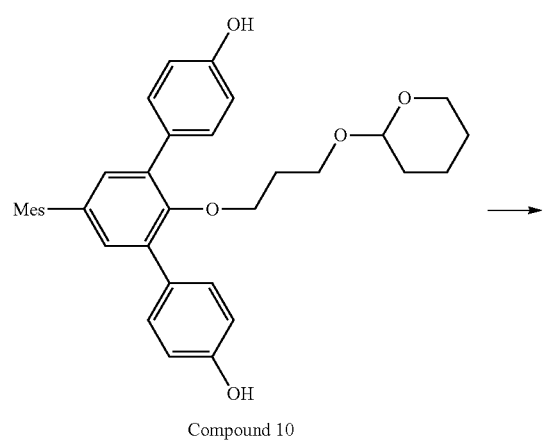

Compound 10

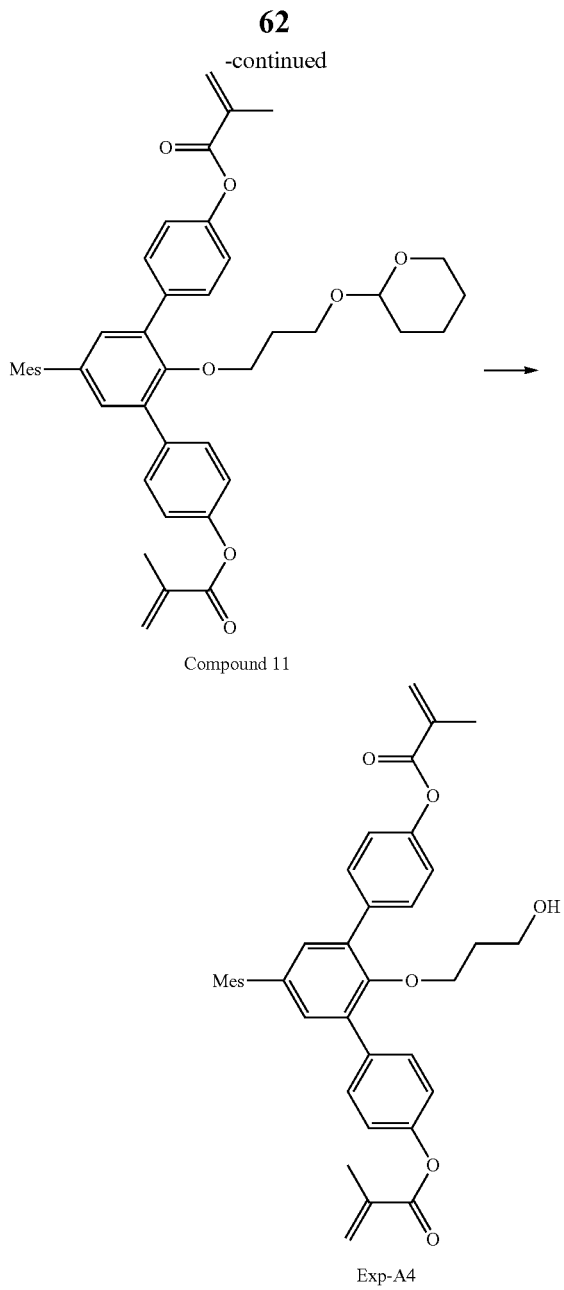

Compound 11

Exp-A4

The synthesis flow of the additive molecule Exp-A4 is shown above. Compound 2 (17.8 g, 37 mmol) and dimethylformamide (200 mL) were placed in a 500 mL reaction flask and dissolved. Then, sodium hydride (2.7 g, 111 mmol) was added under an ice bath, and the mixture was stirred at room temperature for 30 minutes. Next, 2-(3-bromopropoxy) tetrahydropyran (24.8 g, 111 mmol) was added, and the reaction was carried out at room temperature for 4 hours. After the reaction was completed, an extraction was performed by using ethyl acetate and water, and the mixture was dried by using magnesium sulfate. The organic phase was collected. The solvent of the collected organic phase was removed by using a rotary concentrator. Then, column chromatography was performed to obtain Compound 9 (clear oil).

Compound 9 (16.3 g, 26 mmol), 4-hydroxyphenylboronic acid (9.0 g, 65 mmol), potassium carbonate (18.0 g, 130 mmol), tetrahydrofuran (200 mL), and water (60 mL) were placed in a 500 mL reaction flask and stirred to dissolve. Deoxygenation was performed by introducing nitrogen, and the mixture was stirred vigorously for 1 hour. Then, tetrakis (triphenylphosphine) palladium(0) (0.751 g, 0.65 mmol) was added, and the mixture was heated to reflux at 70° C. for 8 hours to carry out the reaction. After the reaction was completed, an extraction was performed by using ethyl acetate and water, and the mixture was dried by using magnesium sulfate. The organic phase was collected. The solvent of the collected organic phase was removed by using a rotary concentrator. Then, column chromatography was performed to obtain Compound 10 (pale yellow solid).

Compound 10 (8.3 g, 10.4 mmol), methacrylic acid (2.24 g, 26 mmol), 4-dimethylaminopyridine (0.79 g, 6.5 mmol), and tetrahydrofuran (120 mL) were placed in a 250 mL reaction flask and stirred to dissolve. Then, the temperature of the reaction flask was cooled to 0° C. Next, N,N'-dicyclohexylcarbodiimide (5.4 g, 26 mmol) was dissolved in tetrahydrofuran (30 mL) to form a solution, and the solution was slowly added dropwise to the reaction flask. The mixture was stirred at 0° C. for 30 minutes, and then, was warmed to room temperature and stirred for 3 hours. After the reaction was completed, an extraction was performed by using ethyl acetate and water, and the mixture was dried by using magnesium sulfate. The organic phase was collected. The solvent of the collected organic phase was removed by using a rotary concentrator. Then, column chromatography was performed to obtain Compound 11 (white solid).

Compound 11 (6.2 g, 7.8 mmol), pyridinium p-toluenesulfonate (0.49 g, 3.9 mmol), tetrahydrofuran (60 mL), and methanol (60 mL) were placed in a 250 mL reaction flask and stirred to dissolve. The mixture was stirred at 50° C. for 3 hours. After the reaction was completed, the insoluble matter was separated by filtration. Then, an extraction was performed by using ethyl acetate and water, and the mixture was dried by using magnesium sulfate. The organic phase was collected. The solvent of the collected organic phase was removed by using a rotary concentrator. Then, column chromatography was performed to obtain the additive molecule Exp-A4 (white solid).

The additive molecule Exp-A4 was analyzed by nuclear magnetic resonance spectroscopy, and the obtained spectral information was as follows: $^1$H NMR (CDCl$_3$, 400 MHz): δ 0.89-1.50 (m, 29H), 1.72-2.0 (m, 7H), 2.09 (s, 6H), 2.50 (m, 1H), 3.28 (t, J=5.2 Hz, 2H), 3.34 (t, J=0.8 Hz, 2H), 5.79 (s, 2H), 6.39 (s, 2H), 7.17 (s, 2H), 7.19 (d, J=2 Hz, 4H), 7.63 (d, J=8.8 Hz, 4H).

Preparation Example 5 Preparing the Additive Molecule Exp-A5

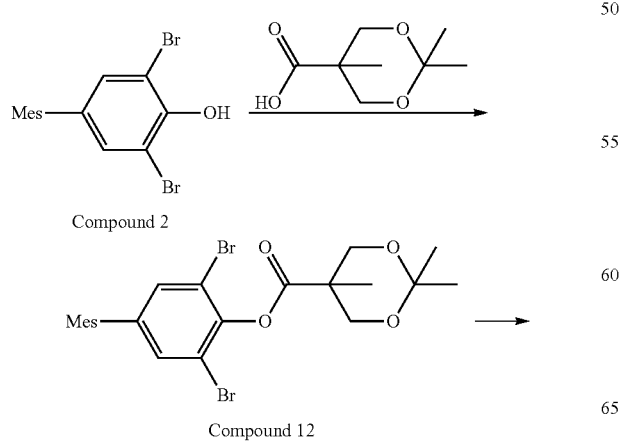

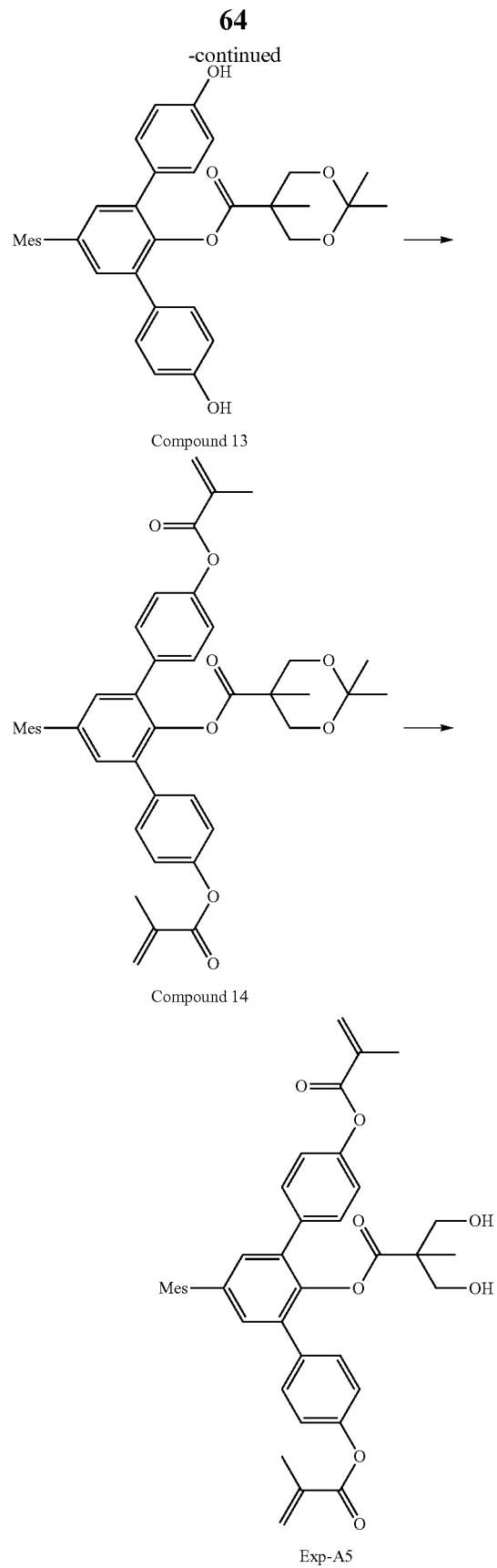

The synthesis flow of the additive molecule Exp-A5 is shown above. Compound 2 (15.4 g, 32 mmol), 2,2,5- trimethyl-[1,3]dioxane-5-carboxylic acid (8.4 g, 48 mmol), 4-dimethylaminopyridine (1.17 g, 9.6 mmol), and tetrahydrofuran (200 mL) were placed in a 500 mL reaction flask and stirred to dissolve. Then, the temperature of the reaction flask was cooled to 0° C. Next, N,N'-dicyclohexylcarbodiimide (9.9 g, 48 mmol) was dissolved in tetrahydrofuran (50 mL) to form a solution, and the solution was slowly added dropwise to the reaction flask. The mixture was stirred at 0° C. for 30 minutes, and then, warmed to room temperature and stirred for 3 hours. After the reaction was completed, an extraction was performed by using ethyl acetate and water, and the mixture was dried by using magnesium sulfate. The organic phase was collected. The solvent of the collected organic phase was removed by using a rotary concentrator. Then, column chromatography was performed to obtain Compound 12 (white solid).

Compound 12 (16.7 g, 26 mmol), 4-hydroxyphenylboronic acid (9.0 g, 65 mmol), potassium carbonate (18.0 g, 130 mmol), tetrahydrofuran (200 mL), and water (60 mL) were placed in a 500 mL reaction flask and stirred to dissolve. Deoxygenation was performed by introducing nitrogen, and the mixture was stirred vigorously for 1 hour. Then, tetrakis(triphenylphosphine) palladium(0) (0.751 g, 0.65 mmol) was added, and the mixture was heated to reflux at 70° C. for 8 hours to carry out the reaction. After the reaction was completed, an extraction was performed by using ethyl acetate and water, and the mixture was dried by using magnesium sulfate. The organic phase was collected. The solvent of the collected organic phase was removed by using a rotary concentrator. Then, column chromatography was performed to obtain Compound 13 (pale yellow solid).

Compound 13 (6.9 g, 10.4 mmol), methacrylic acid (2.24 g, 26 mmol), 4-dimethylaminopyridine (0.79 g, 6.5 mmol), and tetrahydrofuran (120 mL) were placed in a 250 mL reaction flask and stirred to dissolve. Then, the temperature of the reaction flask was cooled to 0° C. Next, N,N'-dicyclohexylcarbodiimide (5.4 g, 26 mmol) was dissolved in tetrahydrofuran (30 mL) to form a solution, and the solution was slowly added dropwise to the reaction flask. The mixture was stirred at 0° C. for 30 minutes, and then, was warmed to room temperature and stirred for 3 hours. After the reaction was completed, an extraction was performed by using ethyl acetate and water, and the mixture was dried by using magnesium sulfate. The organic phase was collected. The solvent of the collected organic phase was removed by using a rotary concentrator. Then, column chromatography was performed to obtain Compound 14 (white solid).

Compound 14 (4.1 g, 5.1 mmol) was placed in a 250 mL reaction flask and dissolved in tetrahydrofuran (120 mL). Then, hydrochloric acid (12 M, 2 mL) was slowly added dropwise to the reaction flask, and the mixture was stirred at room temperature for 2 hours. After the reaction was completed, the mixture was cooled to 0° C., and water was added to carry out the neutralization reaction. Then, an extraction was performed by using ethyl acetate and water, and the mixture was dried by using magnesium sulfate. The organic phase was collected. The solvent of the collected organic phase was removed by using a rotary concentrator. Then, column chromatography was performed to obtain the additive molecule Exp-A5 (white solid).

The additive molecule Exp-A5 was analyzed by nuclear magnetic resonance spectroscopy, and the obtained spectral information was as follows: $^1$H NMR (CDCl$_3$, 400 MHz): δ 0.89-1.50 (m, 29H), 1.72-2.0 (m, 9H), 2.09 (s, 6H), 2.50 (m, 1H), 3.28 (t, J=5.2 Hz, 2H), 3.34 (t, J=0.8 Hz, 2H), 5.79 (s, 2H), 6.39 (s, 2H), 7.17 (s, 2H), 7.19 (d, J=2 Hz, 4H), 7.63 (d, J=8.8 Hz, 4H).

Preparation Example 6 Preparing the Additive Molecule Exp-A6

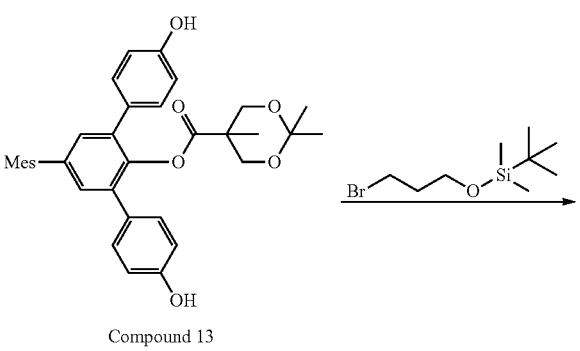

Compound 13

Compound 15

Compound 16

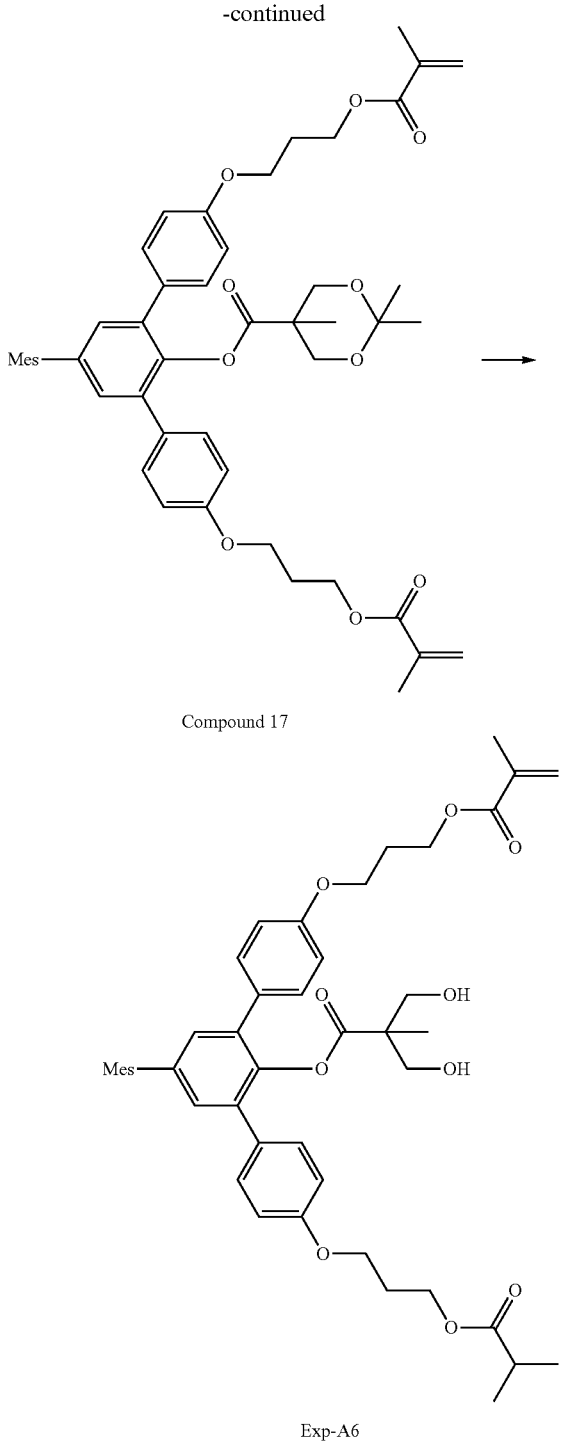

Compound 17

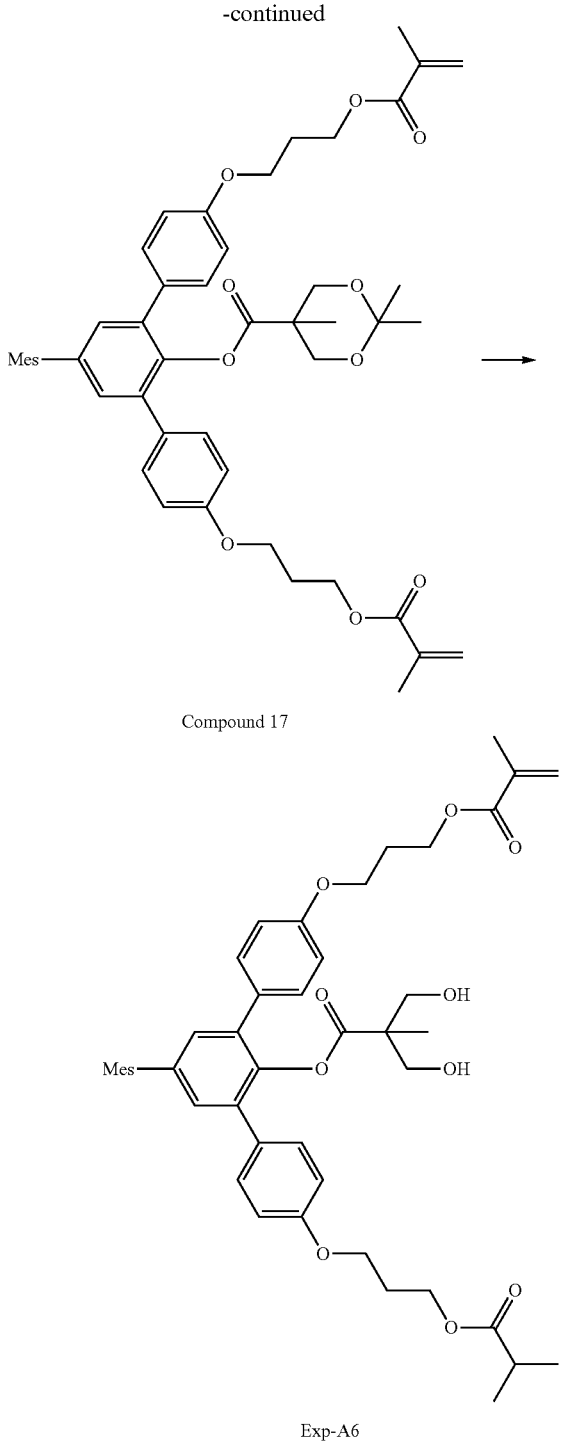

Exp-A6

The synthesis flow of the additive molecule Exp-A6 is shown above. Compound 13 (5.3 g, 8 mmol) and dimethylformamide (100 mL) were placed in a 250 mL reaction flask and dissolved. Then, sodium hydride (0.8 g, 32 mmol) was added under an ice bath, and the mixture was stirred at room temperature for 30 minutes. Next, (3-bromopropoxy)-tert-butyldimethylsilane (8.1 g, 32 mmol) was added, and the reaction was carried out at room temperature for 4 hours. After the reaction was completed, an extraction was performed by using ethyl acetate and water, and the mixture was dried by using magnesium sulfate. The organic phase was collected. The solvent of the collected organic phase was removed by using a rotary concentrator. Then, column chromatography was performed to obtain Compound 15 (clear oil).

Compound 15 (5.3 g, 5 mmol) and tetrahydrofuran (100 mL) were placed in a 250 mL reaction flask and dissolved and cooled to 0° C. Then, tetrabutylammonium fluoride solution (1 M, 17.5 ml, 17.5 mmol) was slowly added, and the mixture was warmed to room temperature and stirred for 2 hours. After the reaction was completed, an extraction was performed by using ethyl acetate and water, and the mixture was dried by using magnesium sulfate. The organic phase was collected. The solvent of the collected organic phase was removed by using a rotary concentrator. Then, column chromatography was performed to obtain Compound 16 (white solid).

Compound 16 (2.7 g, 3 mmol), methacrylic acid (1.24 g, 12 mmol), 4-dimethylaminopyridine (0.29 g, 2.4 mmol), and tetrahydrofuran (100 mL) were placed in a 250 mL reaction flask and stirred to dissolve. Then, the temperature of the reaction flask was cooled to 0° C. Next, N,N'-dicyclohexylcarbodiimide (2.5 g, 12 mmol) was dissolved in tetrahydrofuran (30 mL) to form a solution, and the solution was slowly added dropwise to the reaction flask. The mixture was stirred at 0° C. for 30 minutes, and then, was warmed to room temperature and stirred for 3 hours. After the reaction was completed, an extraction was performed by using ethyl acetate and water, and the mixture was dried by using magnesium sulfate. The organic phase was collected. The solvent of the collected organic phase was removed by using a rotary concentrator. Then, column chromatography was performed to obtain Compound 17 (white solid).

Compound 17 (0.46 g, 0.5 mmol) was placed in a 250 mL reaction flask and dissolved in tetrahydrofuran (50 mL). Then, hydrochloric acid (12 M, 0.5 mL) was slowly added dropwise to the reaction flask, and the mixture was stirred at room temperature for 3 hours. After the reaction was completed, the mixture was cooled to 0° C., and water was added to carry out the neutralization reaction. Then, an extraction was performed by using ethyl acetate and water, and the mixture was dried by using magnesium sulfate. The organic phase was collected. The solvent of the collected organic phase was removed by using a rotary concentrator. Then, column chromatography was performed to obtain the additive molecule Exp-A6 (white solid).

The additive molecule Exp-A6 was analyzed by nuclear magnetic resonance spectroscopy, and the obtained spectral information was as follows: $^1$H NMR (CDCl$_3$, 400 MHz): δ 0.77-1.44 (m, 32H), 1.71-1.84 (m, 8H), 1.96 (s, 6H), 2.05 (s, 1H), 2.18 (t, J=6 Hz, 2H), 3.41 (dd, J=2.8 Hz, 4H), 4.10 (t, J=2 Hz, 4H), 4.36 (t, J=2.4 Hz, 2H), 5.58 (t, J=1.6 Hz 2H), 6.12 (s, 2H), 6.93 (d, J=8.8 Hz, 4H), 7.14 (s, 2H), 7.31 (d, J=8.8 Hz, 4H).

Preparation Example 7 Preparing the Additive Molecule Exp-B1

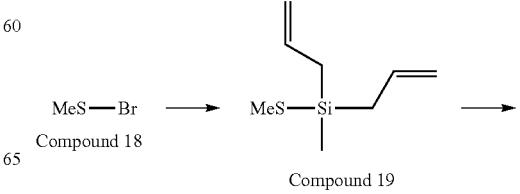

Compound 18           Compound 19

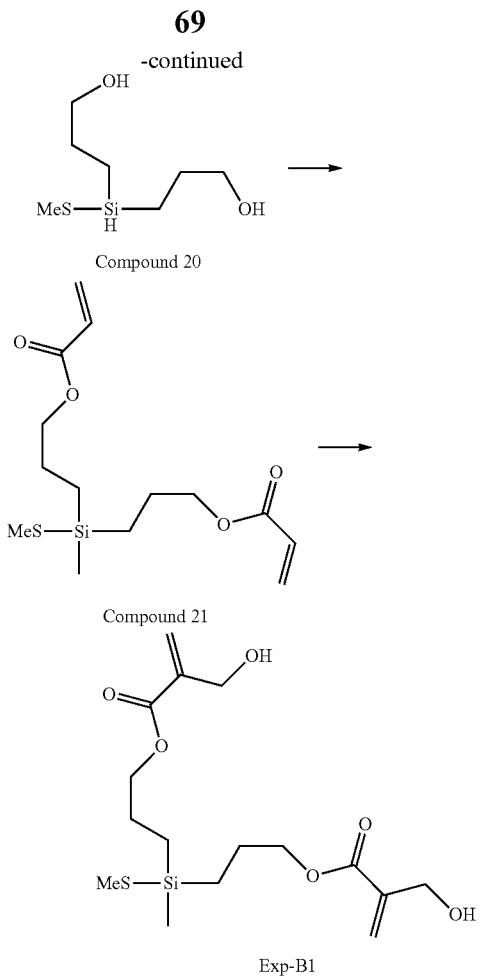

Compound 20

Compound 21

Exp-B1

The synthesis flow of the additive molecule Exp-B1 is shown above. Compound 18 (24.7 g, 63.2 mmol) and anhydrous tetrahydrofuran (400 mL) were placed in a 1000 mL reaction flask and stirred to dissolve. Then, n-butyllithium (2.5 M, solvent: tetrahydrofuran; 26.5 mL, 66.2 mmol) was slowly added dropwise to the reaction flask at −78° C., and the reaction was carried out for 1 hour. Next, trichloro(methyl)silane (9.0 g, 60.2 mmol) was added to the reaction flask at −78° C., and the reaction was carried out at room temperature (20-30° C.) for 3 hours. Then, allylmagnesium chloride (concentration: 2.0M, solvent: tetrahydrofuran; 63.2 mL, 126.4 mmol) was added, and the mixture was heated (100° C.) to reflux for 8 hours to carry out the reaction. After the reaction was completed, water was added. Then, an extraction was performed by using ethyl acetate and water, and the organic phase was collected. The solvent of the collected organic phase was removed by using a rotary concentrator. Then, column chromatography was performed to obtain Compound 19.

Compound 19 (17.0 g, 38.9 mmol) and tetrahydrofuran (550 mL) were placed in a 1000 mL reaction flask and stirred to dissolve. Then, borane-dimethyl sulfide complex (concentration: 2.0M, solvent: tetrahydrofuran; 42.8 mL, 85.6 mmol) was added to the reaction flask at 0° C., and the reaction was carried out for 3 hours. Then, sodium hydroxide (4.2 g, 105.1 mmol) was dissolved in 34 mL of pure water at 0° C. and stirred for 0.5 hour. Then, hydrogen peroxide (30%, 55 mL) was added to the reaction flask at 0° C., and the reaction was carried out at room temperature (20-30° C.) for 5 hours. After the reaction was completed, saturated potassium carbonate aqueous solution was added. Then, an extraction was performed by using ethyl acetate and water, and the organic phase was collected. The solvent of the collected organic phase was removed by using a rotary concentrator. Then, column chromatography was performed to obtain Compound 20.

Compound 20 (6.0 g, 12.7 mmol), acrylic acid (4.6 g, 63.5 mmol), 4-dimethylaminopyridine (1.5 g, 12.7 mmol), and tetrahydrofuran (120 mL) were placed in a 500 mL reaction flask and stirred to dissolve. Then, N,N'-dicyclohexylcarbodiimide (6.3 g, 30.5 mmol) was added to the reaction flask at 0° C., and the reaction was carried out at room temperature (20-30° C.) for 24 hours. After the reaction was completed, an extraction was performed by using ethyl acetate and water, and the organic phase was collected. The solvent of the collected organic phase was removed by using a rotary concentrator. Then, column chromatography was performed to obtain Compound 21.

Compound 21 (3.0 g, 5.2 mmol), paraformaldehyde (1.4 g, 46.5 mmol), 1,4-diazabicyclo[2.2.2]octane (2.3 g, 20.7 mmol), water (22 mL), and tetrahydrofuran (45 mL) were placed in a 250 mL reaction flask and stirred to dissolve. Then, the reaction was carried out at 70° C. for 24 hours. After the reaction was completed, water was added. Then, an extraction was performed by using ethyl acetate and water, and the organic phase was collected. The solvent of the collected organic phase was removed by using a rotary concentrator. Then, column chromatography was performed to obtain the additive molecule Exp-B1.

The additive molecule Exp-B1 was analyzed by nuclear magnetic resonance spectroscopy, and the obtained spectral information was as follows: $^1$H NMR (CDCl$_3$, 400 MHz): δ 0.29 (s, 3H), 0.80-1.46 (m, 26H), 1.68-1.92 (m, 12H), 2.33-2.36 (m, 2H), 2.42-2.45 (m, 1H), 4.15 (t, J=6.8 Hz, 4H), 4.34 (d, J=6.4 Hz, 4H), 5.84 (s, 2H), 6.26 (s, 2H), 7.20 (d, J=8.0 Hz, 2H), 7.40 (d, J=8.0 Hz, 2H).

Preparation Example 8 Preparing the Additive Molecule Exp-C1

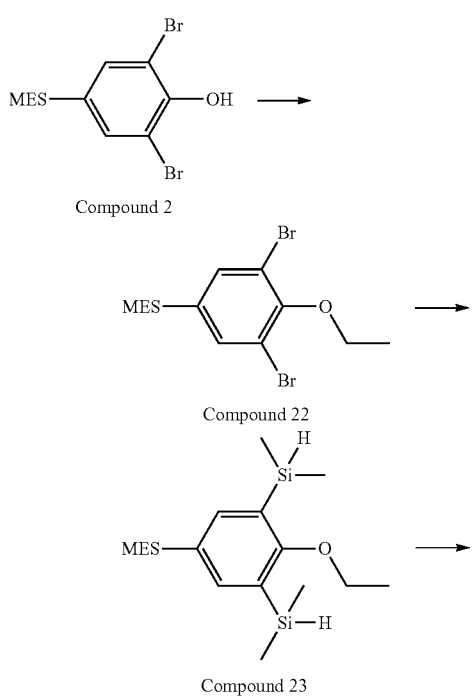

Compound 2

Compound 22

Compound 23

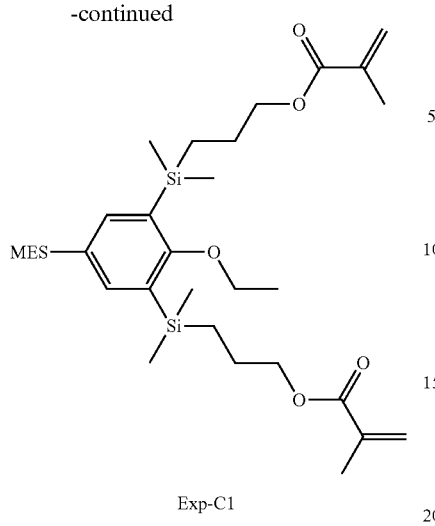

Exp-C1

The synthesis flow of the additive molecule Exp-C1 is shown above. Sodium hydride (NaH, 4.2 g, 173 mmol), dimethylformamide (200 mL), and Compound 2 (24.0 g, 49.4 mmol) were placed in a 500 mL double-necked flask and stirred for 30 minutes. Then, iodoethane (23.1 g, 148.1 mmol) was added at 0° C., and the reaction was carried out at 100° C. for 8 hours. After the reaction was completed, water was added. Then, an extraction was performed by using ethyl acetate and water, and the organic phase was collected. The solvent of the collected organic phase was removed by using a rotary concentrator. Then, column chromatography was performed to obtain Compound 22.

Compound 22 (8.0 g, 15.6 mmol) and anhydrous tetrahydrofuran (100 mL) were placed in a 500 mL reaction flask and stirred to dissolve. Then, n-butyllithium (2.5 M, solvent: tetrahydrofuran; 22.4 mL, 56.0 mmol) was slowly added to the reaction flask at −78° C., and the reaction was carried out for 1 hour. Next, dimethylchlorosilane (5.3 g, 56.0 mmol) was added to the reaction flask at −78° C., and the reaction was carried out at room temperature (20-30° C.) for 2 hours. After the reaction was completed, dilute hydrochloric acid (1 N, 60 mL) was added. Then, an extraction was performed by using ethyl acetate and water, and the organic phase was collected. The solvent of the collected organic phase was removed by using a rotary concentrator. Then, column chromatography was performed to obtain Compound 23.

Compound 23 (1.0 g, 2.1 mmol), toluene (15 mL) and platinum-containing catalyst (Pt/C, Pt content: 5 wt %, 0.2 g) were placed in a 100 mL double-necked flask, and nitrogen gas was introduced. Then, allyl methacrylate (1.1 g, 8.5 mmol) was added and heated to 100° C. for 8 hours to carry out the reaction. After the reaction was completed, the platinum-containing catalyst was removed by filtration. Then, an extraction was performed by using toluene and water, and the organic phase was collected. The solvent of the collected organic phase was removed by using a rotary concentrator. Then, column chromatography was performed to obtain the additive molecule Exp-C1.

The additive molecule Exp-C1 was analyzed by nuclear magnetic resonance spectroscopy, and the obtained spectral information was as follows: $^1$H NMR (CDCl$_3$, 400 MHz): δ 0.32 (s, 12H), 0.83-1.45 (m, 29H), 1.65-1.96 (m, 18H), 2.39-2.45 (m, 1H), 3.78 (q, J=7.2 Hz, 2H), 4.12 (t, J=6.8 Hz, 4H), 5.55 (s, 2H), 6.11 (s, 2H), 7.26 (s, 2H).

Preparation Example 9 Preparing the Additive Molecule Ref

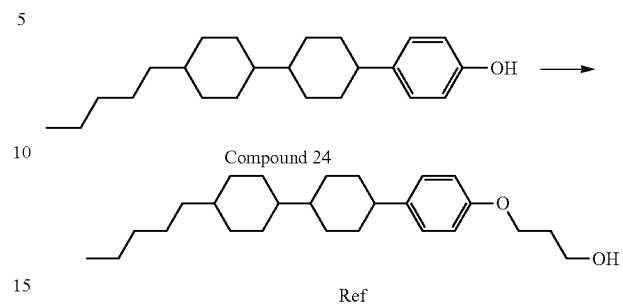

The synthesis flow of the additive molecule Ref is shown above. The additive molecule Ref can be synthesized in accordance with the procedure for synthesizing Compound 16 by using Compound 24 as starting material.

In the following Examples and Reference Examples, all of the liquid-crystal compositions were prepared by forming the mother liquid formed by 100 parts by weight of the molecules of formula (II) in accordance with Table 4, and then, 0.3 parts by weight of molecule of formula (III) shown in Table 4 was added. Next, the additive molecules shown in Tables 1-3 or 5 were additionally added to the above liquid-crystal composition in accordance with the amount that was added, shown in Table 6. For example, the liquid-crystal composition of Example 9 is 100 parts by weight of the mother liquid formed by the molecules of formula (II) shown in Table 4, and 0.3 parts by weight of the molecule of formula (III), 0.50 parts by weight of the additive molecule Exp-A2, and 0.20 parts by weight of the additive molecule Exp-B 1 is further added. Furthermore, in the liquid-crystal compositions of Reference Example and Examples 1-7 shown in Table 6, only one kind of the additive molecules shown in Tables 1-3 or 5 was added.

Production of the Liquid-Crystal Display Device

In 100 parts by weight of the mother liquid formed by the molecules of formula (II), 0.3 parts by weight of the molecule of formula (III) shown in Table 4 and the additive molecules shown in Tables 1-3 or 5 (the amounts that were added are shown in Table 6) were added, and the mixture was uniformly mixed and heated to the clearing point. Then, it was cooled to room temperature to form a liquid-crystal composition of a Reference Example or an Example. The liquid-crystal composition of the Example or the Reference Example is injected between two indium tin oxide (ITO) substrates having an interval of 3.5 μm and having no alignment layer to form the liquid-crystal display element of the Example or the Reference Example, respectively. A DC voltage of 12 V and irradiation of ultraviolet light (peak wavelength: 313 nm) were applied to the liquid-crystal display element to form the liquid-crystal display device of the Example or the Reference Example.

Properties of the Liquid-Crystal Composition

[Vertical Alignment]

The liquid-crystal display device was disposed in a polarizing microscope in which a polarizing element and an analyzer were arranged orthogonally. The element was irradiated with light from below, and the presence or absence of light leakage was observed to judge the vertical alignment. The experimental results of vertical alignment were shown in Table 7.

○: Light does not pass through any part of the element (the whole piece is uniform and has no light transmission). This result indicates that the device has vertical alignment.

Δ: Light passes through a part of the element. This result indicates that the device has vertical alignment, but the degree of vertical alignment is lower.

having a transmittance of 1% is defined as V(th,f). The ΔVth value (unit: Volts) of the liquid-crystal display device is calculated according to the following formula. The smaller the absolute value of ΔVth, the better the stability of the alignment ability of the additive molecules. The experimental results of the ΔVth value were shown in Table 7.

$$\Delta Vth = V(th,f) - V(th,i)$$

TABLE 6

|  | Additive molecule | Amount added (parts by weight) | Additive molecule | Amount added (parts by weight) | Additive molecule | Amount added (parts by weight) |
| --- | --- | --- | --- | --- | --- | --- |
| Reference Example | Ref | 1.50 | — | — | — | — |
| Example 1 | Exp-A1 | 0.03 | — | — | — | — |
| Example 2 | Exp-A2 | 3.00 | — | — | — | — |
| Example 3 | Exp-A3 | 3.00 | — | — | — | — |
| Example 4 | Exp-A4 | 1.50 | — | — | — | — |
| Example 5 | Exp-A5 | 0.03 | — | — | — | — |
| Example 6 | Exp-A6 | 0.05 | — | — | — | — |
| Example 7 | Exp-A6 | 0.10 | — | — | — | — |
| Example 8 | Exp-A1 | 0.03 | Exp-A2 | 0.50 | — | — |
| Example 9 | Exp-A2 | 0.50 | Exp-B1 | 0.20 | — | — |
| Example 10 | Exp-A2 | 0.50 | Exp-B1 | 0.50 | — | — |
| Example 11 | Exp-A2 | 1.00 | Exp-B1 | 0.10 | — | — |
| Example 12 | Exp-A3 | 0.20 | Exp-B1 | 0.10 | — | — |
| Example 13 | Exp-A3 | 0.50 | Exp-B1 | 0.10 | — | — |
| Example 14 | Exp-A1 | 0.10 | — | — | Exp-C1 | 0.50 |
| Example 15 | Exp-A4 | 0.50 | Exp-B1 | 0.10 | — | — |
| Example 16 | Exp-A6 | 0.10 | — | — | Exp-C1 | 3.00 |
| Example 17 | Exp-A6 | 0.05 | Exp-B1 | 0.50 | — | — |
| Example 18 | Exp-A2 | 0.50 | Exp-B1 | 0.20 | Exp-C1 | 0.10 |
| Example 19 | Exp-A2 | 0.50 | Exp-A6 | 0.05 | Exp-B1 | 0.10 |
| Example 20 | Exp-A6 | 0.05 | Exp-B1 | 0.05 | Exp-C1 | 3.00 |

X: Light passes through all parts of the element (the whole piece is uniformly transmitted by light). This result indicates that the device has no vertical alignment.

[Voltage Holding Ratio]

A DC voltage (charge voltage of 5 V, operating frequency of 60 Hz) was applied to the liquid-crystal display of the Example or the Reference Example at an ambient temperature of 60° C. The voltage value V2 after the application was released to 1.667 sec was measured by the liquid-crystal physical parameter measuring instrument (product number: ALCT-IV1, manufactured by INSTEC Co., Ltd.). The experimental results of voltage holding ratio were shown in Table 7. The formula for calculating the voltage holding ratio (VHR) of the liquid-crystal display device is as follows:

VHR=(V2/applied voltage value)×100%.

[Stability of the Alignment Ability]

A voltage of 0V to 10V was continuously applied to the liquid-crystal display device, and the light transmittance of the liquid-crystal display device corresponding to different voltages was measured. The light transmittance was recorded every 0.1V, and a graph of voltage versus transmittance was drawn based on the experimental results. The voltage corresponding to a liquid-crystal display device having a transmittance of 1% is defined as V(th,i). Next, a deterioration experiment was performed on the liquid-crystal display device. The steps of the deterioration experiment are as follows. The liquid-crystal display device was placed in an oven (temperature: 60° C.), and a voltage (AC, 10 V) was applied for a duration of 4 days. After the deterioration experiment was performed, the liquid-crystal display device was subjected to the experiment described above, and a graph of voltage versus transmittance was drawn. The voltage corresponding to a liquid-crystal display device

TABLE 7

|  | Vertical alignment | VHR (%) | ΔVth value (V) |
| --- | --- | --- | --- |
| Reference Example | ○ | 37.2 | −0.49 |
| Example 1 | Δ | 96.0 | −0.03 |
| Example 2 | Δ | 98.1 | −0.07 |
| Example 3 | ○ | 97.5 | −0.06 |
| Example 4 | ○ | 97.9 | −0.03 |
| Example 5 | Δ | 97.5 | −0.09 |
| Example 6 | Δ | 95.3 | −0.10 |
| Example 7 | ○ | 97.3 | −0.08 |
| Example 8 | ○ | 95.4 | −0.06 |
| Example 9 | ○ | 97.2 | −0.01 |
| Example 10 | ○ | 97.6 | −0.02 |
| Example 11 | ○ | 96.0 | −0.08 |
| Example 12 | ○ | 92.5 | −0.17 |
| Example 13 | ○ | 96.6 | −0.05 |
| Example 14 | ○ | 97.0 | −0.12 |
| Example 15 | ○ | 97.9 | −0.01 |
| Example 16 | ○ | 97.8 | −0.04 |
| Example 17 | ○ | 97.1 | −0.13 |
| Example 18 | ○ | 95.6 | −0.11 |
| Example 19 | ○ | 97.7 | −0.02 |
| Example 20 | ○ | 97.5 | −0.07 |

Referring to the Reference Example of Table 7, the Reference Example includes the additive molecule Ref. Because the additive molecule Ref does not have the silicon atom and the polymerizable group, the voltage holding ratio of the liquid-crystal composition of the Reference Example is not good. Furthermore, because the additive molecule Ref does not have the polymerizable group, the stability of the vertical alignment ability of the liquid-crystal composition of the Reference Example is not good.

Referring to Examples 1-20 of Table 7, each of Examples 1-20 includes at least one first additive molecule represented by formula (I) or formula (I'). The results show that the liquid-crystal molecules of Examples 1-20 are all vertically aligned. In Example 2, only one first additive molecule (i.e., the additive molecule Exp-A2) is used. The additive molecule Exp-A2 does not have the anchoring group, so it is difficult for the additive molecule Exp-A2 to be fixed on the substrate vertically. As a result, the degree of vertical alignment of the liquid-crystal molecules is not good. However, the degree of vertical alignment of liquid-crystal molecules can be improved by adding other additive molecules having an anchoring group. For example, in Examples 8-11, the additive molecule Exp-A2 and at least one other additive molecule (i.e., the additive molecule Exp-A1 or the additive molecule Exp-B1) are used together. The additive molecule Exp-A1 and the additive molecule Exp-B1 both have anchor groups, and can improve the degree of vertical alignment of liquid-crystal molecules, as shown in Table 7.

In Examples 1, 5, and 6, because the amount of first additive molecules (i.e., the additive molecule Exp-A1, the additive molecule Exp-A5, and the additive molecule Exp-A6) that are added is too low, the degree of vertical alignment of the liquid-crystal molecules is not good. The degree of vertical alignment of the liquid-crystal molecules can be improved by adjusting the amount that is added. For example, in Example 4, by adjusting the amount of additive molecules that are added to 1.5 parts by weight, the degree of vertical alignment of the liquid-crystal molecules can be improved, as shown in Table 7. Furthermore, the degree of vertical alignment of the liquid-crystal molecules can also be improved by adding other additive molecules having the anchoring group. For example, in Example 8, by using the additive molecule Exp-A1 and the additive molecule Exp-A2 together, the degree of vertical alignment of the liquid-crystal molecules can be improved, as shown in Table 7.

Referring to Examples 1-20 of Table 7, each of Examples 1-20 includes at least one first additive molecule represented by formula (I) or formula (I'). In these first additive molecules, the rightmost cyclic functional group of the main chain of the molecule include a side chain functional group at its opposite sides, respectively. Each of these side chain functional groups includes at least one cyclic functional group and at least one polymerizable group. The results show that each of the absolute values of ΔVth of Examples 1-20 is very small. In particular, in Examples 1-7, only one first additive molecule is used. The absolute value of ΔVth in each of Examples 1-7 is smaller than or equal to 0.10 V. It can be proved that the first additive molecule can significantly improve the stability of the vertical alignment ability of the liquid-crystal molecules.

Referring to Examples 1-20 of Table 7, each of Examples 1-20 includes at least one first additive molecule represented by formula (I) or formula (I'). The results show that the voltage holding ratio is greater than 90% in each of Examples 1-20. In particular, in Examples 1-7, only one first additive molecule is used. The voltage holding ratio is greater than 95% in each of Examples 1-7. It can be proved that the first additive molecule can significantly improve the voltage holding ratio.

Referring to Example 8 of Table 7, the first additive molecule having the anchoring group (i.e., the additive molecule Exp-A1) and the first additive molecule having no anchoring group (i.e., the additive molecule Exp-A2) are used together. The results show that the degree of vertical alignment, the stability of the vertical alignment ability, and the voltage holding ratio of the liquid-crystal molecules can be significantly improved by merely adding 0.53 parts by weight of the additive molecule.

Referring to Examples 9-13 of Table 7, the first additive molecule having no anchoring group (i.e., the additive molecule Exp-A2 or the additive molecule Exp-A3) and the second additive molecule having the anchoring group (i.e., the additive molecule Exp-B1) are used together. The results show that the degree of vertical alignment, the stability of the vertical alignment ability, and the voltage holding ratio of the liquid-crystal molecules can be significantly improved by merely adding a few amount (for example, the total amount smaller than 1.20 parts by weight) of the additive molecule.

Referring to Examples 7 and 16 of Table 7, the kind of first additive molecule, and the amount of it that is added, is the same. In Example 16, the third additive molecule having the polymerizable group (i.e., the additive molecule Exp-C1) is added. The results show that the stability of the vertical alignment ability and the voltage holding ratio of the liquid-crystal molecules can be further improved.

In summary, the additive molecule of the present disclosure can have excellent stability of the vertical alignment ability while having a high voltage holding ratio. By adding the above-mentioned additive molecule to the liquid-crystal composition, it is possible to realize a state in which most of the liquid-crystal molecules are vertically aligned stably and well without using a conventional alignment film. In order to balance the degree of vertical alignment and the stability of the alignment ability of the liquid-crystal composition, the content of the first additive molecule may be adjusted, or two or more kinds of additive molecules may be used together. Furthermore, the liquid-crystal display device using the additive molecules of the embodiments of the present disclosure can have a high voltage retention rate (for example, the voltage retention rate greater than 90%) and excellent stability of the alignment ability. As a result, the performance and durability of the liquid-crystal display device can be significantly improved.

Although the disclosure has been described by way of example and in terms of the preferred embodiments, it should be understood that various modifications and similar arrangements (as would be apparent to those skilled in the art) can be made herein without departing from the spirit and scope of the disclosure as defined by the appended claims.

What is claimed is:
1. An additive, comprising:
a first additive molecule, wherein the first additive molecule has a structure represented by formula (I):

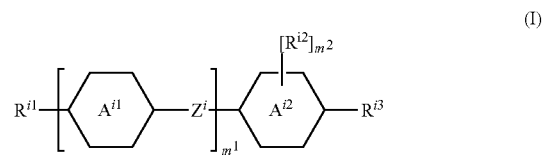

(I)

wherein, in formula (I),
$R^{i1}$ represents fluorine, chlorine, hydrogen, a $C_1$-$C_{20}$ linear alkyl group, a $C_3$-$C_{20}$ branched alkyl group, a $C_1$-$C_{20}$ linear alkoxy group, or a $C_3$-$C_{20}$ branched alkoxy group, wherein the $C_1$-$C_{20}$ linear alkyl group, the $C_3$-$C_{20}$ branched alkyl group, the $C_1$-$C_{20}$ linear alkoxy group, or the $C_3$-$C_{20}$ branched alkoxy group is unsubstituted or at least one —$CH_2$— of the $C_1$-$C_{20}$ linear alkyl group, the $C_3$-$C_{20}$ branched alkyl group, the $C_1$-$C_{20}$ linear alkoxy group, or the $C_3$-$C_{20}$ branched alkoxy group is substituted by —C≡C—, —CH=CH—, —$CF_2O$—, —O—, —COO—, —OCO—, or —OOC—, and/or at least one hydrogen atom of the $C_1$-$C_{20}$ linear alkyl group, the $C_3$-$C_{20}$ branched alkyl group, the $C_1$-$C_{20}$ linear alkoxy group, or the $C_3$-$C_{20}$ branched alkoxy group is substituted by a halogen atom;

$A^{i1}$ represents a 1,4-phenylene group, a 1,4-cyclohexylene group, a benzofuran-2,5-diyl group, a 1,3-dioxane-2,5-diyl group, a tetrahydropyran-2,5-diyl group, a divalent dioxabicyclo[2.2.2]octylene group, a divalent trioxabicyclo[2.2.2]octylene group, a tetrahydronaphthalene-2,6-diyl group, a 1,3-cyclopentylene, a 1,3-cyclobutylene, or an indane-2,5-diyl group, wherein the 1,4-phenylene group, the 1,4-cyclohexylene group, the tetrahydronaphthalene-2,6-diyl group, the 1,3-cyclopentylene, the benzofuran-2,5-diyl group, the 1,3-cyclobutylene, or the indane-2,5-diyl group is unsubstituted or at least one hydrogen atom of the 1,4-phenylene group, the 1,4-cyclohexylene group, the tetrahydronaphthalene-2,6-diyl group, the 1,3-cyclopentylene, the benzofuran-2,5-diyl group, the 1,3-cyclobutylene, or the indane-2,5-diyl group is substituted by a halogen atom, —$CH_3$, —$CH_2CH_3$, or a —CN group, and/or at least one —$CH_2$— of the 1,4-phenylene group, the 1,4-cyclohexylene group, the tetrahydronaphthalene-2,6-diyl group, the 1,3-cyclopentylene, the benzofuran-2,5-diyl group, the 1,3-cyclobutylene, or the indane-2,5-diyl group is substituted by —O—, —N— or —S—, and wherein the —O—, —N—, and —S— do not directly bond to one another;

$A^{i2}$ represents a 1,4-phenylene group, a 1,4-cyclohexylene group, a benzofuran-2,5-diyl group, a tetrahydronaphthalene-2,6-diyl group, or an indane-2,5-diyl group, wherein the 1,4-phenylene group, the 1,4-cyclohexylene group, the tetrahydronaphthalene-2,6-diyl group, the benzofuran-2,5-diyl group, or the indane-2,5-diyl group is unsubstituted or at least one hydrogen atom of the 1,4-phenylene group, the 1,4-cyclohexylene group, the tetrahydronaphthalene-2,6-diyl group, the benzofuran-2,5-diyl group, or the indane-2,5-diyl group is substituted by a halogen atom, —$CH_3$, —$CH_2CH_3$, or a —CN group, and/or at least one —$CH_2$— of the 1,4-phenylene group, the 1,4-cyclohexylene group, the tetrahydronaphthalene-2,6-diyl group, the benzofuran-2,5-diyl group, or the indane-2,5-diyl group is substituted by —O—, —N— or —S—, and wherein the —O—, —N—, and —S— do not directly bond to one another;

$Z^i$ represents a single bond, a $C_1$-$C_{15}$ alkylene group, a $C_1$-$C_{15}$ alkyleneoxy group, —C≡C—, —CH=CH—, —$CF_2$O—, —$OCF_2$—, —COO—, —OCO—, —OOC—, —$CF_2$—$CF_2$—, or —CF=CF—;

$m^1$ represents 1, 2, 3, or 4, and when $m^1$ represents 2, 3, or 4, the two or more $A^{i1}$ groups are identical to each other or different from each other, and the two or more $Z^i$ groups are identical to each other or different from each other;

$m^2$ represents 1, 2, or 3, and when $m^2$ represents 2 or 3, the two or more $R^{i2}$ groups are identical to each other or different from each other;

$R^{i2}$ represents a structure represented by formula (Ia), formula (Ib), or formula (Ic), and at least one $R^{i2}$ represents the structure represented by formula (Ib) or formula (Ic):

$$—L^{i1}—X^{i1} \quad (Ia)$$

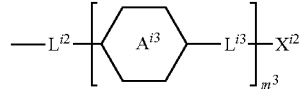

(Ib)

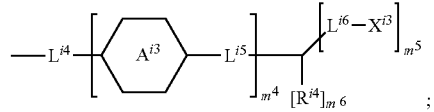

(Ic)

and $R^{i3}$ represents a structure represented by formula (Id), formula (Ie), or formula (If):

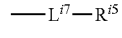

(Id)

(Ie)

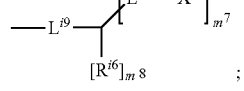

(If)

wherein, in formula (Ia), formula (Ib), formula (Ic), formula (Id), formula (Ie), and formula (If), $A^{i3}$ represents a 1,4-phenylene group, a 1,4-cyclohexylene group, a 1,3-cyclopentylene, or a 1,3-cyclobutylene, wherein the 1,4-phenylene group, the 1,4-cyclohexylene group, the 1,3-cyclopentylene, or the 1,3-cyclobutylene is unsubstituted or at least one hydrogen atom of the 1,4-phenylene group, the 1,4-cyclohexylene group, the 1,3-cyclopentylene, or the 1,3-cyclobutylene is substituted by a halogen atom, —$CH_3$, —$CH_2CH_3$, or a —CN group, and/or at least one —CH= of the 1,4-phenylene group, the 1,4-cyclohexylene group, the 1,3-cyclopentylene, or the 1,3-cyclobutylene is substituted by —N=, and/or at least one —$CH_2$— of the 1,4-phenylene group, the 1,4-cyclohexylene group, the 1,3-cyclopentylene, or the 1,3-cyclobutylene is substituted by —O—, —$NR^e$— or —S—, and wherein the —O—, —$NR^e$—, and —S— do not directly bond to one another, wherein $R^e$ represents hydrogen, a $C_1$-$C_4$ linear alkyl group, or a $C_3$-$C_4$ branched alkyl group;

each of $R^{i4}$, $R^{i5}$, and $R^{i6}$ independently represents fluorine, chlorine, hydrogen, a $C_1$-$C_{20}$ linear alkyl group, a $C_3$-$C_{20}$ branched alkyl group, a $C_1$-$C_{20}$ linear alkoxy group, or a $C_3$-$C_{20}$ branched alkoxy group, wherein the $C_1$-$C_{20}$ linear alkyl group, the $C_3$-$C_{20}$ branched alkyl group, the $C_1$-$C_{20}$ linear alkoxy group, or the $C_3$-$C_{20}$ branched alkoxy group is unsubstituted or at least one —$CH_2$— of the $C_1$-$C_{20}$ linear alkyl group, the $C_3$-$C_{20}$ branched alkyl group, the $C_1$-$C_{20}$ linear alkoxy group, or the $C_3$-$C_{20}$ branched alkoxy group is substituted by —C≡C—, —CH=CH—, —$CF_2$O—, —O—, —COO—, —OCO—, or —OOC—, and/or at least one hydrogen atom of the $C_1$-$C_{20}$ linear alkyl group, the $C_3$-$C_{20}$ branched alkyl group, the $C_1$-$C_{20}$ linear alkoxy group, or the $C_3$-$C_{20}$ branched alkoxy group is substituted by a halogen atom;

each of $L^{i1}$, $L^{i2}$, $L^{i3}$, $L^{i4}$, $L^{i5}$, $L^{i6}$, $L^{i7}$, $L^{i8}$, $L^{i9}$, and $L^{i10}$ independently represents a single bond, a $C_1$-$C_{15}$ linear alkylene group, a $C_3$-$C_{15}$ branched alkylene group, a $C_1$-$C_{15}$ linear alkyleneoxy group, or a $C_3$-$C_{15}$ branched alkyleneoxy group, wherein the $C_1$-$C_{15}$ linear alkylene group, the $C_3$-$C_{15}$ branched alkylene group, the $C_1$-$C_{15}$ linear alkyleneoxy group, or the $C_3$-$C_{15}$ branched alkyleneoxy group is unsubstituted or at least one —$CH_2$— of the $C_1$-$C_{15}$ linear alkylene group, the $C_3$-$C_{15}$ branched alkylene group, the $C_1$-$C_{15}$ linear alkyleneoxy group, or the $C_3$-$C_{15}$ branched alkyleneoxy group is substituted by —C≡C—, —CH=CH—, —$CF_2O$—, —$SiR^a_2$—, —O—, —CO—, —COO—, —OCO—, or —OOC—, and/or at least one hydrogen atom of the $C_1$-$C_{15}$ linear alkylene group, the $C_3$-$C_{15}$ branched alkylene group, the $C_1$-$C_{15}$ linear alkyleneoxy group, or the $C_3$-$C_{15}$ branched alkyleneoxy group is substituted by a halogen atom, and wherein $R^a$ represents a $C_1$-$C_{10}$ linear alkyl group or a $C_3$-$C_{10}$ branched alkyl group, and two $R^a$ groups bonded to the same Si atom are identical to each other or different from each other;

$m^3$ represents 1 or 2, and when $m^3$ represents 2, the two $A^{i3}$ groups are identical to each other or different from each other, and the two $L^{i3}$ groups are identical to each other or different from each other;

$m^4$ represents 1 or 2, and when $m^4$ represents 2, the two $A^{i3}$ groups are identical to each other or different from each other, and the two $L^5$ groups are identical to each other or different from each other;

$m^5+m^{i6}=3$, $m^5$ represents 2 or 3, and the two or more $L^{i6}$ groups are identical to each other or different from each other, and the two or more $X^{i3}$ groups are identical to each other or different from each other;

$m^7+m^8=3$, $m^7$ represents 2 or 3, and the two or more $L^{i10}$ groups are identical to each other or different from each other, and the two or more $X^{i5}$ groups are identical to each other or different from each other;

each of $X^{i1}$, $X^{i2}$, and $X^{i3}$ independently represents hydrogen, —OH,

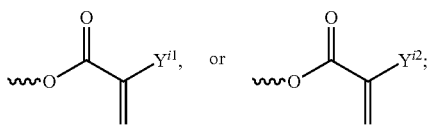

and each of $X^{i4}$ and $X^{i5}$ independently represents hydrogen, —OH,

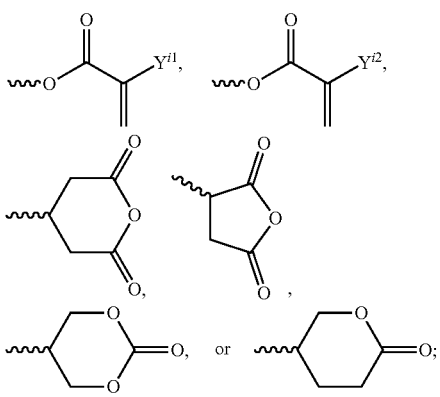

wherein at least one of $X^{i2}$ and $X^{i3}$ represents

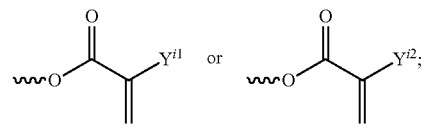

and wherein $Y^{i1}$ represents —OH, a $C_1$-$C_{15}$ alkyl group, or a $C_2$-$C_{15}$ alkenyl group, and at least one hydrogen atom of the $C_1$-$C_{15}$ alkyl group or the $C_2$-$C_{15}$ alkenyl group is substituted by —OH;

$Y^{i2}$ represents hydrogen, halogen, a $C_1$-$C_{15}$ alkyl group, or a $C_2$-$C_{15}$ alkenyl group, wherein the $C_1$-$C_{15}$ alkyl group or the $C_2$-$C_{15}$ alkenyl group is unsubstituted or at least one hydrogen atom of the $C_1$-$C_{15}$ alkyl group or the $C_2$-$C_{15}$ alkenyl group is substituted by a halogen atom.

2. The additive as claimed in claim 1, wherein the first additive molecule has a structure represented by formula (I'):

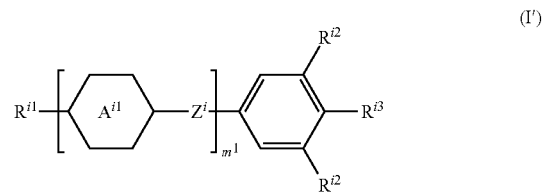

wherein, in formula (I'), $R^{i1}$ represents fluorine, chlorine, hydrogen, a $C_1$-$C_{12}$ linear alkyl group, a $C_3$-$C_{12}$ branched alkyl group, a $C_1$-$C_{12}$ linear alkoxy group, or a $C_3$-$C_{12}$ branched alkoxy group, wherein the $C_1$-$C_{12}$ linear alkyl group, the $C_3$-$C_{12}$ branched alkyl group, the $C_1$-$C_{12}$ linear alkoxy group, or the $C_3$-$C_{12}$ branched alkoxy group is unsubstituted or at least one —$CH_2$— of the $C_1$-$C_{12}$ linear alkyl group, the $C_3$-$C_{12}$ branched alkyl group, the $C_1$-$C_{12}$ linear alkoxy group, or the $C_3$-$C_{12}$ branched alkoxy group is substituted by —C≡C—, —CH=CH—, —$CF_2O$—, —O—, —COO—, —OCO—, or —OOC—, and/or at least one hydrogen atom of the $C_1$-$C_{12}$ linear alkyl group, the $C_3$-$C_{12}$ branched alkyl group, the $C_1$-$C_{12}$ linear alkoxy group, or the $C_3$-$C_{12}$ branched alkoxy group is substituted by a halogen atom;

the definitions of $A^{i1}$ and $Z^i$ are respectively the same as the definitions of $A^{i1}$ and $Z^i$ defined in claim 1; and $m^1$ represents 0, 1, 2, 3, or 4, and when $m^1$ represents 2, 3, or 4, the two or more $A^{i1}$ groups are identical to each other or different from each other, and the two or more $Z^i$ groups are identical to each other or different from each other;

$R^{i2}$ represents a structure represented by formula (Ia), formula (Ib), or formula (Ic), and at least one $R^{i2}$ represents the structure represented by formula (Ib) or formula (Ic):

$$—L^{i1}—X^{i1} \qquad (Ia)$$

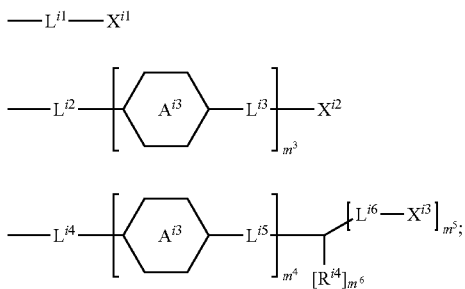

(Ib)

(Ic)

and $R^{i3}$ represents a structure represented by formula (Id), formula (Ie), or formula (If):

$$—L^{i7}—R^{i5} \qquad (Id)$$

$$—L^{i8}—X^{i4} \qquad (Ie)$$

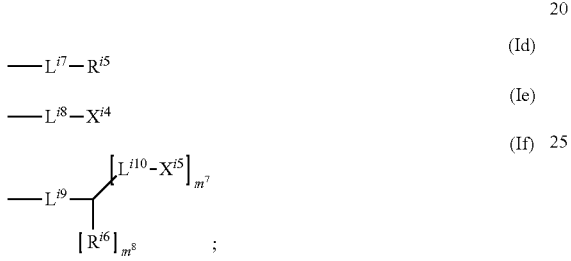

(If)

wherein, in formula (Ia), formula (Ib), formula (Ic), formula (Id), formula (Ie), and formula (If), each of $R^{i4}$, $R^{i5}$, and $R^{i6}$ independently represents fluorine, chlorine, hydrogen, a $C_1$-$C_{12}$ linear alkyl group, a $C_3$-$C_{12}$ branched alkyl group, a $C_1$-$C_{12}$ linear alkoxy group, or a $C_3$-$C_{12}$ branched alkoxy group, wherein the $C_1$-$C_{12}$ linear alkyl group, the $C_3$-$C_{12}$ branched alkyl group, the $C_1$-$C_{12}$ linear alkoxy group, or the $C_3$-$C_{12}$ branched alkoxy group is unsubstituted or at least one —CH$_2$— of the $C_1$-$C_{12}$ linear alkyl group, the $C_3$-$C_{12}$ branched alkyl group, the $C_1$-$C_{12}$ linear alkoxy group, or the $C_3$-$C_{12}$ branched alkoxy group is substituted by —C≡C—, —CH=CH—, —CF$_2$O—, —O—, —COO—, —OCO—, or —OOC—, and/or at least one hydrogen atom of the $C_1$-$C_{12}$ linear alkyl group, the $C_3$-$C_{12}$ branched alkyl group, the $C_1$-$C_{12}$ linear alkoxy group, or the $C_3$-$C_{12}$ branched alkoxy group is substituted by a halogen atom;

the definitions of $L^{i1}$, $L^{i2}$, $L^{i3}$, $L^{i4}$, $L^{i5}$, $L^{i6}$, $L^{i7}$, $L^{i8}$, $L^{i9}$, $L^{i10}$, $A^{i3}$, $m^3$, $m^4$, $m^5$, $m^6$, $m^7$, and $m^8$ are respectively the same as the definitions of $L^{i1}$, $L^{i2}$, $L^{i3}$, $L^{i4}$, $L^{i5}$, $L^{i6}$, $L^{i7}$, $L^{i8}$, $L^{i9}$, $L^{i10}$, $A^{i3}$, $m^3$, $m^4$, $m^5$, $m^6$, $m^7$, and $m^8$ defined in claim 1;

each of $X^{i1}$, $X^{i2}$, $X^{i3}$, $X^{i4}$ and $X^{i5}$ independently represents hydrogen, —OH,

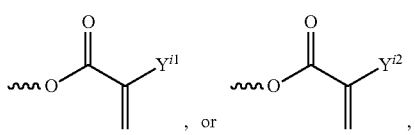

, or wherein at least one of $X^{i2}$ and $X^{i3}$ represents

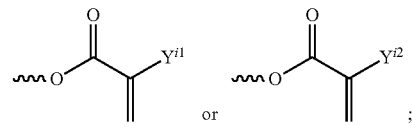

or ;

and wherein $Y^{i1}$ represents —OH, a $C_1$-$C_{10}$ alkyl group, or a $C_2$-$C_{10}$ alkenyl group, and at least one hydrogen atom of the $C_1$-$C_{10}$ alkyl group or the $C_2$-$C_{10}$ alkenyl group is substituted by —OH; and $Y^{i2}$ represents hydrogen, halogen, a $C_1$-$C_{10}$ alkyl group, or a $C_2$-$C_{10}$ alkenyl group, wherein the $C_1$-$C_{10}$ alkyl group or the $C_2$-$C_{10}$ alkenyl group is unsubstituted or at least one hydrogen atom of the $C_1$-$C_{10}$ alkyl group or the $C_2$-$C_{10}$ alkenyl group is substituted by a halogen atom.

3. The additive as claimed in claim 2, further comprising a second additive molecule, wherein the second additive molecule has a structure represented by formula (I-1):

$$R^1 \!-\!\!\left[\!\!\left\langle A^1 \right\rangle\!\!-\!Z^1\right]_{n^1}\!\!\left[\!\!\left\langle A^2 \right\rangle\right]_{n^2}\!\!-\!K^1 \qquad (I\text{-}1)$$

wherein, in formula (I-1), $R^1$ represents fluorine, chlorine, hydrogen, a $C_1$-$C_{15}$ linear alkyl group, a $C_3$-$C_{15}$ branched alkyl group, a $C_1$-$C_{15}$ linear alkoxy group, or a $C_3$-$C_{15}$ branched alkoxy group, wherein the $C_1$-$C_{15}$ linear alkyl group, the $C_3$-$C_{15}$ branched alkyl group, the $C_1$-$C_{15}$ linear alkoxy group, or the $C_3$-$C_{15}$ branched alkoxy group is unsubstituted or at least one —CH$_2$— of the $C_1$-$C_{15}$ linear alkyl group, the $C_3$-$C_{15}$ branched alkyl group, the $C_1$-$C_{15}$ linear alkoxy group, or the $C_3$-$C_{15}$ branched alkoxy group is substituted by —CH=CH—, —CF$_2$O—, —O—, —COO—, —OCO—, or —OOC—, and/or at least one hydrogen atom of the $C_1$-$C_{15}$ linear alkyl group, the $C_3$-$C_{15}$ branched alkyl group, the $C_1$-$C_{15}$ linear alkoxy group, or the $C_3$-$C_{15}$ branched alkoxy group is substituted by a halogen atom;

$A^1$ represents a 1,4-phenylene group, a 1,4-cyclohexylene group, a benzofuran-2,5-diyl group, a 1,3-dioxane-2,5-diyl group, a tetrahydropyran-2,5-diyl group, a divalent dioxabicyclo[2.2.2]octylene group, a divalent trioxabicyclo[2.2.2]octylene group, a tetrahydronaphthalene-2,6-diyl group, a 1,3-cyclopentylene, a 1,3-cyclobutylene, or an indane-2,5-diyl group, wherein the 1,4-phenylene group, the 1,4-cyclohexylene group, the tetrahydronaphthalene-2,6-diyl group, the 1,3-cyclopentylene, the 1,3-cyclobutylene, or the indane-2,5-diyl group is unsubstituted or at least one hydrogen atom of the 1,4-phenylene group, the 1,4-cyclohexylene group, the tetrahydronaphthalene-2,6-diyl group, the 1,3-cyclopentylene, the 1,3-cyclobutylene, or the indane-2,5-diyl group is substituted by a halogen atom, —CH$_3$, —CH$_2$CH$_3$, or a —CN group, and/or at least one —CH$_2$— of the 1,4-phenylene group, the 1,4-cyclohexylene group, the tetrahydronaphthalene-2,6-diyl group, the 1,3-cyclopentylene, the 1,3-cyclobutylene, or the indane-2,5-diyl group is substituted by —O—, —N— or —S—, and wherein the —O—, —N—, and —S— do not directly bond to one another;

$A^2$ represents a 1,4-phenylene group, a 1,4-cyclohexylene group, a benzofuran-2,5-diyl group, or an indane-2,5-diyl group, wherein the 1,4-phenylene group, the 1,4-cyclohexylene group, the benzofuran-2,5-diyl group, or the indane-2,5-diyl group is unsubstituted or at least one hydrogen atom of the 1,4-phenylene group, the 1,4-cyclohexylene group, the benzofuran-2,5-diyl group, or the indane-2,5-diyl group is substituted by a halogen atom, —CH$_3$, —CH$_2$CH$_3$, or a —CN group, and/or at least one —CH$_2$— of the 1,4-phenylene group, the 1,4-cyclohexylene group, the benzofuran-2, 5-diyl group, or the indane-2,5-diyl group is substituted by —O—, —N— or —S—, and wherein the —O—, —N—, and —S— do not directly bond to one another;

$Z^1$ represents a single bond, a $C_1$-$C_{15}$ alkylene group, a $C_1$-$C_{15}$ alkyleneoxy group, —C≡C—, —CH═CH—, —CF$_2$O—, —OCF$_2$—, —COO—, —OCO—, —OOC—, —CF$_2$—CF$_2$—, or —CF═CF—;

$n^1$ represents 1, 2, or 3, and when $n^1$ represents 2 or 3, the two or more $A^1$ groups are identical to each other or different from each other, and the two or more $Z^1$ groups are identical to each other or different from each other;

$n^2$ represents 0 or 1; and $K^1$ represents a structure represented by formula (I-1-a), formula (I-1-b), or formula (I-1-c):

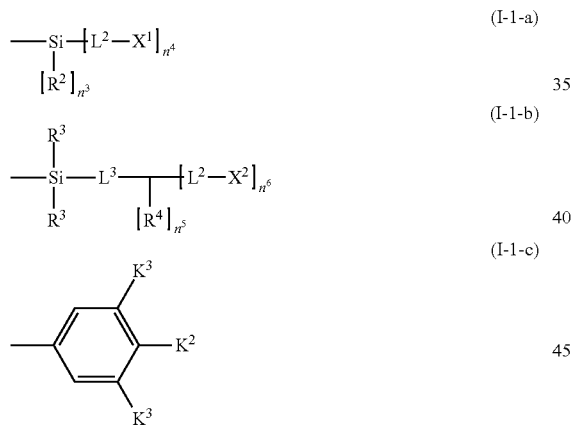

wherein, in formula (I-1-a), formula (I-1-b), and formula (I-1-c), each of $L^2$ and $L^3$ independently represents a single bond, a $C_1$-$C_{15}$ linear alkylene group, a $C_3$-$C_{15}$ branched alkylene group, a $C_1$-$C_{15}$ linear alkyleneoxy group, or a $C_3$-$C_{15}$ branched alkyleneoxy group, wherein the $C_1$-$C_{15}$ linear alkylene group, the $C_3$-$C_{15}$ branched alkylene group, the $C_1$-$C_{15}$ linear alkyleneoxy group, or the $C_3$-$C_{15}$ branched alkyleneoxy group is unsubstituted or at least one —CH$_2$— of the $C_1$-$C_{15}$ linear alkylene group, the $C_3$-$C_{15}$ branched alkylene group, the $C_1$-$C_{15}$ linear alkyleneoxy group, or the $C_3$-$C_{15}$ branched alkyleneoxy group is substituted by —C≡C—, —CH═CH—, —CF$_2$O—, —SiR$^a$$_2$—, —O—, —COO—, —OCO—, or —OOC—, and/or at least one hydrogen atom of the $C_1$-$C_{15}$ linear alkylene group, the $C_3$-$C_{15}$ branched alkylene group, the $C_1$-$C_{15}$ linear alkyleneoxy group, or the $C_3$-$C_{15}$ branched alkyleneoxy group is substituted by a halogen atom, and wherein $R^a$ represents a $C_1$-$C_{10}$ linear alkyl group or a $C_3$-$C_{10}$ branched alkyl group, and two $R^a$ groups bonded to the same Si atom are identical to each other or different from each other;

each of $R^2$, $R^3$ and $R^4$ independently represents fluorine, chlorine, hydrogen, a $C_1$-$C_8$ linear alkyl group, a $C_3$-$C_8$ branched alkyl group, a $C_1$-$C_8$ linear alkoxy group, or a $C_3$-$C_8$ branched alkoxy group, wherein the $C_1$-$C_8$ linear alkyl group, the $C_3$-$C_8$ branched alkyl group, the $C_1$-$C_8$ linear alkoxy group, or the $C_3$-$C_8$ branched alkoxy group is unsubstituted or at least one —CH$_2$— of the $C_1$-$C_8$ linear alkyl group, the $C_3$-$C_8$ branched alkyl group, the $C_1$-$C_8$ linear alkoxy group, or the $C_3$-$C_8$ branched alkoxy group is substituted by —CH═CH—, —CF$_2$O—, —O—, —COO—, —OCO—, or —OOC—, and/or at least one hydrogen atom of the $C_1$-$C_8$ linear alkyl group, the $C_3$-$C_8$ branched alkyl group, the $C_1$-$C_8$ linear alkoxy group, or the $C_3$-$C_8$ branched alkoxy group is substituted by a halogen atom;

$n^3$+$n^4$=3, $n^4$ represents 2 or 3, and the two or more $L^2$ groups are identical to each other or different from each other, and the two or more $X^1$ groups are identical to each other or different from each other;

$n^5$+$n^6$=3, $n^6$ represents 2 or 3, and the two or more $L^2$ groups are identical to each other or different from each other, and the two or more $X^2$ groups are identical to each other or different from each other;

each of $X^1$ and $X^2$ independently represents

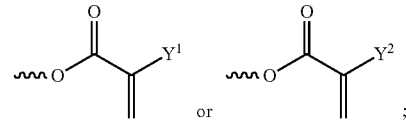

wherein $Y^1$ represents —OH, a $C_1$-$C_8$ alkyl group, or a $C_2$-$C_8$ alkenyl group, and at least one hydrogen atom of the $C_1$-$C_8$ alkyl group or the $C_2$-$C_8$ alkenyl group is substituted by —OH;

$Y^2$ represents hydrogen, halogen, a $C_1$-$C_8$ alkyl group, or a $C_2$-$C_8$ alkenyl group, wherein the $C_1$-$C_8$ alkyl group or the $C_2$-$C_8$ alkenyl group is unsubstituted or at least one hydrogen atom of the $C_1$-$C_8$ alkyl group or the $C_2$-$C_8$ alkenyl group is substituted by a halogen atom;

$K^2$ represents a structure represented by formula (I-1-d), formula (I-1-e), or formula (I-1-f):

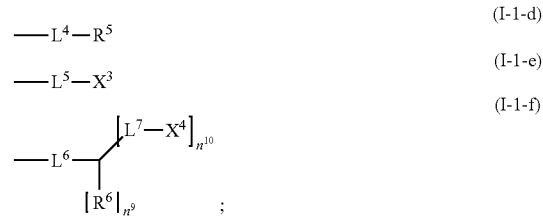

and $K^3$ represents a structure represented by formula (I-1-g) or formula (I-1-h):

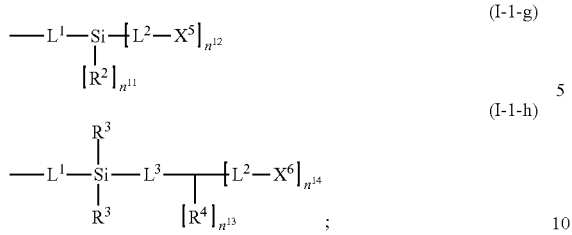

(I-1-g)

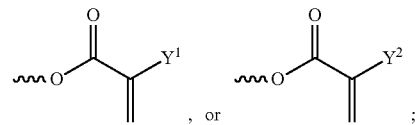

(I-1-h)

wherein, in formula (I-1-d), formula (I-1-e), formula (I-1-f), formula (I-1-g), and formula (I-1-h), each of $L^1$, $L^2$, $L^3$, $L^4$, $L^5$, $L^6$, and $L^7$ independently represents a single bond, a $C_1$-$C_{15}$ linear alkylene group, a $C_3$-$C_{15}$ branched alkylene group, a $C_1$-$C_{15}$ linear alkyleneoxy group, or a $C_3$-$C_{15}$ branched alkyleneoxy group, wherein the $C_1$-$C_{15}$ linear alkylene group, the $C_3$-$C_{15}$ branched alkylene group, the $C_1$-$C_{15}$ linear alkyleneoxy group, or the $C_3$-$C_{15}$ branched alkyleneoxy group is unsubstituted or at least one —$CH_2$— of the $C_1$-$C_{15}$ linear alkylene group, the $C_3$-$C_{15}$ branched alkylene group, the $C_1$-$C_{15}$ linear alkyleneoxy group, or the $C_3$-$C_{15}$ branched alkyleneoxy group is substituted by —C≡C—, —CH=CH—, —$CF_2$O—, —$SiR^a{}_2$—, —O—, —COO—, —OCO—, or —OOC—, and/or at least one hydrogen atom of the $C_1$-$C_{15}$ linear alkylene group, the $C_3$-$C_{15}$ branched alkylene group, the $C_1$-$C_{15}$ linear alkyleneoxy group, or the $C_3$-$C_{15}$ branched alkyleneoxy group is substituted by a halogen atom, and wherein $R^a$ represents a $C_1$-$C_{10}$ linear alkyl group or a $C_3$-$C_{10}$ branched alkyl group, and two $R^a$ groups bonded to the same Si atom are identical to each other or different from each other;

each of $R^2$, $R^3$, $R^4$, $R^5$ and $R^6$ independently represents fluorine, chlorine, hydrogen, a $C_1$-$C_{10}$ linear alkyl group, a $C_3$-$C_{10}$ branched alkyl group, a $C_1$-$C_{10}$ linear alkoxy group, or a $C_3$-$C_{10}$ branched alkoxy group, wherein the $C_1$-$C_{10}$ linear alkyl group, the $C_3$-$C_{10}$ branched alkyl group, the $C_1$-$C_{10}$ linear alkoxy group, or the $C_3$-$C_{10}$ branched alkoxy group is unsubstituted or at least one —$CH_2$— of the $C_1$-$C_{10}$ linear alkyl group, the $C_3$-$C_{10}$ branched alkyl group, the $C_1$-$C_{10}$ linear alkoxy group, or the $C_3$-$C_{10}$ branched alkoxy group is substituted by —C≡C—, —CH=CH—, —$CF_2$O—, —O—, —COO—, —OCO—, or —OOC—, and/or at least one hydrogen atom of the $C_1$-$C_{10}$ linear alkyl group, the $C_3$-$C_{10}$ branched alkyl group, the $C_1$-$C_{10}$ linear alkoxy group, or the $C_3$-$C_{10}$ branched alkoxy group is substituted by a halogen atom;

$n^9+n^{10}=3$, $n^{10}$ represents 2 or 3, and the two or more $L^7$ groups are identical to each other or different from each other, and the two or more $X^4$ groups are identical to each other or different from each other;

$n^{12}$ represents 1, 2, or 3, $n^{11}+n^{12}=3$, and when $n^{12}$ represents 2 or 3, the two or more $L^2$ groups are identical to each other or different from each other, and the two or more $X^5$ groups are identical to each other or different from each other; when $n^{11}$ represents 2, the two $R^2$ groups are identical to each other or different from each other; and $n^{14}$ represents 1, 2, or 3, $n^{13}+n^{14}=3$, and when $n^{14}$ represents 2 or 3, the two or more $L^2$ groups are identical to each other or different from each other, and the two or more $X^6$ groups are identical to each other or different from each other; when $n^{13}$ represents 2, the two $R^4$ groups are identical to each other or different from each other;

each of $X^3$, $X^4$, $X^5$ and $X^6$ independently represents hydrogen, —OH,

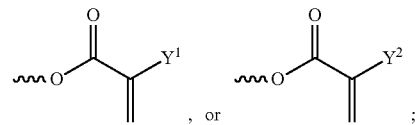

wherein, when $K^1$ represents the structure represented by formula (I-1-a) or formula (I-1-b), at least one of $X^1$ and $X^2$ represents

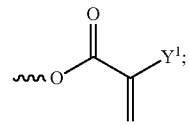

when $K^1$ represents the structure represented by formula (I-1-c), and $K^2$ represents the structure represented by formula (I-1-d), at least one of $X^5$ and $X^6$ represents

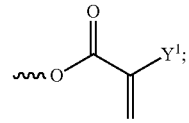

when $K^1$ represents the structure represented by formula (I-1-c), and $K^2$ represents the structure represented by formula (I-1-e) or formula (I-1-f), at least one of $X^3$, $X^4$, $X^5$ and $X^6$ represents

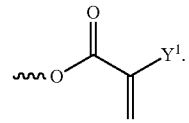

4. The additive as claimed in claim 3, wherein when an amount of the first additive molecule is set to 1 part by weight, an amount of the second additive molecule is 0.01-60 parts by weight.

5. The additive as claimed in claim 3, further comprising a third additive molecule, wherein the third additive molecule has a structure represented by formula (I-1):

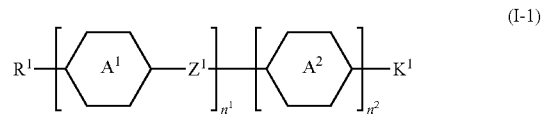

(I-1)

wherein in formula (I-1),
the definitions of $R^1$, $A^1$, $A^2$, $Z^1$, $n^1$, and $n^2$ defined in claim 3; and
$K^1$ represents a structure represented by formula (I-1-a), formula (I-1-b), or formula (I-1-c):

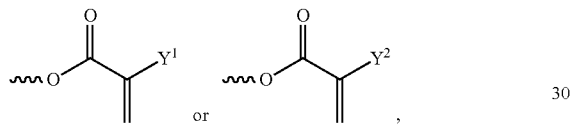 (I-1-a)

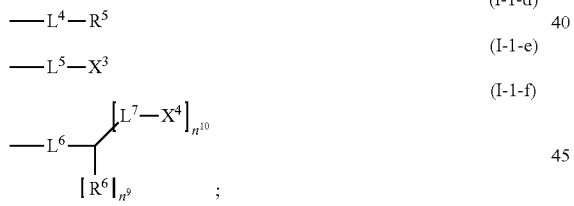 (I-1-b)

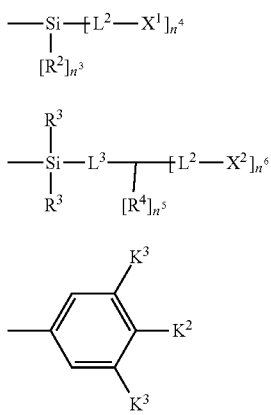 (I-1-c)

wherein, in formula (I-1-a), formula (I-1-b), and formula (I-1-c),
the definitions of $L^2$, $L^3$, $R^2$, $R^3$, $R^4$, $n^3$, $n^4$, $n^5$, and $n^6$ are respectively the same as the definitions of $L^2$, $L^3$, $R^2$, $R^3$, $R^4$, $n^3$, $n^4$, $n^5$, and $n^6$ defined in claim 3;
each of $X^1$ and $X^2$ independently represents

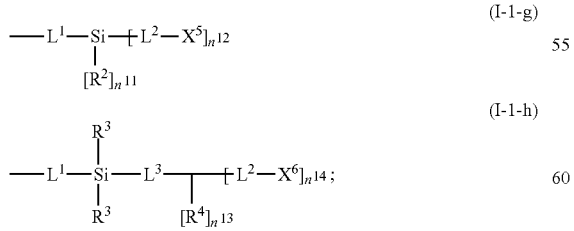

and the definitions of $Y^1$ and $Y^2$ are respectively the same as the definitions of $Y^1$ and $Y^2$ defined in claim 3;
$K^2$ represents a structure represented by formula (I-1-d), formula (I-1-e), or formula (I-1-f):

—$L^4$—$R^5$ (I-1-d)

—$L^5$—$X^3$ (I-1-e)

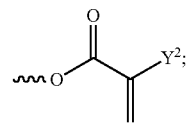 (I-1-f)

and
$K^3$ represents a structure represented by formula (I-1-g) or formula (I-1-h):

—$L^1$—Si—[$L^2$—$X^5$]$_{n^{12}}$
        |
     [$R^2$]$_{n^{11}}$ (I-1-g)

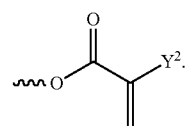 (I-1-h)

wherein, in formula (I-1-d), formula (I-1-e), formula (I-1-f), formula (I-1-g), and formula (I-1-h),
the definitions of $L^1$, $L^2$, $L^3$, $L^4$, $L^5$, $L^6$, $L^7$, $R^2$, $R^3$, $R^4$, $R^5$, $R^6$, $n^9$, $n^{10}$, $n^{11}$, $n^{12}$, $n^{13}$, and $n^{14}$ are respectively the same as the definitions of $L^1$, $L^2$, $L^3$, $L^4$, $L^5$, $L^6$, $L^7$, $R^2$, $R^3$, $R^4$, $R^5$, $R^6$, $n^9$, $n^{10}$, $n^{11}$, $n^{12}$, $n^{13}$, and $n^{14}$ defined in claim 3;
each of $X^3$, $X^4$, $X^5$ and $X^6$ independently represents hydrogen, —OH,

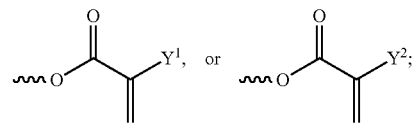

wherein, when $K^1$ represents the structure represented by formula (I-1-a) or formula (I-1-b), each of $X^1$ and $X^2$ independently represents

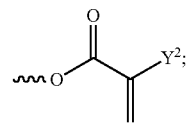

when $K^1$ represents the structure represented by formula (I-1-c), each of $X^3$, $X^4$, $X^5$ and $X^6$ represents hydrogen or

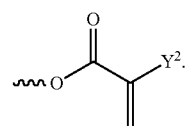

6. The additive as claimed in claim 5, wherein when an amount of the first additive molecule is set to 1 part by weight, an amount of the second additive molecule is 0.01-60 parts by weight, and an amount of the third additive molecule is 0.01-80 parts by weight.

7. The additive as claimed in claim 2, further comprising a third additive molecule, wherein the third additive molecule has a structure represented by formula (I-1):

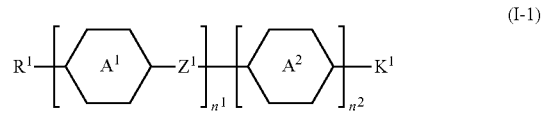 (I-1)

wherein, in formula (I-1),
$R^1$ represents fluorine, chlorine, hydrogen, a $C_1$-$C_{15}$ linear alkyl group, a $C_3$-$C_{15}$ branched alkyl group, a $C_1$-$C_{15}$ linear alkoxy group, or a $C_3$-$C_{15}$ branched alkoxy group, wherein the $C_1$-$C_{15}$ linear alkyl group, the $C_3$-$C_{15}$ branched alkyl group, the $C_1$-$C_{15}$ linear alkoxy group, or the $C_3$-$C_{15}$ branched alkoxy group is unsubstituted or at least one —$CH_2$— of the $C_1$-$C_{15}$ linear alkyl group, the $C_3$-$C_{15}$ branched alkyl group, the $C_1$-$C_{15}$ linear alkoxy group, or the $C_3$-$C_{15}$ branched alkoxy group is substituted by —CH=CH—, —$CF_2$O—, —O—, —COO—, —OCO—, or —OOC—, and/or at least one hydrogen atom of the $C_1$-$C_{15}$ linear alkyl group, the $C_3$-$C_{15}$ branched alkyl group, the $C_1$-$C_{15}$ linear alkoxy group, or the $C_3$-$C_{15}$ branched alkoxy group is substituted by a halogen atom;

$A^1$ represents a 1,4-phenylene group, a 1,4-cyclohexylene group, a benzofuran-2,5-diyl group, a 1,3-dioxane-2,5-diyl group, a tetrahydropyran-2,5-diyl group, a divalent dioxabicyclo[2.2.2]octylene group, a divalent trioxabicyclo[2.2.2]octylene group, a tetrahydronaphthalene-2,6-diyl group, a 1,3-cyclopentylene, a 1,3-cyclobutylene, or an indane-2,5-diyl group, wherein the 1,4-phenylene group, the 1,4-cyclohexylene group, the tetrahydronaphthalene-2,6-diyl group, the 1,3-cyclopentylene, the 1,3-cyclobutylene, or the indane-2,5-diyl group is unsubstituted or at least one hydrogen atom of the 1,4-phenylene group, the 1,4-cyclohexylene group, the tetrahydronaphthalene-2,6-diyl group, the 1,3-cyclopentylene, the 1,3-cyclobutylene, or the indane-2,5-diyl group is substituted by a halogen atom, —CH$_3$, —CH$_2$CH$_3$, or a —CN group, and/or at least one —CH$_2$— of the 1,4-phenylene group, the 1,4-cyclohexylene group, the tetrahydronaphthalene-2,6-diyl group, the 1,3-cyclopentylene, the 1,3-cyclobutylene, or the indane-2,5-diyl group is substituted by —O—, —N— or —S—, and wherein the —O—, —N—, and —S— do not directly bond to one another;

$A^2$ represents a 1,4-phenylene group, a 1,4-cyclohexylene group, a benzofuran-2,5-diyl group, or an indane-2,5-diyl group, wherein the 1,4-phenylene group, the 1,4-cyclohexylene group, the benzofuran-2,5-diyl group, or the indane-2,5-diyl group is unsubstituted or at least one hydrogen atom of the 1,4-phenylene group, the 1,4-cyclohexylene group, the benzofuran-2,5-diyl group, or the indane-2,5-diyl group is substituted by a halogen atom, —CH$_3$, —CH$_2$CH$_3$, or a —CN group, and/or at least one —CH$_2$— of the 1,4-phenylene group, the 1,4-cyclohexylene group, the benzofuran-2,5-diyl group, or the indane-2,5-diyl group is substituted by —O—, —N— or —S—, and wherein the —O—, —N—, and —S— do not directly bond to one another;

$Z^1$ represents a single bond, a $C_1$-$C_{15}$ alkylene group, a $C_1$-$C_{15}$ alkyleneoxy group, —C≡C—, —CH=CH—, —CF$_2$O—, —OCF$_2$—, —COO—, —OCO—, —OOC—, —CF$_2$—CF$_2$—, or —CF=CF—;

$n^1$ represents 1, 2, or 3, and when $n^1$ represents 2 or 3, the two or more $A^1$ groups are identical to each other or different from each other, and the two or more $Z^1$ groups are identical to each other or different from each other;

$n^2$ represents 0 or 1; and $K^1$ represents a structure represented by formula (I-1-a), formula (I-1-b), or formula (I-1-c):

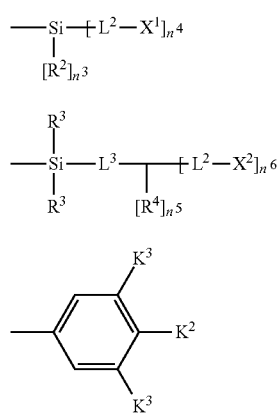

wherein, in formula (I-1-a), formula (I-1-b), and formula (I-1-c), each of $L^2$ and $L^3$ independently represents a single bond, a $C_1$-$C_{15}$ linear alkylene group, a $C_3$-$C_{15}$ branched alkylene group, a $C_1$-$C_{15}$ linear alkyleneoxy group, or a $C_3$-$C_{15}$ branched alkyleneoxy group, wherein the $C_1$-$C_{15}$ linear alkylene group, the $C_3$-$C_{15}$ branched alkylene group, the $C_1$-$C_{15}$ linear alkyleneoxy group, or the $C_3$-$C_{15}$ branched alkyleneoxy group is unsubstituted or at least one —CH$_2$— of the $C_1$-$C_{15}$ linear alkylene group, the $C_3$-$C_{15}$ branched alkylene group, the $C_1$-$C_{15}$ linear alkyleneoxy group, or the $C_3$-$C_{15}$ branched alkyleneoxy group is substituted by —C≡C—, —CH=CH—, —CF$_2$O—, —SiR$^a_2$—, —O—, —COO—, —OCO—, or —OOC—, and/or at least one hydrogen atom of the $C_1$-$C_{15}$ linear alkylene group, the $C_3$-$C_{15}$ branched alkylene group, the $C_1$-$C_{15}$ linear alkyleneoxy group, or the $C_3$-$C_{15}$ branched alkyleneoxy group is substituted by a halogen atom, and wherein $R^a$ represents a $C_1$-$C_{10}$ linear alkyl group or a $C_3$-$C_{10}$ branched alkyl group, and two $R^a$ groups bonded to the same Si atom are identical to each other or different from each other;

each of $R^2$, $R^3$ and $R^4$ independently represents fluorine, chlorine, hydrogen, a $C_1$-$C_8$ linear alkyl group, a $C_3$-$C_8$ branched alkyl group, a $C_1$-$C_8$ linear alkoxy group, or a $C_3$-$C_8$ branched alkoxy group, wherein the $C_1$-$C_8$ linear alkyl group, the $C_3$-$C_8$ branched alkyl group, the $C_1$-$C_8$ linear alkoxy group, or the $C_3$-$C_8$ branched alkoxy group is unsubstituted or at least one —CH$_2$— of the $C_1$-$C_8$ linear alkyl group, the $C_3$-$C_8$ branched alkyl group, the $C_1$-$C_8$ linear alkoxy group, or the $C_3$-$C_8$ branched alkoxy group is substituted by —CH=CH—, —CF$_2$O—, —O—, —COO—, —OCO—, or —OOC—, and/or at least one hydrogen atom of the $C_1$-$C_8$ linear alkyl group, the $C_3$-$C_8$ branched alkyl group, the $C_1$-$C_8$ linear alkoxy group, or the $C_3$-$C_8$ branched alkoxy group is substituted by a halogen atom;

$n^3$+$n^4$=3, $n^4$ represents 2 or 3, and the two or more $L^2$ groups are identical to each other or different from each other, and the two or more $X^1$ groups are identical to each other or different from each other;

$n^5$+$n^6$=3, $n^6$ represents 2 or 3, and the two or more $L^2$ groups are identical to each other or different from each other, and the two or more $X^2$ groups are identical to each other or different from each other;

each of $X^1$ and $X^2$ independently represents

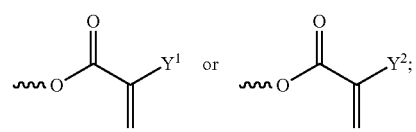

wherein $Y^1$ represents —OH, a $C_1$-$C_8$ alkyl group, or a $C_2$-$C_8$ alkenyl group, and at least one hydrogen atom of the $C_1$-$C_8$ alkyl group or the $C_2$-$C_8$ alkenyl group is substituted by —OH;

$Y^2$ represents hydrogen, halogen, a $C_1$-$C_8$ alkyl group, or a $C_2$-$C_8$ alkenyl group, wherein the $C_1$-$C_8$ alkyl group or the $C_2$-$C_8$ alkenyl group is unsubstituted or at least one hydrogen atom of the $C_1$-$C_8$ alkyl group or the $C_2$-$C_8$ alkenyl group is substituted by a halogen atom;

$K^2$ represents a structure represented by formula (I-1-d), formula (I-1-e), or formula (I-1-f):

(I-1-d)
—L⁴—R⁵

(I-1-e)
—L⁵—X³

(I-1-f)
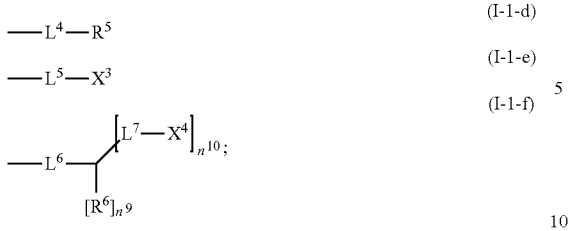

and

K³ represents a structure represented by formula (I-1-g) or formula (I-1-h):

(I-1-g)

(I-1-h)

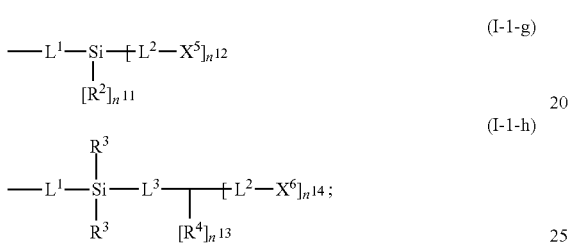

wherein, in formula (I-1-d), formula (I-1-e), formula (I-1-f), formula (I-1-g), and formula (I-1-h), each of $L^1$, $L^2$, $L^3$, $L^4$, $L^5$, $L^6$, and $L^7$ independently represents a single bond, a $C_1$-$C_{15}$ linear alkylene group, a $C_3$-$C_{15}$ branched alkylene group, a $C_1$-$C_{15}$ linear alkyleneoxy group, or a $C_3$-$C_{15}$ branched alkyleneoxy group, wherein the $C_1$-$C_{15}$ linear alkylene group, the $C_3$-$C_{15}$ branched alkylene group, the $C_1$-$C_{15}$ linear alkyleneoxy group, or the $C_3$-$C_{15}$ branched alkyleneoxy group is unsubstituted or at least one —CH$_2$— of the $C_1$-$C_{15}$ linear alkylene group, the $C_3$-$C_{15}$ branched alkylene group, the $C_1$-$C_{15}$ linear alkyleneoxy group, or the $C_3$-$C_{15}$ branched alkyleneoxy group is substituted by —C≡C—, —CH=CH—, —CF$_2$O—, —SiR$^a{}_2$—, —O—, —COO—, —OCO—, or —OOC—, and/or at least one hydrogen atom of the $C_1$-$C_{15}$ linear alkylene group, the $C_3$-$C_{15}$ branched alkylene group, the $C_1$-$C_{15}$ linear alkyleneoxy group, or the $C_3$-$C_{15}$ branched alkyleneoxy group is substituted by a halogen atom, and wherein $R^a$ represents a $C_1$-$C_{10}$ linear alkyl group or a $C_3$-$C_{10}$ branched alkyl group, and two $R^a$ groups bonded to the same Si atom are identical to each other or different from each other;

each of $R^2$, $R^3$, $R^4$, $R^5$ and $R^6$ independently represents fluorine, chlorine, hydrogen, a $C_1$-$C_{10}$ linear alkyl group, a $C_3$-$C_{10}$ branched alkyl group, a $C_1$-$C_{10}$ linear alkoxy group, or a $C_3$-$C_{10}$ branched alkoxy group, wherein the $C_1$-$C_{10}$ linear alkyl group, the $C_3$-$C_{10}$ branched alkyl group, the $C_1$-$C_{10}$ linear alkoxy group, or the $C_3$-$C_{10}$ branched alkoxy group is unsubstituted or at least one —CH$_2$— of the $C_1$-$C_{10}$ linear alkyl group, the $C_3$-$C_{10}$ branched alkyl group, the $C_1$-$C_{10}$ linear alkoxy group, or the $C_3$-$C_{10}$ branched alkoxy group is substituted by —C≡C—, —CH=CH—, —CF$_2$O—, —O—, —COO—, —OCO—, or —OOC—, and/or at least one hydrogen atom of the $C_1$-$C_{10}$ linear alkyl group, the $C_3$-$C_{10}$ branched alkyl group, the $C_1$-$C_{10}$ linear alkoxy group, or the $C_3$-$C_{10}$ branched alkoxy group is substituted by a halogen atom;

$n^9+n^{10}=3$, $n^{10}$ represents 2 or 3, and the two or more $L^7$ groups are identical to each other or different from each other, and the two or more $X^4$ groups are identical to each other or different from each other;

$n^{12}$ represents 1, 2, or 3, $n^{11}+n^{12}=3$, and when $n^{12}$ represents 2 or 3, the two or more $L^2$ groups are identical to each other or different from each other, and the two or more $X^5$ groups are identical to each other or different from each other; when $n^{11}$ represents 2, the two $R^2$ groups are identical to each other or different from each other; and $n^{14}$ represents 1, 2, or 3, $n^{13}+n^{14}=3$, and when $n^{14}$ represents 2 or 3, the two or more $L^2$ groups are identical to each other or different from each other, and the two or more $X^6$ groups are identical to each other or different from each other; when $n^{13}$ represents 2, the two $R^4$ groups are identical to each other or different from each other;

each of $X^3$, $X^4$, $X^5$ and $X^6$ independently represents hydrogen, —OH,

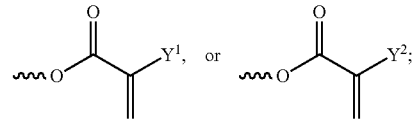

wherein, when $K^1$ represents the structure represented by formula (I-1-a) or formula (I-1-b), each of $X^1$ and $X^2$ independently represents

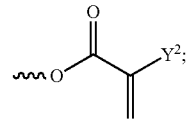

and when $K^1$ represents the structure represented by formula (I-1-c), each of $X^3$, $X^4$, $X^5$ and $X^6$ represents hydrogen or

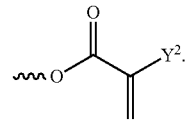

8. The additive as claimed in claim 7, wherein when an amount of the first additive molecule is set to 1 part by weight, an amount of the third additive molecule is 0.01-80 parts by weight.

9. A liquid-crystal composition, comprising a first component and a second component, wherein the first component comprises at least one additive as claimed in claim 1, and the second component comprises at least one compound represented by formula (II):

(II)

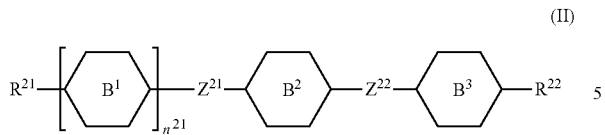

wherein
- each of $R^{21}$ and $R^{22}$ independently represents hydrogen, halogen, a $C_1$-$C_{15}$ alkyl group, or a $C_2$-$C_{15}$ alkenyl group, wherein the $C_1$-$C_{15}$ alkyl group or the $C_2$-$C_{15}$ alkenyl group is unsubstituted or at least one hydrogen atom of the $C_1$-$C_{15}$ alkyl group or the $C_2$-$C_{15}$ alkenyl group is substituted by a halogen atom, and/or at least one —$CH_2$— of the $C_1$-$C_{15}$ alkyl group or the $C_2$-$C_{15}$ alkenyl group is substituted by —O—, and wherein the —O— does not directly bond to another —O—;
- each of $B^1$, $B^2$, and $B^3$ independently represents a 1,4-phenylene group, a 1,4-cyclohexylene group, a benzofuran-2,5-diyl group, a 1,3-dioxane-2,5-diyl group, a tetrahydropyran-2,5-diyl group, a divalent dioxabicyclo[2.2.2]octylene group, a divalent trioxabicyclo[2.2.2]octylene group, a tetrahydronaphthalene-2,6-diyl group, or an indane-2,5-diyl group, wherein the 1,4-phenylene group, the 1,4-cyclohexylene group, the 1,3-dioxane-2,5-diyl group, the benzofuran-2,5-diyl group, the tetrahydronaphthalene-2,6-diyl group, the indane-2,5-diyl group, or the tetrahydropyran-2,5-diyl group is unsubstituted or at least one hydrogen atom of the 1,4-phenylene group, the 1,4-cyclohexylene group, the 1,3-dioxane-2,5-diyl group, the benzofuran-2,5-diyl group, the tetrahydronaphthalene-2,6-diyl group, the indane-2,5-diyl group, or the tetrahydropyran-2,5-diyl group is substituted by a halogen atom or a —CN group, and/or at least one —$CH_2$— of the 1,4-phenylene group, the 1,4-cyclohexylene group, the 1,3-dioxane-2,5-diyl group, the benzofuran-2,5-diyl group, the tetrahydronaphthalene-2,6-diyl group, the indane-2,5-diyl group, or the tetrahydropyran-2,5-diyl group is substituted by —O—, —N— or —S—, and wherein the —O—, —N—, and —S— do not directly bond to one another;
- each of $Z^{21}$ and $Z^{22}$ independently represents a single bond, a $C_1$-$C_4$ alkylene group, a $C_2$-$C_4$ alkenylene group, or a $C_2$-$C_4$ alkynylene group, wherein the $C_1$-$C_4$ alkylene group, the $C_2$-$C_4$ alkenylene group, or the $C_2$-$C_4$ alkynylene group is unsubstituted or at least one hydrogen atom of the $C_1$-$C_4$ alkylene group, the $C_2$-$C_4$ alkenylene group, or the $C_2$-$C_4$ alkynylene group is substituted by a halogen atom or a —CN group, and/or at least one —$CH_2$— of the $C_1$-$C_4$ alkylene group, the $C_2$-$C_4$ alkenylene group, or the $C_2$-$C_4$ alkynylene group is substituted by —O— or —S—, and wherein the —O— does not directly bond to —O— or —S—, and —S— does not directly bond to —S—; and
- $n^{21}$ represents 0, 1, or 2, and when $n^{21}$ represents 2, the two $B^1$ groups are identical to each other or different from each other.

10. The liquid-crystal composition as claimed in claim 9, wherein the second component comprises at least one compound represented by formula (II-1) or formula (II-2):

(II-1)

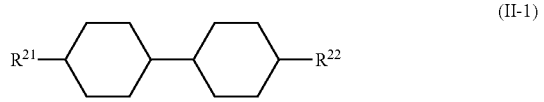

(II-2)

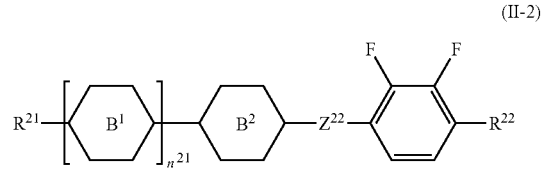

wherein
- the definitions of $R^{21}$, $R^{22}$, $B^1$, $B^2$, $Z^{22}$, and $n^{21}$ are respectively the same as the definitions of $R^{21}$, $R^{22}$, $B^1$, $B^2$, $Z^{22}$, and $n^{21}$ defined in claim 9.

11. The liquid-crystal composition as claimed in claim 9, wherein when a total weight of the second component is 100 parts by weight, the first component is 0.01-10 parts by weight.

12. The liquid-crystal composition as claimed in claim 9, further comprising a third component, wherein the third component comprises at least one compound represented by formula (III), formula (IV), or formula (V):

(III)

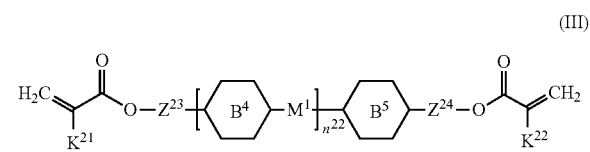

(IV)

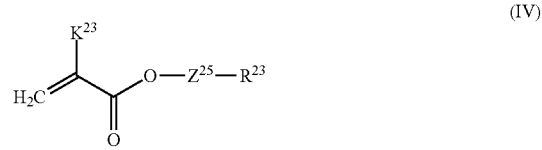

(V)

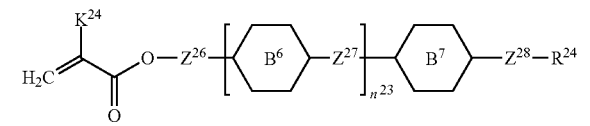

wherein
- each of $K^{21}$, $K^{22}$, $K^{23}$, and $K^{24}$ independently represents hydrogen or a methyl group;
- each of $Z^{23}$ and $Z^{24}$ independently represents a single bond, a $C_1$-$C_{15}$ linear alkylene group, a $C_3$-$C_{15}$ branched alkylene group, a $C_2$-$C_{15}$ linear alkenylene group, or a $C_3$-$C_{15}$ branched alkenylene group, wherein the $C_1$-$C_{15}$ linear alkylene group, the $C_3$-$C_{15}$ branched alkylene group, the $C_2$-$C_{15}$ linear alkenylene group, or the $C_3$-$C_{15}$ branched alkenylene group is unsubstituted or at least one hydrogen atom of the $C_1$-$C_{15}$ linear alkylene group, the $C_3$-$C_{15}$ branched alkylene group, the $C_2$-$C_{15}$ linear alkenylene group, or the $C_3$-$C_{15}$ branched alkenylene group is substituted by a halogen atom, and/or at least one —$CH_2$— of the $C_1$-$C_{15}$ linear alkylene group, the $C_3$-$C_{15}$ branched alkylene group, the $C_2$-$C_{15}$ linear alkenylene group, or the $C_3$-$C_{15}$ branched alkenylene group is substituted by —O—, —CO—, —COO—, or —OCO—, and wherein the —O—, —CO—, —COO—, and —OCO— do not directly bond to one another;
- each of $Z^{25}$, $Z^{26}$, $Z^{27}$, and $Z^{28}$ independently represents a single bond, —C≡C—, a $C_1$-$C_{15}$ linear alkylene group, a $C_3$-$C_{15}$ branched alkylene group, a $C_2$-$C_{15}$ linear alkenylene group, or a $C_3$-$C_{15}$ branched alkenylene group, wherein the $C_1$-$C_{15}$ linear alkylene group, the $C_3$-$C_{15}$ branched alkylene group, the $C_2$-$C_{15}$ linear alkenylene group, or the $C_3$-$C_{15}$ branched alkenylene group is unsubstituted or at least one hydrogen atom of the $C_1$-$C_{15}$ linear alkylene group, the $C_3$-$C_{15}$ branched alkylene group, the $C_2$-$C_{15}$ linear alkenylene group, or the $C_3$-$C_{15}$ branched alkenylene group is substituted by a halogen atom, and/or at least one —$CH_2$— of the $C_1$-$C_{15}$ linear alkylene group, the $C_3$-$C_{15}$ branched alkylene group, the $C_2$-$C_{15}$ linear alkenylene group, or the $C_3$-$C_{15}$ branched alkenylene group is substituted by —$SiR^e_2$—, —S—, —O—, —CO—, —COO—, —OCO—, —CO—$NR^e$—, or —$NR^e$—CO—, and the —$SiR^e_2$—, —S—, —O—, —CO—, —COO—, —OCO—, —CO—$NR^e$—, and —$NR^e$—CO— do not directly bond to one another, wherein $R^e$ represents hydrogen, a $C_1$-$C_4$ linear alkyl group, or a $C_3$-$C_4$ branched alkyl group, and the two $R^e$ groups bonded to the same Si atom are identical to each other or different from each other;

each of $B^4$, $B^5$, $B^6$ and $B^7$ independently represents a 1,4-phenylene group, a 1,4-cyclohexylene group, a benzofuran-2,5-diyl group, a 1,3-dioxane-2,5-diyl group, a tetrahydropyran-2,5-diyl group, a divalent dioxabicyclo[2.2.2]octylene group, a divalent trioxabicyclo[2.2.2]octylene group, a tetrahydronaphthalene-2,6-diyl group, or an indane-2,5-diyl group, wherein the 1,4-phenylene group, the 1,4-cyclohexylene group, the benzofuran-2,5-diyl group, the 1,3-dioxane-2,5-diyl group, the tetrahydropyran-2,5-diyl group, the divalent dioxabicyclo[2.2.2]octylene group, the divalent trioxabicyclo[2.2.2]octylene group, the tetrahydronaphthalene-2,6-diyl group, or the indane-2,5-diyl group is unsubstituted or is substituted by at least one substituent, wherein the at least one substituent is selected from fluorine, chlorine, a —CN group, a $C_1$-$C_{12}$ linear alkyl group, a $C_3$-$C_{12}$ branched alkyl group, a $C_2$-$C_{12}$ linear alkenyl group, a $C_2$-$C_{12}$ linear alkynyl group, a $C_4$-$C_{12}$ branched alkenyl group, or a $C_4$-$C_{12}$ branched alkynyl group, wherein the $C_1$-$C_{12}$ linear alkyl group, the $C_3$-$C_{12}$ branched alkyl group, the $C_2$-$C_{12}$ linear alkenyl group, the $C_2$-$C_{12}$ linear alkynyl group, the $C_4$-$C_{12}$ branched alkenyl group, or the $C_4$-$C_{12}$ branched alkynyl group is unsubstituted or at least one hydrogen atom of the $C_1$-$C_{12}$ linear alkyl group, the $C_3$-$C_{12}$ branched alkyl group, the $C_2$-$C_{12}$ linear alkenyl group, the $C_2$-$C_{12}$ linear alkynyl group, the $C_4$-$C_{12}$ branched alkenyl group, or the $C_4$-$C_{12}$ branched alkynyl group is substituted by a halogen atom, and/or at least one —$CH_2$— of the $C_1$-$C_{12}$ linear alkyl group, the $C_3$-$C_{12}$ branched alkyl group, the $C_2$-$C_{12}$ linear alkenyl group, the $C_2$-$C_{12}$ linear alkynyl group, the $C_4$-$C_{12}$ branched alkenyl group, or the $C_4$-$C_{12}$ branched alkynyl group is substituted by —O—, —CO—, —COO—, or —OCO—, and the —O—, —CO—, —COO—, and —OCO— do not directly bond to one another;

$M^1$ represents a single bond, —$CH_2O$—, —$OCH_2$—, —$CH_2CH_2$—, —CH=CH—, —C≡C—, —$CH_2$—, —$C(CH_3)_2$—, —$C(CF_3)_2$—, —$SiH_2$—, —$Si(CH_3)_2$—, or —$Si(CF_3)_2$—;

each of $R^{23}$ and $R^{24}$ independently represents a $C_1$-$C_{30}$ linear alkyl group or a $C_3$-$C_{30}$ branched alkyl group, wherein the $C_1$-$C_{30}$ linear alkyl group or the $C_3$-$C_{30}$ branched alkyl group is unsubstituted or at least one hydrogen atom of the $C_1$-$C_{30}$ linear alkyl group or the $C_3$-$C_{30}$ branched alkyl group is substituted by a halogen atom, and/or at least one —$CH_2$— of the $C_1$-$C_{30}$ linear alkyl group or the $C_3$-$C_{30}$ branched alkyl group is substituted by —Si—, —O—, —CO—, —COO—, or —OCO—, and the —Si—, —O—, —CO—, —COO—, and —OCO— do not directly bond to one another; and each of $n^{22}$ and $n^{23}$ independently represents an integer of 0 to 3, and when $n^{22}$ is 2 or more, the two $B^4$ groups are identical to each other or different from each other, and the two $M^1$ groups are identical to each other or different from each other; and when $n^{23}$ is 2 or more, the two $B^6$ groups are identical to each other or different from each other, and the two $Z^{27}$ groups are identical to each other or different from each other.

13. The liquid-crystal composition as claimed in claim 12, wherein when a total weight of the second component is 100 parts by weight, the third component is 0.01-10 parts by weight.

14. A liquid-crystal display device comprising:
a first substrate;
a second substrate disposed opposite to the first substrate;
a liquid-crystal layer disposed between the first substrate and the second substrate, wherein the liquid-crystal layer comprises the additive as claimed in claim 1.

* * * * *